US012165475B2

(12) United States Patent
Weaver et al.

(10) Patent No.: US 12,165,475 B2
(45) Date of Patent: *Dec. 10, 2024

(54) MOBILE PROMOTIONAL BINGO GAME FOR PERSONAL MOBILE DEVICES

(71) Applicant: Pilot Games, Inc., Minnetonka, MN (US)

(72) Inventors: Jon Weaver, Saint Paul, MN (US); Anthony M. Morelli, Mt. Pleasant, MI (US); William D. Hermansen, Reno, NV (US); Mason E. Cross, Mt. Pleasant, MI (US)

(73) Assignee: Pilot Games, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,671

(22) Filed: Nov. 11, 2021

(65) Prior Publication Data

US 2022/0139167 A1 May 5, 2022

Related U.S. Application Data

(63) Continuation-in-part of application No. 16/798,086, filed on Feb. 21, 2020, now Pat. No. 11,386,744, and (Continued)

(51) Int. Cl.
*G07F 17/32* (2006.01)

(52) U.S. Cl.
CPC ...... *G07F 17/3276* (2013.01); *G07F 17/3213* (2013.01); *G07F 17/3237* (2013.01); (Continued)

(58) Field of Classification Search
None
See application file for complete search history.

(56) References Cited

U.S. PATENT DOCUMENTS

2002/0039923 A1 4/2002 Cannon et al.
2003/0064805 A1 4/2003 Wells
(Continued)

*Primary Examiner* — Kevin Y Kim
(74) *Attorney, Agent, or Firm* — Kerr IP Group, LLC

(57) ABSTRACT

A gaming system and method for a promotional bingo tournament that supports a plurality of personal mobile devices is described. The system associates at least one venue with the promotional bingo tournament. The personal mobile devices that participate in the promotional bingo tournament, wherein each personal mobile device is associated with a player registration identifier. The age authentication component authenticates an age for each player having the player registration identifier. The location authentication component authenticates a location for each personal mobile device corresponding to each player having the player registration identifier. The mobile promotional gaming sub-system is communicatively coupled to each of the plurality of personal mobile devices over a wireless network. The video presentation sub-system is communicatively coupled to the mobile promotional gaming subsystem. The video presentation sub-system includes a leaderboard associated with the promotional bingo tournament game sessions and the promotional bingo tournament session prize.

29 Claims, 76 Drawing Sheets

Related U.S. Application Data a continuation-in-part of application No. 16/744,125, filed on Jan. 15, 2020, now Pat. No. 11,361,625, and a continuation-in-part of application No. 16/677,366, filed on Nov. 7, 2019, now Pat. No. 11,210,906, and a continuation-in-part of application No. 16/659,469, filed on Oct. 21, 2019, now Pat. No. 11,238,704, and a continuation-in-part of application No. 15/419,008, filed on Jan. 30, 2017, now Pat. No. 10,515,514, and a continuation-in-part of application No. 15/418,985, filed on Jan. 30, 2017, now Pat. No. 10,453,312.

(60) Provisional application No. 62/287,922, filed on Jan. 28, 2016.

(52) U.S. Cl.
CPC ...... *G07F 17/3255* (2013.01); *G07F 17/3267* (2013.01); *G07F 17/329* (2013.01)

(56) References Cited

U.S. PATENT DOCUMENTS

| | | | | |
|---|---|---|---|---|
| 2005/0020358 | A1 | 1/2005 | Cram | |
| 2008/0254854 | A1 | 10/2008 | Slomiany et al. | |
| 2009/0286604 | A1 | 11/2009 | Clowes et al. | |
| 2010/0210339 | A1 | 8/2010 | Chamberlain et al. | |
| 2011/0092276 | A1 | 4/2011 | Acres | |
| 2011/0105208 | A1 | 5/2011 | Bickley | |
| 2011/0256924 | A1 | 10/2011 | Mcghie et al. | |
| 2014/0370959 | A1 * | 12/2014 | Yacenda | G07F 17/3241<br>463/31 |
| 2015/0379805 | A1 | 12/2015 | Harrelson et al. | |
| 2016/0030841 | A1 | 2/2016 | Perlman et al. | |
| 2016/0063817 | A1 | 3/2016 | Guinn | |
| 2017/0092074 | A1 | 3/2017 | Watkins et al. | |
| 2019/0143204 | A1 * | 5/2019 | Aman | A63F 13/50<br>463/31 |
| 2020/0286329 | A1 * | 9/2020 | Weaver | G07F 17/3246 |

* cited by examiner

820

822

824

Figure 11
1100
1104a
1104b
1104c
Pilot Games
PERSIAN DREAMS
EASY MONEY
MORE GAMES
HELP
CASH OUT
CASH
$ 501.00
$ 120.24
ADD CASH
1106
1104d
1108
1104e
1110

1200

1202 1204 1206 1208 1210

Figure 12B
NILE
TREASURE
ADD CASH
MENU
GAME INFO
CASH
$ 896.50
WIN
$ 0.00
OPEN
NILE
TREASURE
ADD CASH
MENU
GAME INFO
CASH
$ 897.50
WIN
$ 0.00
PLAY

1220

1222

Figure 14A
Pilot Games
MegaSota
Game Night
PLAY TODAY
00:17:51
TRIPLE EASY MONEY
MORE GAMES
CASH MOUNTAIN
BOOKOO BUCKS
HELP
CASH OUT
JP $2
$ 1,006.16
CASH
$ 1,000.00
ADD CASH

1402

1500

1700

Figure 19
MegaSota
Game Night
August 26, 2016
07:54 PM
Flash Bingo Tournament:
-Compete with other players across Minnesota in a competition to get the best Flash Bingo scores in the tournament time.
-Prizes for getting the most points with a maximum number of game plays.
-One buy-in for the cost of the tournament.
-Select GAME INFO for more details.
GOOD LUCK!
FLASH BINGO
TOP DOG
Warren 2005 2016-08-26
The game starts in:
00:10:19
at 08:05 PM
CASH
$ 1,000.00
Reno 1
EDIT
COST
$ 20.00
SIGN-UP
MENU
GAME INFO

1910

Figure 20
MegaSota Game Night
01:32 PM
Flash Bingo Tournament:
-Compete with other players across Minnesota in a competition to get the best Flash Bingo scores in the tournament time.
-Prizes for getting the most points (and fewest points in some games) after completing all plays.
-One buy-in for the cost of the tournament.
-Select GAME INFO for more details.
GOOD LUCK!
FLASH BINGO
69696901
TOPDOG
test 2017-01-28
The game starts in:
00:02:49
at 01:35 PM
CASH
$ 967.20
YOU ARE
taylor
SESSION START 01:35 PM
CANCEL
You may wait or go to the menu and return before the session begins
MENU
GAME INFO
$ 967.20

2020

Figure 21
MegaSota Game Night
January 26, 2017
01:15 PM
Flash Bingo Tournament:
-Compete with other players across Minnesota in a competition to get the best Flash Bingo scores in the tournament time.
-Prizes for getting the most points (and fewest points in some games) after completing all plays.
-One buy-in for the cost of the tournament.
-Select GAME INFO for more details.
GOOD LUCK!
FLASH BINGO
TOP DOG
TD Test 2017-01-26
The game starts in:
PLAYING
at 01:15 PM
CASH
$ 980.00
YOU ARE
taylor
TOTAL PLAYERS
6
TOTAL REVENUE
$ 120.00
PLAY
MENU
GAME INFO
$ 980.00
2130
2110

Figure 22
2250
2270
2260
Pilot Games
taylor
HERE
Warrens Cafe
TIME LEFT
27:59
MENU
GAME INFO
CASH
PLAY
POINTS
100
$ 980.00
36
1179
525
PLAY
2240
2280
2210
2220
2230

2300

2302

2400

Figure 27
2700
2720
2710
2730
MegaSota
Game Night
08:25 AM
Jackpot
$ 1,472.00
COVERALL BINGO
95959501
CASH
$ 184.00
Enter Your Screen Name
Enter Here
Coverall Sign Up:
- Compete with others players across Minnesota in a Coverall Game.
- Prizes for 1st Line Bingo, Large M and Coverall.
- Win the coverall in under 52 balls and win a Jackpot!
- Jackpot grows every game until won.
- Buy from 4 to 36 cards.
- Select GAME INFO for more details.
GOOD LUCK!
JACKPOT JUNGLE
Warren CG 830 2016-06-25
The game starts in:
00:04:55
at 08:30 AM
You have 0 CARDS
BUY MORE CARDS
4
$ 20.00
MENU
GAME INFO
$ 184.00

Figure 28
2800
2810
MegaSota
Game Night
08:30 AM
Jackpot
$ 1,488.00
Coverall Sign Up:
- Compete with others players across Minnesota in a Coverall Game.
- Prizes for 1st Line Bingo, Large M and Coverall.
- Win the coverall in under 52 balls and win a Jackpot!
- Jackpot grows every game until won.
- Buy from 4 to 36 cards.
- Select GAME INFO for more details.
GOOD LUCK!
COVERALL BINGO
JACKPOT JUNGLE
Warren CG 830 2016-06-25
The game starts in:
PLAYING
at 08:30 AM
CASH
$ 164.00
PLAY
TOTAL PLAYERS
TOTAL REVENUE
$ 40.00
MENU
GAME INFO
2840
2850
2830

Figure 30
Pilot Games
Reno 3
B
8
Bingo
$ 4.00
CONGRATULATIONS ! YOU HAVE WON
1 WINNER
CARD 3
AWAY 0
JACKPOT
$ 1,488.00
Minimum prize X covered in 32 balls or less
$ 8.00
$ 4.00
$ 4.00
TOURNAMENT ID: 2461
MENU
GAME INFO
CASH
$ 164.00
WIN
$ 8.00
PLAYERS

3000

3020

3100

3120

Figure 33
3300
BALLS DRAWN:
VINNER
VINNER
B I N G O
sbcoach
Sharis Sports
Saloon
Chatfield
MJD 48
Friends Bar and
Grill 2
Waite Park

MAIN SCREEN

3500

PLAYER STANDINGS

3600

PLAYER PROFILE

3700

EVENT SCHEDULE

Figure 38
GAMING LOCATIONS
HOME
Gaming Locations
Locations
States
Region
Minnesota
-- All --
Search a location
Map
1 . Falls Bar
2 . VFW - Brainerd 1647
3 . Commander Bar - JJs Pub
4 . Gilman Municipal Liquor Store
NORTH DAKOTA
SOUTH DAKOTA

3800

VENUES

VIRTUAL REWARDS

4000

NEWS AND BLOG

Figure 41
OUR GAMES
HOME > Our Games
Martian Invasion
Voodoo Guru
PLAY
Wild Walleye Summer
Bucket Bucks

4100

MGS GAMES

Figure 49
LEADERS
PILOT
CHAMPIONSHIP
SERIES
00:07:11
TIME LEFT
09:08
GAME INFO
PLAYS
6
Mason
POINTS
610
100
310
PLAY
Enter text...

4900

5000

5100

5200

Figure 53
5300
PILOT CHAMPIONSHIP SERIES
2020 WINNERS!!
1st Milky $5,000
2nd FMLYGUY $1,000
3rd rj5616 $750
4th Konzie16 $600
5th Fishy24 $500
6th MamaBear $400
7th DarkHorSe $325
8th BigSchmitt $300
9th SheDevil $275
10th AnitaAlibi $250
11th ScubaSteve $250
12th Jackpot108 $250
Consolation Prize Winner - BoomMee3!!
PILOT Thank you all for playing in PCS2020!! Congrats to all winners and players!!
GAME INFO
PLAYS 9
Mason
POINTS 310
100
310
PLAY
Enter text...

Figure 56
PILOT
CHAMPIONSHIP
SERIES
PCS QUALIFIERS ARE COMPLETE!
PLAY FOR FUN!
New Session Registration
Mason
Are you sure you want to register for a new session? Your current session points will be reset to 0. This can not be undone.
(click to change)
Enter text...

5600

6200

Figure 63
PILOT CHAMPIONSHIP SERIES
Vikings Victory Week 3 Winners
1 AL2018 23,620
2 BUCKS 21,570
3 MADDOG 20,605
4 BERGER 20,110
5 FUNFAIR66 19,875
Updated 12/12
VIKINGS VICTORY
PILOT
PLAYERCONNECT
CONGRATS TO THIS WEEK'S WINNERS!!
PRIDE OF MINNESOTA
TIME LEFT
GAME INFO
PLAYS
9
Mason
POINTS
310
100
310
PLAY
Enter text...

6300

Figure 64
PILOT
CHAMPIONSHIP SERIES
2020
Session Qualifiers
TUES. NOV 24TH 6pm
TUES. DEC 1ST 6pm
WED. DEC 2ND 1pm
THURS. DEC 3RD 6pm
TUES. DEC 8TH 6pm
Compete now on Pilot PlayerConnect App!
TIME LEFT
GAME INFO
PLAYS
9
Mason
POINTS
310
100
310
PLAY
Enter text...

6400

MOBILE PROMOTIONAL BINGO GAME FOR PERSONAL MOBILE DEVICES

CROSS-REFERENCES

This patent application is a continuation-in-part of patent application Ser. No. 16/798,086 entitled CENTRALIZED MOBILE WAGERING AND VIDEO PRESENTATION, filed on Feb. 21, 2020;

this patent application is a continuation-in-part of patent application Ser. No. 16/744,125 entitled CENTRALIZED MOBILE PROMOTIONAL BINGO GAME AND VIDEO PRESENTATION, filed on Jan. 15, 2020;

this patent application is a continuation-in-part of patent application Ser. No. 16/659,469 entitled CENTRALIZED MOBILE WAGERING AND VIDEO PRESENTATION, filed on Oct. 21, 2019;

this patent application is a continuation-in-part of patent application Ser. No. 16/677,366 entitled CENTRALIZED TOURNAMENT GAME, filed on Nov. 7, 2019;

this patent application is a continuation-in-part of patent application Ser. No. 15/419,008 entitled CENTRALIZED TOURNAMENT GAME, filed on Jan. 30, 2017, that claims the benefit of provisional patent application 62/287,922, filed on Jan. 28, 2016, which is entitled MOBILE WAGERING AND ENTERTAINMENT SYSTEM AND METHOD; and this patent application is a continuation-in-part of patent application Ser. No. 15/418,985 entitled CENTRALIZED MOBILE WAGERING AND VIDEO PRESENTATION, filed on Jan. 30, 2017, that claims the benefit of provisional patent application 62/287,922, filed on Jan. 28, 2016, which is entitled MOBILE WAGERING AND ENTERTAINMENT SYSTEM AND METHOD;

the above patent applications are hereby incorporated by reference in this patent application.

FIELD

A method and system for operating a promotional tournament game and shared bonus game session for personal mobile devices is described. More particularly, a promotional tournament game is described that includes a mobile gaming system and a video presentation module that accesses gaming activity on personal mobile devices.

BACKGROUND

Typical wagering devices include slot machines and video lottery terminals and are normally managed by various types of computer systems which monitor and control their activities. Such wagering devices are typically located in casinos, racetracks, tribal gaming locations or other authorized locations. These are generally capital-intensive operations where the high amount of play justifies a significant capital expenditure.

Smaller gaming venues, including charitable gaming venues, are challenged by such devices for several reasons: 1) play volume may not generate enough revenue to make expensive, proprietary devices cost-effective; 2) small locations cannot afford dedicated maintenance staffs to keep complex devices working; 3) considerable expertise is needed to coordinate effective operations; and 4) such gaming devices require considerable space.

While gaming is still a popular and generally profitable enterprise, the popularity of gaming activity is not high among younger elements of the population. Indeed, most casinos and large gaming operations report an ever-increasing average age of players. This is an industry concern and results in a constant search for new ways to appeal to a younger age-group.

One long standing method of increasing player interest is to provide a promotional or sweepstakes type game, thereby lowering the barrier to entry for potential players. However, promotional games effectively increase the cost burden on the establishments or venues offering them. This cost is such that amortization of the cost of the promotional game over multiple venues is usually necessary to allow any one establishment or venue to afford the costs of offering such promotional games. This amortization is all the more necessary for smaller gaming venues.

The systems and methods presented herein are directed to personal mobile devices, in combination with a video transmission system to produce a flexible, secure, low-cost gaming alternative for promotional gaming.

Additionally, the systems and methods presented herein support games which are socially-centered and may appeal to younger players. This system will be valuable as a secure low-cost method of bringing gaming systems to players in diverse retail environments, including but not limited to bars, taverns, restaurants, large venues such as stadiums, and other such establishments. Since this system lower costs associated with gaming, it will facilitate the provision of promotional games, such as promotional tournament games. It is anticipated that the systems and methods may be used for charitable gaming operation in jurisdictions where such activity is permitted, as well as lotteries or other gaming organizations.

SUMMARY

A promotional bingo tournament system and method for operating a promotional bingo tournament is described. The method system includes a plurality of authorized mobile devices, a plurality of unique player registrations, at least one venue, a mobile promotional gaming sub-system, a wireless network, a promotional bingo tournament session prize, a video presentation subsystem, and a stationary monitor. The promotional bingo tournament includes a promotional bingo tournament session that is played at a scheduled time for a duration of time, a promotional bingo tournament result, a plurality of promotional bingo game sessions, and a head-to-head animation. Each promotional bingo game session includes a promotional bingo game session result. Each authorized mobile device includes a user interface and is associated with at least one promotional bingo game session and a unique player registration. Each player registration includes a plurality of player selected avatar characteristics. The mobile promotional gaming sub-system is communicatively coupled to each of the authorized mobile devices over the wireless network. The mobile promotional gaming sub-system selects a promotional bingo game session result associated with a first player registration and a promotional bingo game session result associated with a second player registration. The mobile promotional gaming sub-system then generates the head-to-head animation from the promotional bingo game session result associated with the first player, the first player registration player selected plurality of avatar characteristics, the promotional bingo game session result associated with the second player, and the second player registration player selected plurality of avatar characteristics. The promotional bingo tournament session prize is awarded by the mobile promotional gaming sub-system when at least one promotional bingo game session result satisfies a promotional bingo tournament requirement. The video presentation sub-system is communicatively coupled to the mobile promotional gaming sub-system. The user interface of each authorized mobile device displays at least one promotional bingo game session result and the head-to-head animation. The stationary monitor client is communicatively coupled to the video presentation sub-system and displays the head-to-head animation.

A mobile promotional gaming sub-system is communicatively coupled to each of the personal mobile devices over a wireless network. The promotional bingo tournament is then played. The promotional bingo tournament includes a promotional bingo tournament session that operates at a scheduled time for a duration of time. A promotional bingo tournament result is generated from promotional bingo game sessions. Each personal mobile device is associated with at least one promotional bingo game session that includes a promotional bingo game session result. A promotional bingo tournament session prize is awarded with the mobile promotional gaming sub-system when the at least one promotional bingo game session result satisfies a promotional bingo tournament requirement.

A video presentation sub-system is communicatively coupled to the mobile promotional gaming sub-system. The video presentation sub-system includes a leaderboard associated with the promotional bingo tournament game sessions and the promotional bingo tournament session prize. A stationary monitor client is communicatively coupled to the video presentation sub-system and the stationary monitor client is disposed at the at least one venue. The stationary monitor client displays the leaderboard and the promotional bingo tournament session prize from the video presentation sub-system.

In one illustrative embodiment, the video presentation sub-system generates an integrated broadcast announcement about the promotional bingo tournament session. The integrated broadcast announcement combines at least one promotional bingo game session result and a commentary about the at least one promotional bingo game session result. Each personal mobile device includes a user interface that displays at least one promotional bingo game session result and the integrated broadcast announcement. Additionally, the stationary monitor client displays the integrated broadcast announcement from the video presentation sub-system.

In another illustrative embodiment, the leader board is communicated to each personal mobile device.

In yet another illustrative embodiment, the method provides at least one bonus game session, in which the bonus game session includes a plurality of bonus game events. Also, the method enables a triggering event to initiate a bonus game event and the bonus game event includes a bonus game event animation. A bonus prize is awarded by the mobile promotional gaming sub-system to each personal mobile device when the bonus game event satisfies a bonus requirement. By way of example, the bonus prize is a point multiplier awarded to each personal mobile device.

In a still further illustrative method, the method includes the promotional bingo tournament requirement having the personal mobile device located at one of the plurality of venues that each host the promotional bingo tournament at a particular time and for a duration of time. The promotional bingo tournament session prize is awarded by the mobile promotional gaming sub-system to at least one of a plurality of players that each have a personal mobile device, in which each personal mobile device satisfies the promotional bingo tournament requirement.

A gaming system for a promotional bingo tournament that supports a plurality of personal mobile devices is also described. The gaming system includes an age authentication component, a location authentication component, a mobile promotional gaming sub-system, a video presentation sub-system, and a stationary monitor. The system associates at least one venue with the promotional bingo tournament. The personal mobile devices that participate in the promotional bingo tournament, wherein each personal mobile device is associated with a player registration identifier. The age authentication component authenticates an age for each player having the player registration identifier. The location authentication component authenticates a location for each personal mobile device corresponding to each player having the player registration identifier. The mobile promotional gaming sub-system is communicatively coupled to each of the plurality of personal mobile devices over a wireless network.

The promotional bingo tournament includes a promotional bingo tournament session that is played at a scheduled time for a duration of time. The promotional bingo tournament also includes a promotional bingo tournament result and a plurality of promotional bingo game sessions. Each personal mobile device is associated with at least one promotional bingo game session that includes a promotional bingo game session result. A promotional bingo tournament session prize is awarded by the mobile promotional gaming sub-system when the at least one promotional bingo game session result satisfies a promotional bingo tournament requirement.

The video presentation sub-system is communicatively coupled to the mobile promotional gaming sub-system. The video presentation sub-system includes a leaderboard associated with the promotional bingo tournament game sessions and the promotional bingo tournament session prize. The stationary monitor client is disposed at the venue and the stationary monitor client is communicatively coupled to the video presentation sub-system. The stationary monitor client displays the leaderboard and the promotional bingo tournament session prize from the video presentation sub-system.

In one embodiment, the video presentation sub-system generates an integrated broadcast announcement about the promotional bingo tournament session. The integrated broadcast announcement combines at least one promotional bingo game session result and a commentary about the at least one promotional bingo game session result. Each personal mobile device includes a user interface that displays at least one promotional bingo game session result and the integrated broadcast announcement. Also, the stationary monitor client displays the integrated broadcast announcement from the video presentation sub-system.

In another embodiment, the leader board is communicated to each personal mobile device.

In yet another embodiment, the system includes a bonus game session, in which the bonus game session includes a plurality of bonus game events. Also, a triggering event initiates a bonus game event, and the bonus game event includes a bonus game event animation. A bonus prize is awarded by the mobile promotional gaming sub-system to each personal mobile device when the bonus game event satisfies a bonus requirement. By way of example, the bonus prize is a point multiplier awarded to each personal mobile device.

In a still further embodiment, the system includes the promotional bingo tournament requirement having the personal mobile device located at one of the plurality of venues that each host the promotional bingo tournament at a particular time and for a duration of time. The promotional bingo tournament session prize is awarded by the mobile promotional gaming sub-system to at least one of a plurality of players that each have a personal mobile device, in which each personal mobile device satisfies the promotional bingo tournament requirement.

FIGURES

The present invention will be more fully understood by reference to the following drawings which are presented for illustrative, not limiting, purposes.

Figure 64:

FIG. 64 shown a screenshot of the session qualifier times and game play during these session qualifier times can earn players a qualifying spot in the finals.

Figure 65:
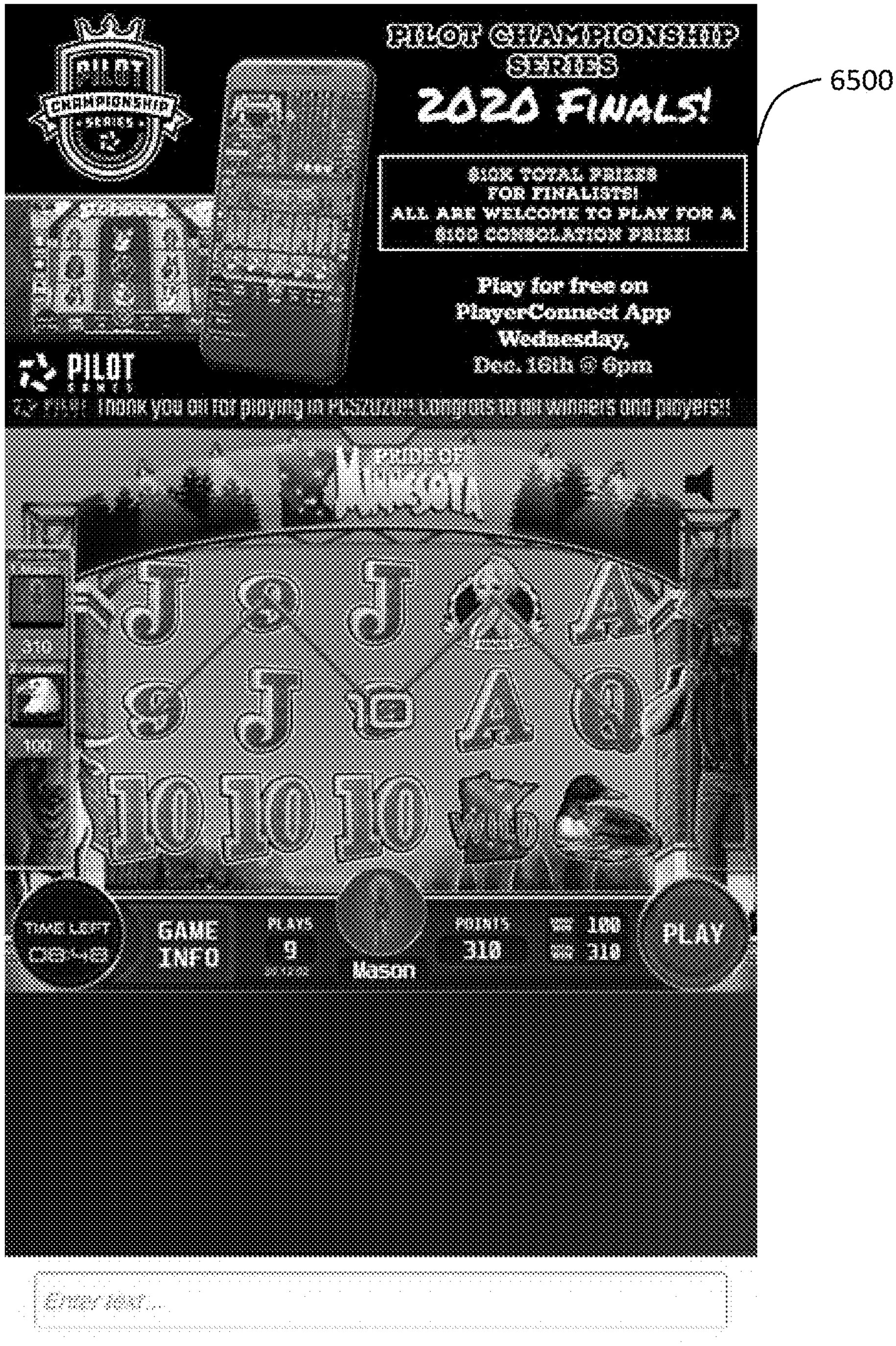

FIG. 65 shows a screenshot indicating to the players that in addition to players who have qualified for the finals, all players can participate in the finals and compete for a consolation prize.

Figure 66:
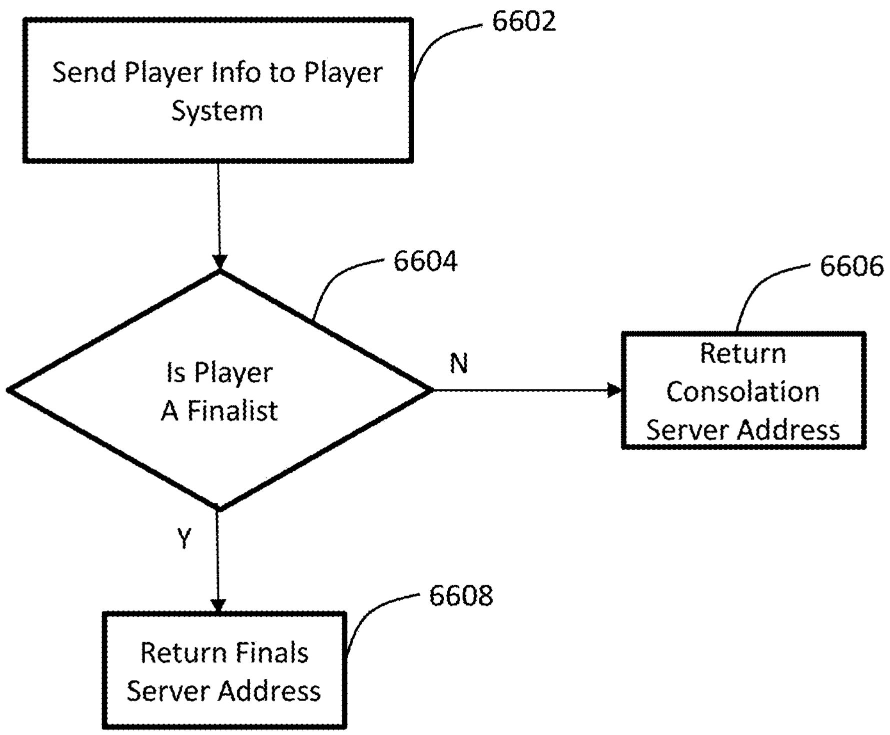

FIG. 66 shows a final qualification status method.

Figure 67:
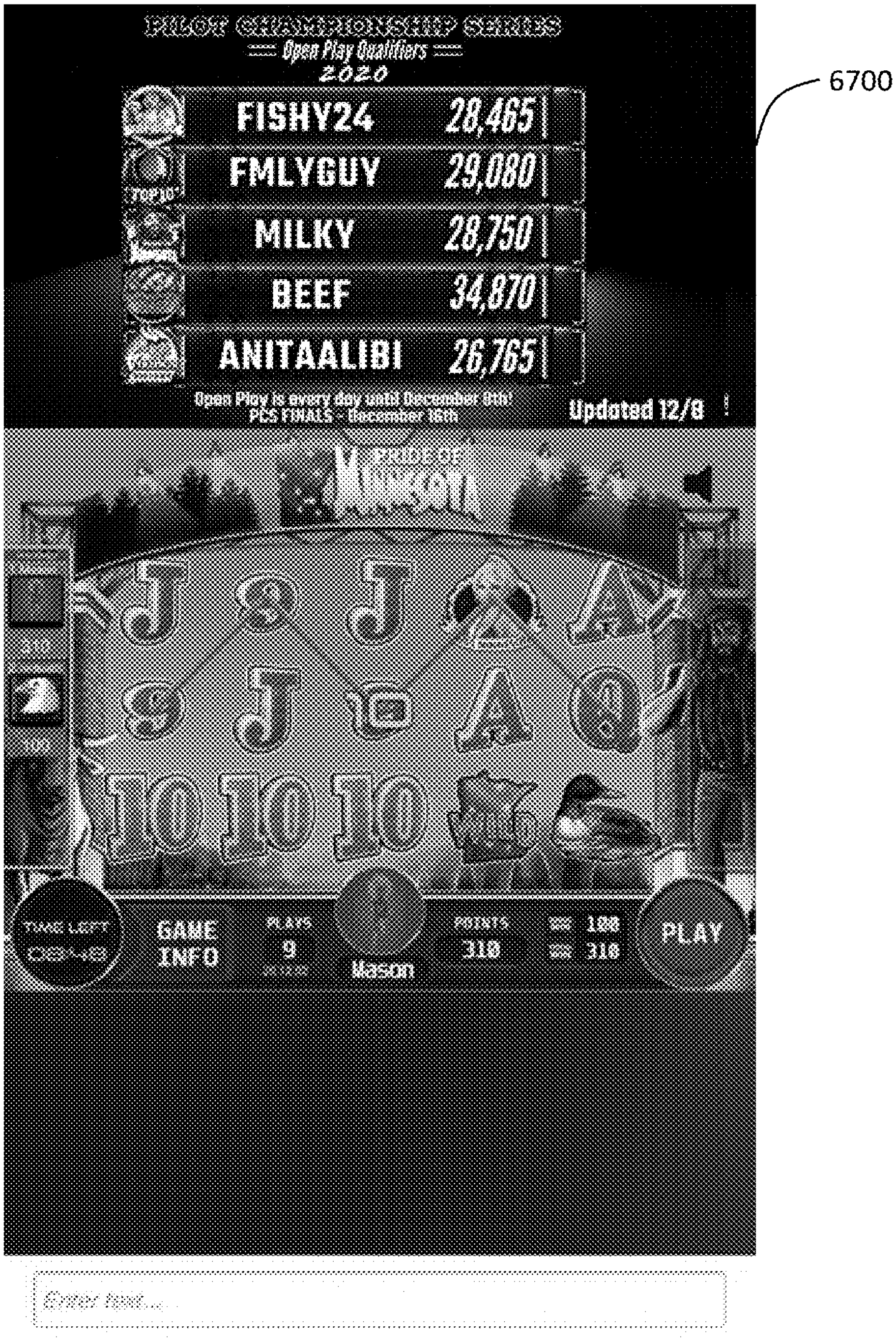

FIG. 67 show a screenshot showing players can earn a finals qualifying position by being the top player in a tournament for each of the titles offered.

Figure 68:
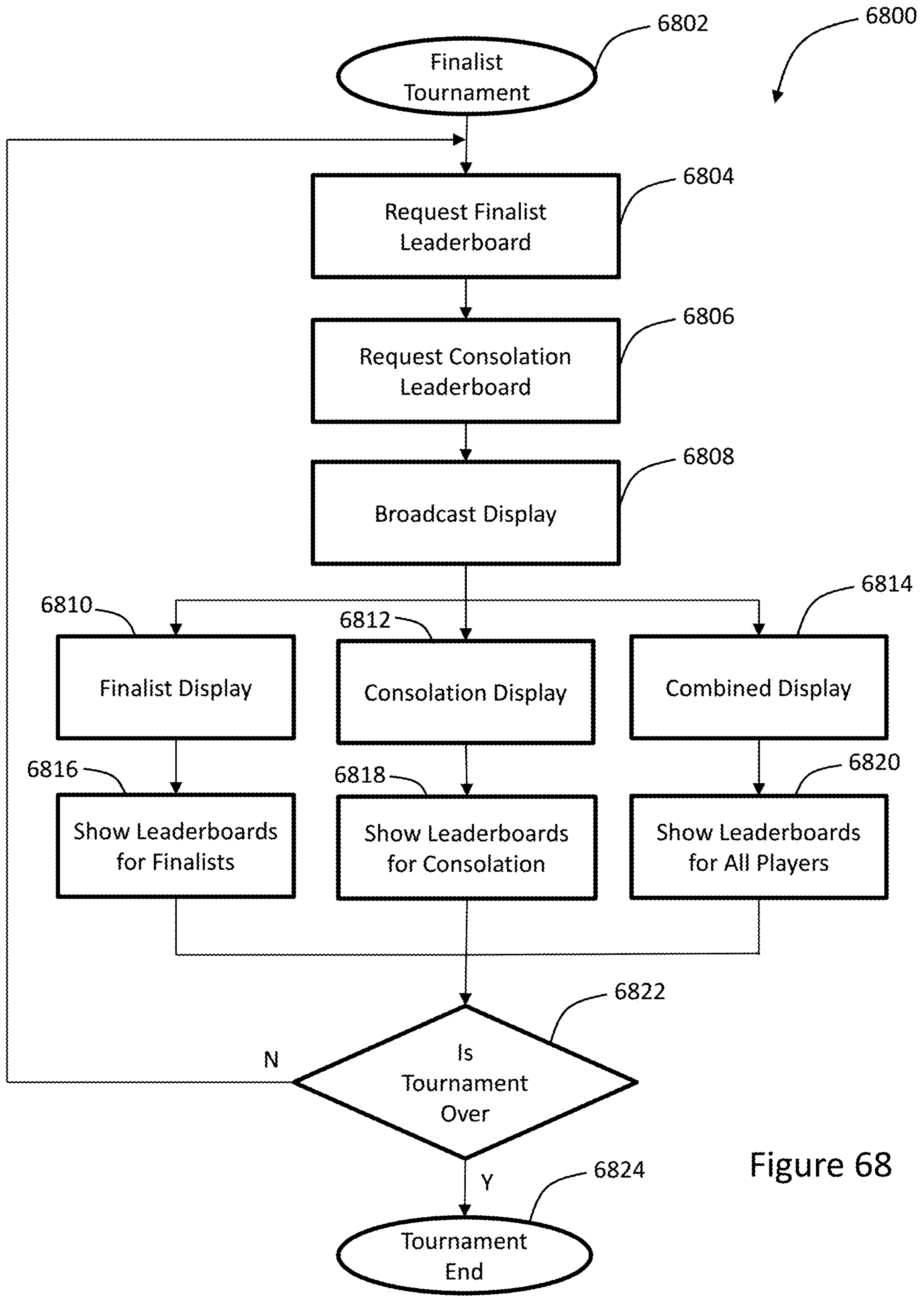

FIG. 68 shows an illustrative broadcaster display method for a finalist tournament game session.

DESCRIPTION

Persons of ordinary skill in the art will realize that the following description is illustrative and not in any way limiting. Other embodiments of the claimed subject matter will readily suggest themselves to such skilled persons having the benefit of this disclosure. The various illustrative embodiments will now be described more fully with reference to the accompanying drawings. It should be understood that this disclosure and the claims may be embodied in many different forms and should not be construed as limited to the embodiments set forth herein. Additionally, those familiar with computing systems shall appreciate that there are many variants possible for the described systems, depending on the nature of the available networks, legal frameworks, which can open or restrict the types of locations in which the system can be operated, advances in server and networking technologies, etc.

The gaming systems and methods presented herein include a mobile gaming and entertainment system that is designed to be used in promotional gaming applications within legal frameworks and thus termed promotional gaming systems or promotional mobile gaming systems or sub-systems. More specifically, the gaming systems and methods presented herein support centralized control of promotional gaming that takes place in one venue or multiple venues and provides an integrated broadcast capability so that an entertaining complement to the promotional gaming can be presented on television screens in the one or more venues. Registration for the promotional games is also processed centrally, enabling virtually any number of disparately located mobile devices to register for a promotional game or promotional tournament game through the centralized gaming system.

A venue for the promotional gaming includes a charity, a casino, a stadium, a sports venue, a church, hotel, bar, restaurant, convenience store or other such establishments that may support licensed gaming activity. Note, that the term "gaming" refers to games of chance or games that include a chance component, in which any prize awarded is dependent on the outcome of the game of chance or of the chance component.

As described in further detail herein, the gaming system and method includes a Mobile Gaming Sub-system (MGS) and a Video Presentation Sub-system (VPS). In addition to the functions and structure of the MGS described herein, the MGS may be embodied as a mobile wagering sub-system as described in the above cross-referenced applications. The gaming system may be comprised of a remote server or a distributed network of servers. Thus, each element of the gaming system (i.e., the MGS and the VPS) may comprise one or more sub-routines or software programs operating on a single server, or individual servers networked together. The aforementioned elements, sub-routines, software programs, and individual servers may include a Bingo Display Enhancement Sub-System, a Promotional Bingo Gameplay Sub-System, and a Promotional Multiplier Sub-System. The gaming system is communicatively coupled to a plurality of remote venues, in which each remote venue has at least one mobile client device that supports customer gaming. Additionally, each remote gaming venue may include one or more Point-of-Sale stations that manage player funds. Furthermore, each remote venue may include one or more television monitor that broadcasts content complementary to gaming activities. In the illustrative embodiments presented herein, the various elements of the gaming system are communicatively and operatively coupled to one another with a network structure that includes the Internet as the backbone and at least one secure Wi-Fi network within each venue.

Figure 1:
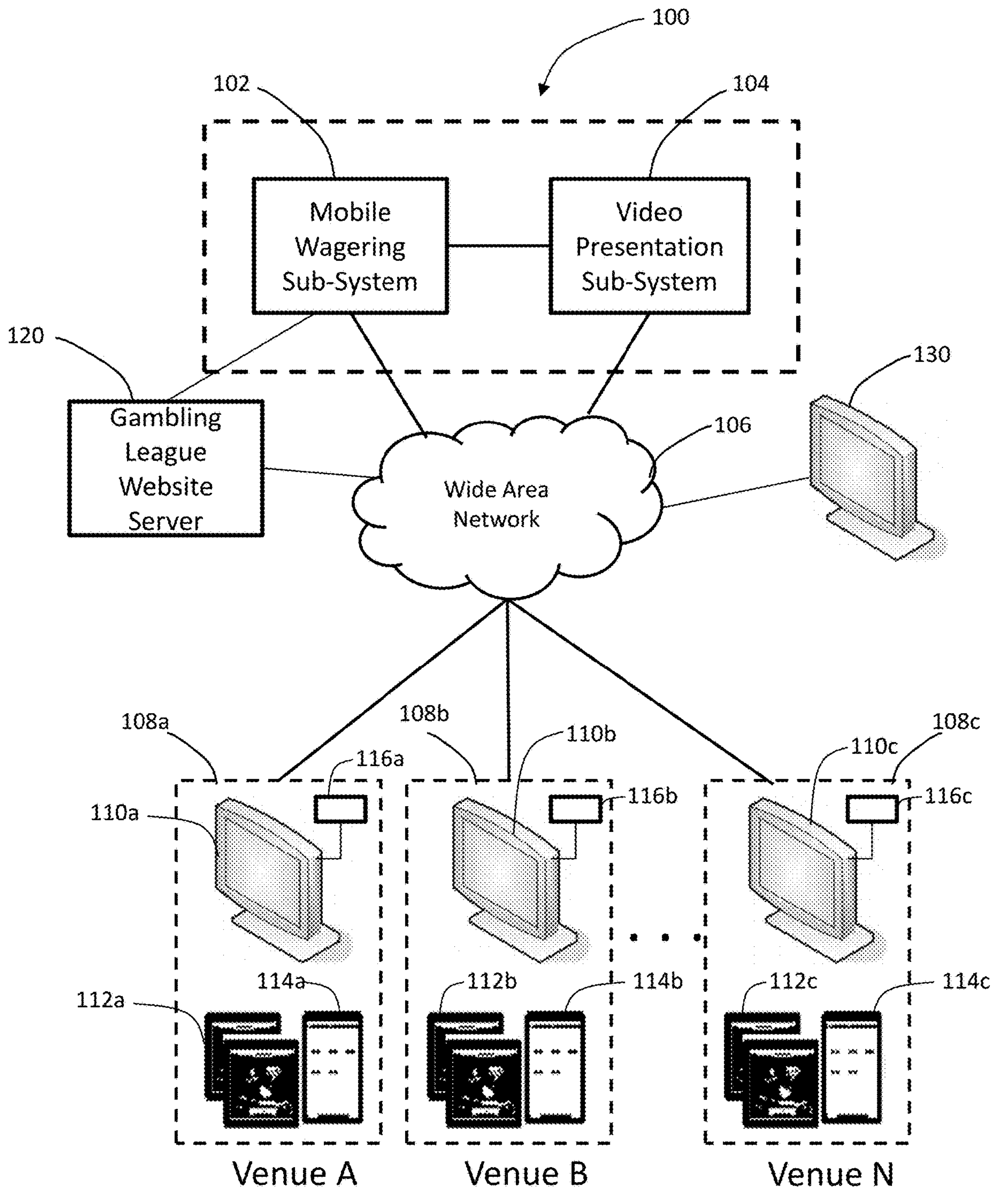
FIG. 1 shows an illustrative promotional gaming system.

Referring to FIG. 1, there is shown an illustrative centralized gaming system. The centralized gaming system 100 includes a mobile gaming sub-system 102 and a video presentation sub-system 104. The mobile gaming sub-system 102 and the video presentation sub-system 104 are communicatively coupled to one another. Additionally, the mobile gaming sub-system 102 and the video presentation sub-system 104 are communicatively coupled to a Wide Area Network 106, e.g., Internet, which is communicatively coupled to a plurality of venues, namely, illustrative Venue A 108*a*, Venue B 108*b* and other such venues as represented by Venue N 108*c*. The venues 108*a-c* may include casinos, bars, restaurants, stadiums, arenas, bingo halls, and similar locations. Each of the plurality of venues 108*a*, 108*b* and 108*c* include at least one stationary monitor 110*a*, 110*b* and 110*c*, respectively. Each stationary monitor 110*a*, 110*b* and 110*c* is communicatively coupled to the video presentation client 116*a*, 116*b* and 116*c*, respectively. The video presentation clients 116 are also communicatively coupled to the video presentation subsystem 104. The combination of the stationary monitor 110 and the video presentation client 116 may also be referred as a "stationary monitor client," and as such reference to "stationary monitor client" refers to the combination of the stationary monitor 110 and the video presentation client 116.

Within the system architecture each venue may be associated with a sponsoring organization, e.g., a charity, and an additional business entity, e.g., a distributor. The types of venues, sponsoring organizations and other business entities will vary according to jurisdictional statutes and/or regulations.

Additionally, each of the venues 108*a*, 108*b* and 108*c* support promotional gaming include a plurality of authorized mobile devices 112*a*, 112*b* and 112*c*, respectively. Further still, each of the gaming venues may include a Point-of-Sale (POS) device 114*a*, 114*b* and 114*c*. The illustrative authorized mobile devices 112 and the POS devices 114 are client devices configured to communicate with each other and the mobile gaming subsystem 102. In operation, the authorized mobile devices 112 and POS devices 114 are registered with the mobile gaming sub-system 102, which includes a database (not shown) that associates the authorized mobile devices 112 and POS devices 114 with a designated venue 108. Thus, authorized mobile devices 112 and POS devices 114 may not be allowed to interact with the centralized gaming system 100 when the client devices are not located at the designated gaming venue.

The illustrative authorized mobile devices 112 operate as wireless client devices that are communicatively coupled to the centralized gaming system 100. Additionally, the centralized gaming system 100 may be communicatively coupled to authorized non-mobile clients. Furthermore, other client devices such as non-mobile clients may be disposed in the venues and these non-mobile clients may be communicatively coupled to the centralized gaming system 100. These authorized non-mobile client devices include, but are not limited to, wired devices such as gaming machines, slot machines, PCs, stationary monitors, Internet appliances, Internet of Things (IOT) devices and other such non-mobile devices with hardwire connections or wireless connections to the Wide Area Network 106. The non-mobile client devices may be configured to participate in the games presented herein including, but not limited to, the tournament games described hereinafter.

Operationally, client devices must comply with the system-centric gaming requirements in which all gaming and accounting activity are controlled by the mobile gaming sub-system 102 servers, and have the communications infrastructure, directly or by proxy, to interact with the server in a manner consistent with the operations of the authorized mobile devices 112 described herein. This may for example require the mobile gaming sub-system 102 to have a database record associating a player, a unique registration, and a particular authorized mobile device 112. In one example, the association of a player, a player registration, and a particular mobile device may be required for the mobile device to qualify as an authorized mobile device. Each player registration may be unique from all other registrations, and unique to a particular player.

The illustrative gaming system 100 includes a plurality of server applications that are configured to provide high-availability and redundancy, process all inputs, and generates outputs. The illustrative gaming system 100 includes three different types of network communications. Firstly, there are network communications between the internal server components, namely, the mobile gaming sub-system 102 and the video presentation sub-system 104. Secondly, there are network communications between the server components, e.g., the mobile gaming sub-system 102 and the video presentation sub-system 104, and the remote venues 108*a*, 108*b* and 108*c*, as well as the Gambling League Website server 120. Thirdly, there are network communications within the venues 108*a*, 108*b*, and 108*c*.

With respect to network communications between the internal server components, the illustrative server components operate as a single network, in which the servers can communicate with one another using service requests. By way of example and not of limitation, the illustrative internal server components have two internet protocol addresses, namely, a Private IP used to maintain the server network and ensuring secure server-to-server communication, and a Public IP that is bound to the Internet and that provides access to server services through high security communications such as HTTPS. The internal server components use their private IPs for server-to-server communication so that these services are not exposed to the Internet, the game application running on the authorized mobile devices and the POS devices.

By way of example and not of limitation, each server is configured with an SSL certificate which supports HTTPS calls. The illustrative server is configured to forward some requests it receives through HTTPS to a local port, and the requests that are allowed to pass are only those available to authorized "Game" and "POS" devices. This illustrative configuration ensures that only very specific requests are allowed from the public IP.

By way of example and not of limitation the servers are implemented using the Linux operating system using Restful programming techniques using Java as the programming language with Jersey RS support. Database structures are contained in a MySQL database.

Communication between the server components, namely, the mobile gaming sub-system 102 and the video presentation sub-system 104, and the remote client devices is performed over a wide-area network 106. As described above, these network communications are performed using secure SSL communications over the Internet.

Figure 2:
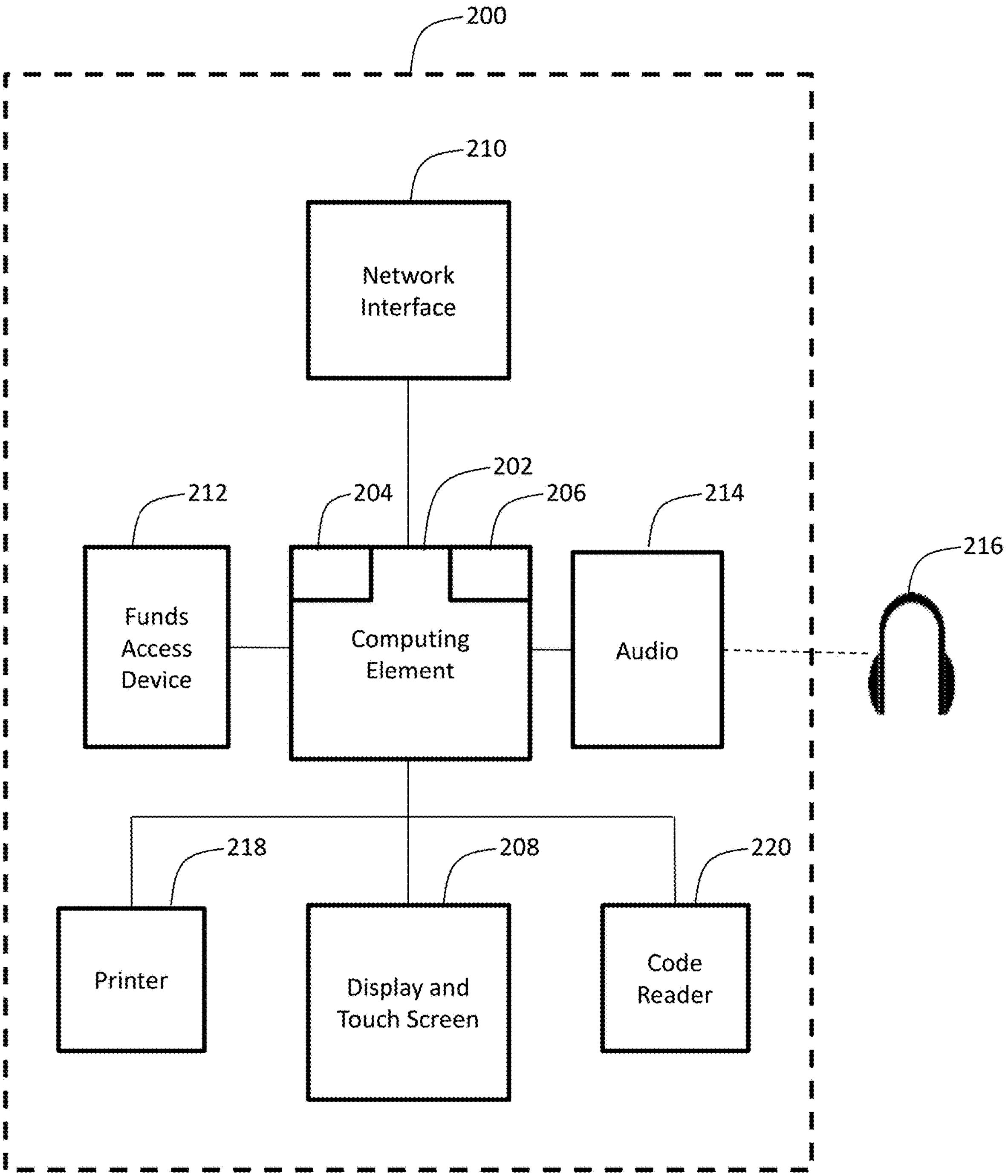
FIG. 2 shows an illustrative authorized mobile device.

The authorized mobile devices 112*a*, 112*b* and 112*c* are also referred to as a "player interface unit." An illustrative authorized mobile device is presented in FIG. 2. Operationally, each authorized mobile device 112 in an illustrative embodiment is associated with a player account.

By way of example and not of limitation, the player account is described as a short-term, anonymous entity tied to the client device being used by the player, and which expires when the fund balance drops to zero. However, it is possible in other embodiments to have player accounts which may exist for longer time periods and be tied to a player.

Additionally, it should be noted that while the illustrative embodiments presented herein generally describe financial transactions such as adding funds or cashing out at the POS device 114, in different regulatory environments or with different technology, such player accounts can have financial transactions originating at the player device or any other client device that may be configured to support POS transaction. Also, the financial transactions may be supported at a system level with a server component or server module that provides a web portal functions for financial transactions. Thus, the financial transactions may be performed by the client device, a server component, a server module, or any combination thereof. Depending on regulatory issues and available technology, financial transactions may be based on cash, credit cards, debit cards, digital currency, or other mediums of finance.

Referring to FIG. 2 there is shown an illustrative player interface unit 200. The player interface unit 200 can comprise the authorized mobile device 112, the point-of-sale device 114, and any combination thereof. For example, the illustrative player interface unit 200 may be one of the plurality of authorized mobile devices 112 that are associated with each venue. The illustrative player interface unit 200 includes a central computing element 202 with a processor 204 and memory storage 206. One or more games may be pre-installed on the player interface unit 200 before the player interface units are deployed in a gaming venue or other such production environment. Alternatively, the illustrate game title files may be stored in a remote server, e.g., an "App" store, and the player interface unit 200 may be configured to download the game title file, run the game title file, and enable the user to interact with the corresponding game title. The player interface unit 200 may comprise a tablet, cell phone, smart phone, or other mobile gaming device.

The player interface unit 200 also includes a color display with a touch-screen 208 and a network interface component 210, which provides network access to a local area network, a wide area network or any combination thereof. By way of example and not of limitation the network interface component supports a wireless local area network such as a Wi-Fi network, which is based on IEEE 802.11 standards. Additionally, the player interface unit 200 may communicate with the wide area network 106 via the illustrative Wi-Fi network. The communication between the player interface unit 200 and the mobile gaming sub-system 102 may be performed using the illustrative HTTPS protocol or other such secure networking protocol that allows game session inputs, commands, and outputs to be communicated securely across the Wide Area Network.

In an illustrative embodiment, the player interface unit 200 may be a tablet computing device running iOS or Android operating systems. The illustrative player interface unit may also include a Funds Access Device module 212 that may be configured to have a custom locked profile to evade security-bypassing attempts. The Funds Access Devices (FAD) 212 may also provide alternative methods for starting play sessions or adding funds to existing sessions. By way of example and not of limitation, the Funds Access Device module 212 may include currency readers and debit/credit card readers such as a magnetic stripe reader, a smart-card reader, an infra-red reader, a Near-Field-Communications reader and other such financial transaction readers.

The player interface unit 200 may also include an audio system component 214 that enhances the game-playing experience for the players. The audio system component 214 may also include a standard audio jack so that a player can use wired or wireless headphones 216 to improve the game audio environment without disturbing others.

In one illustrative embodiment, the player interface unit 200 may include a printer 218 and a code reader 220. By way of example and not of limitation, the printer 218 generates vouchers. The illustrative code reader 220 may be embodied as a bar-code reader that is configured to read vouchers generated by the printer.

By way of example and not of limitation, the player interface unit 200 may be configured to include a "HELP" button in the game client that also dispatches a signal to the POS to notify the operator that the player is requesting assistance. The player interface unit 200 may also be configured to include a text-to-speech functionality to aid a visually impaired player. Additionally, the player interface unit 200 may include a gaming application that downloads files, decompresses the downloaded files if they have been compressed, and caches all assets inside the player interface unit 200. The player interface unit 200 supports dynamic updates without the need to update the game client itself.

Referring now to FIG. 1 and FIG. 2, the mobile gaming sub-system 102 is communicatively coupled to a plurality of authorized mobile devices 112 such as illustrative player interface unit 200 presented in FIG. 2. In one illustrative embodiment, the mobile gaming sub-system 102 receives a registration input for a game session from the illustrative player interface unit 200. In another illustrative embodiment, the mobile gaming sub-system 102 receives the registration input for a game session from a plurality of authorized mobile devices 112, which may be disposed at one or more venues as presented in FIG. 1.

Registration input may be a player input in the form of a code input by the player at the player interface unit 200. The code may be associated with a ticket providing entry to a stadium venue or event occurring at the stadium venue, such as a football game, baseball game, soccer game, hockey game, basketball game, monster truck rally, music concert, or any other similar event. The ticket code may also be scanned/read by the player interface unit 200, thereby automating player registration.

In other embodiments, registration input may be generated by a tournament game application operating on a player interface unit 200 that is automatically transmitted to the centralized gaming system 100. In these embodiments, the player registration code is inherent to the tournament game application or the particular player interface unit 200 operated by the player, such as through login information collected by the player interface unit 200 or the tournament game application. The registration information collected by the mobile gaming sub-system or the centralized gaming system from the tournament game application running on the player interface unit 200 may include player account information, such as a player loyalty account associated with a venue or a casino property.

The illustrative player interface unit 200 presents a user interface on touch screen 208 that shows a plurality of game content associated with different types of game sessions. In the illustrative embodiment, the player interface unit 200 may also accept player inputs that are associated with a game session. The game session may perform various operations as described in further detail below.

In the illustrative embodiment, the video presentation sub-system 104 is communicatively coupled to the mobile gaming sub-system 102, the video presentation client 116, and the stationary monitors 110 disposed in the different venues. The video presentation sub-system 104 generates entertainment output associated with ongoing activity in the mobile gaming system.

One or more of the stationary monitors 110 then receives the entertainment output generated by the video presentation sub-system 104. The stationary monitors 110*a*, 110*b* and 110*c* then proceed to display the entertainment output generated by the video presentation sub-system 104.

In the illustrative embodiment, a first plurality of authorized devices 112*a* associated with a first venue 108*a* includes a first stationary monitor 110*a* and first video presentation client 116*a*. Additionally, a second plurality of authorized mobile devices 112*b* associated with a second venue 108*b* includes a second stationary monitor 110*b* and second video presentation client 116*b*. The first stationary monitor 110*a* and the second stationary monitor 110 are both communicatively coupled to video presentation sub-system 104. The video presentation sub-system 104 may have stored thereon an entertainment output, such as a video, that is associated with gaming activity. The video presentation sub-system 104 communicates the output, e.g., video, to the first stationary monitor 110*a* and the second stationary monitor 110*b* via the video presentation client 116*a* and 116*b*, respectively.

By way of example and not of limitation, for an illustrative bingo tournament game that includes a bingo game session, the various stationary monitors 110*a*, 110*b* and 110*c* may present a bingo video related to the bingo tournament game. Thus, a plurality of different authorized mobile devices 112 from different venues 108 can participate in the bingo tournament game and share a similar video experience. The bingo tournament game may be a blackout bingo tournament game comprising a tournament game session, where the tournament game session includes a game session for each registered player, such as a single bingo card. In blackout or coverall bingo, each game session continues until all spaces on the bingo card are covered by called numbers. A player wins when the last number of their bingo card is called. More specifically, a player wins a blackout bingo tournament when all other player's bingo cards are covered by called bingo numbers and the single remaining player has at least one space of their bingo card uncovered.

Figure 3:
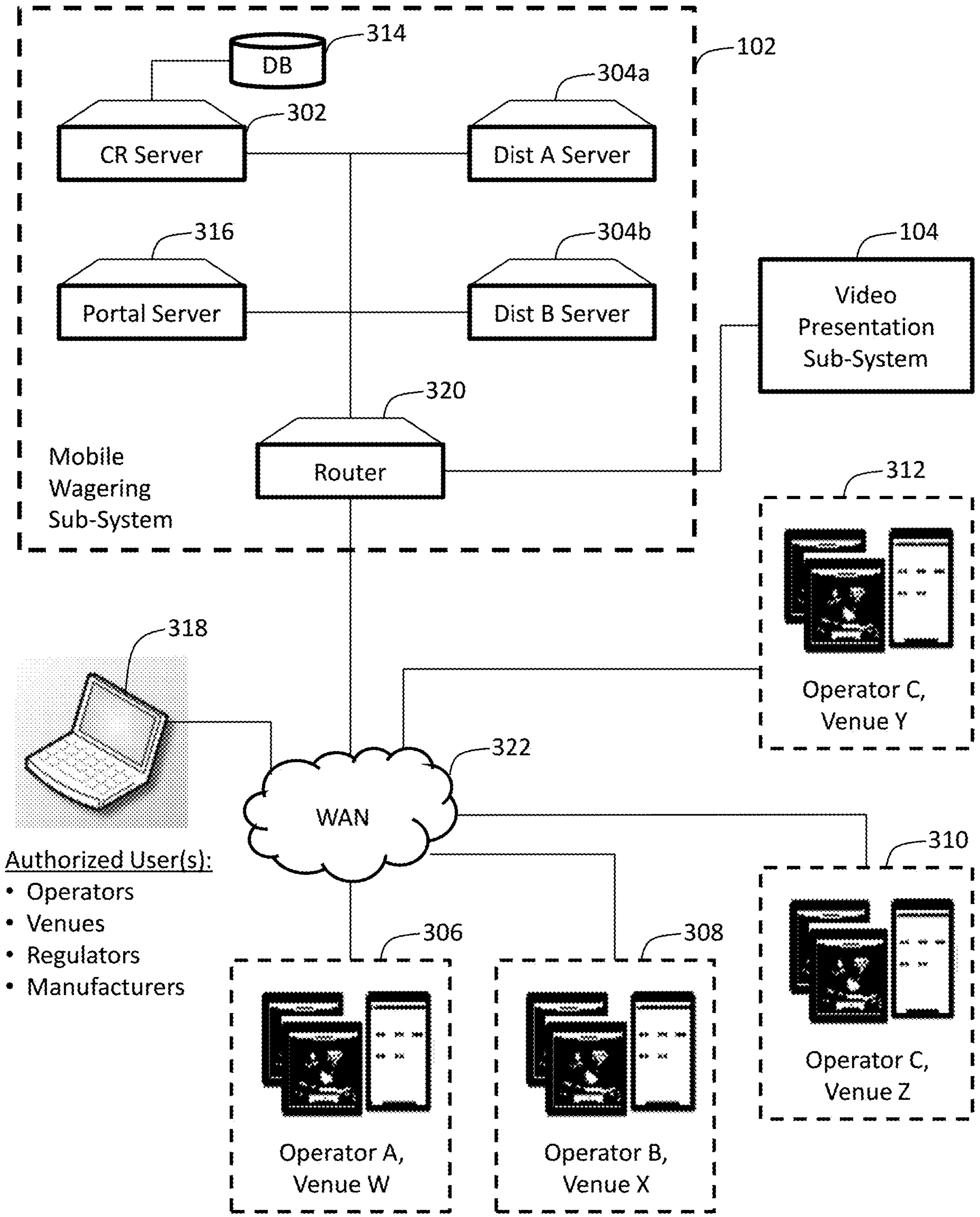
FIG. 3 shows detail of the mobile gaming sub-system (MGS).

Referring to FIG. 3, there is shown further detail for the mobile gaming sub-system 102 communicatively coupled to different venues. In an illustrative embodiment, the mobile gaming system functionality is distributed on multiple servers, including those that provide database 314 functionality. The illustrative mobile gaming sub-system 102 includes a centralized resource server 302 or centralized manufacturer server that performs as a coordinating entity for system operation and maintains authority over game operations controlled by the centralized gaming system 100. The mobile gaming sub-system 102 also includes a distributor server 304 that is communicatively coupled to the centralized resource server 302.

In the illustrative embodiment presented in FIG. 3, a first distributor server 304*a* and second distributor server 304*b* are also communicatively coupled to the centralized resource server 302. Each of the illustrative distributor servers is configured to manage and control the game operations and cashier operations performed at a set of venues that are associated with a distributor who is responsible for sales and support of a multiplicity of venues.

For example, a first set of venues 306 and 308 are configured to communicate with first distributor server 304*a*, which manages and controls the game operations at venues 306 and 308. Additionally, for a second set of venues 310 and 312 are configured to communicate with the illustrative second distributor server 304*b* that manages and controls the game operations at venues 310 and 312. Thus, multiple venues may require additional distributor servers.

A variety of tasks may be performed by the centralized resource server 302. For example, one of the tasks performed by the centralized resource server 302 includes providing a central routing operation for each of the authorized mobile devices 112 so that each authorized mobile device 112 is routed to the proper distributor server 304*a* or 304*b* upon activation of each authorized mobile device. By way of example and not of limitation, the first request generated by a player interface unit 200 may direct the player interface unit 200 to an illustrative distributor of the player interface unit 200.

Additionally, the centralized resource server 302 may be configured to provide a central routing operation for cashier authentication. Thus, a cashier device may be authenticated by the appropriate distributor server 304, which may then forward an authentication to an illustrative mobile device distributor.

The centralized resource server 302 may also be configured to operate as a central authority for generation of finite decks of predetermined electronic pull-tab results.

Furthermore, the centralized resource server 302 may be configured to manage and control financial information. The centralized resource server 302 may include a centralized database 314 that stores data generated by the cashiers, authorized mobile devices, and the various venues. The centralized database 314 provides a central repository for accounting data, game play data, system configuration data, and other such data types.

The illustrative distributor servers 304 are communicatively coupled to the centralized resource server 302. Each of the distributor servers 304 may be configured to manage finances for the player accounts that are associated with the authorized mobile devices. Additionally, the illustrative distributor servers 304 may be responsible for generating logs and reports required for the POS devices. Furthermore, the illustrative distributor servers 304 may be configured to manage game play operations, wagers, and prizes. Further still, the illustrative distributor servers 304 may manage cashier operations including customer sales and redemptions. Further yet, the distributor servers 304 may be configured to maintain the financial status for the authorized mobile devices, including the actual credit balance on each player device.

In an alternative embodiment, the operations performed by the centralized resource server 302 and the distributor server 304 may be performed by a centralized resource software module (not shown) and a distributor software module (not shown) that may be associated with a client-server architecture, a distributed architecture, a peer-to-peer architecture, a hierarchical architecture, a "cloud" architecture, or any combination thereof.

The mobile gaming sub-system 102 may also include an illustrative web portal server 316. The web portal server 316 provides a web interface to access system accounting and operational data, as well as to maintain and configure the system. The web portal server 316 is configured to support creating, editing, and removing entities like distributors, operators, venues, cashiers, devices, game parameters and others as required. All actions performed on the portal are logged for auditing purposes. This action log can be access on the portal itself if the user has the necessary system privilege.

By way of example and not of limitation, the web portal server may be accessed from personal computers or tablet devices 318 over the internet. Authorized users having "administrator" privileges may access system reports and controls based upon their operational needs and organizational affiliation. The web portal server 316 supports a variety of different authorized users having different roles with different levels of access to the mobile gaming sub-system 102. For example, the web portal server may be configured to support the following roles: regulator, manufacturer, distributor with access to multiple operators, operator with access to multiple venues, a particular venue, a particular cashier, and other such preconfigured roles.

An illustrative router 320 is disposed within the mobile gaming sub-system 102. The router 320 is communicatively coupled to a wide area network 322, e.g., the Internet, which is communicatively coupled to the various venues and authorized users. Additionally, the illustrative router 320 is communicatively coupled to the portal server 316, the video presentation sub-system 104, each distributor server 304 and the centralized resource server 302. The router 320 forwards data packets to the appropriate server, network, internet appliance, sub-system, and other such destination. Additionally, the router 320 may include a firewall that supports secure communications with the mobile gaming sub-system 102.

Furthermore, the router 320 may include or be communicatively coupled to a plurality of access points that may further include regulated access points and unregulated access points. Many venues may only operate a limited number of regulated gaming devices. However, the same venues may operate an unlimited number of unregulated gaming devices. Regulated gaming devices, e.g., regulated tablet devices, connect to the regulated access points. Unregulated gaming devices such as unregulated personal mobile devices connect to unregulated access points.

Figure 4:
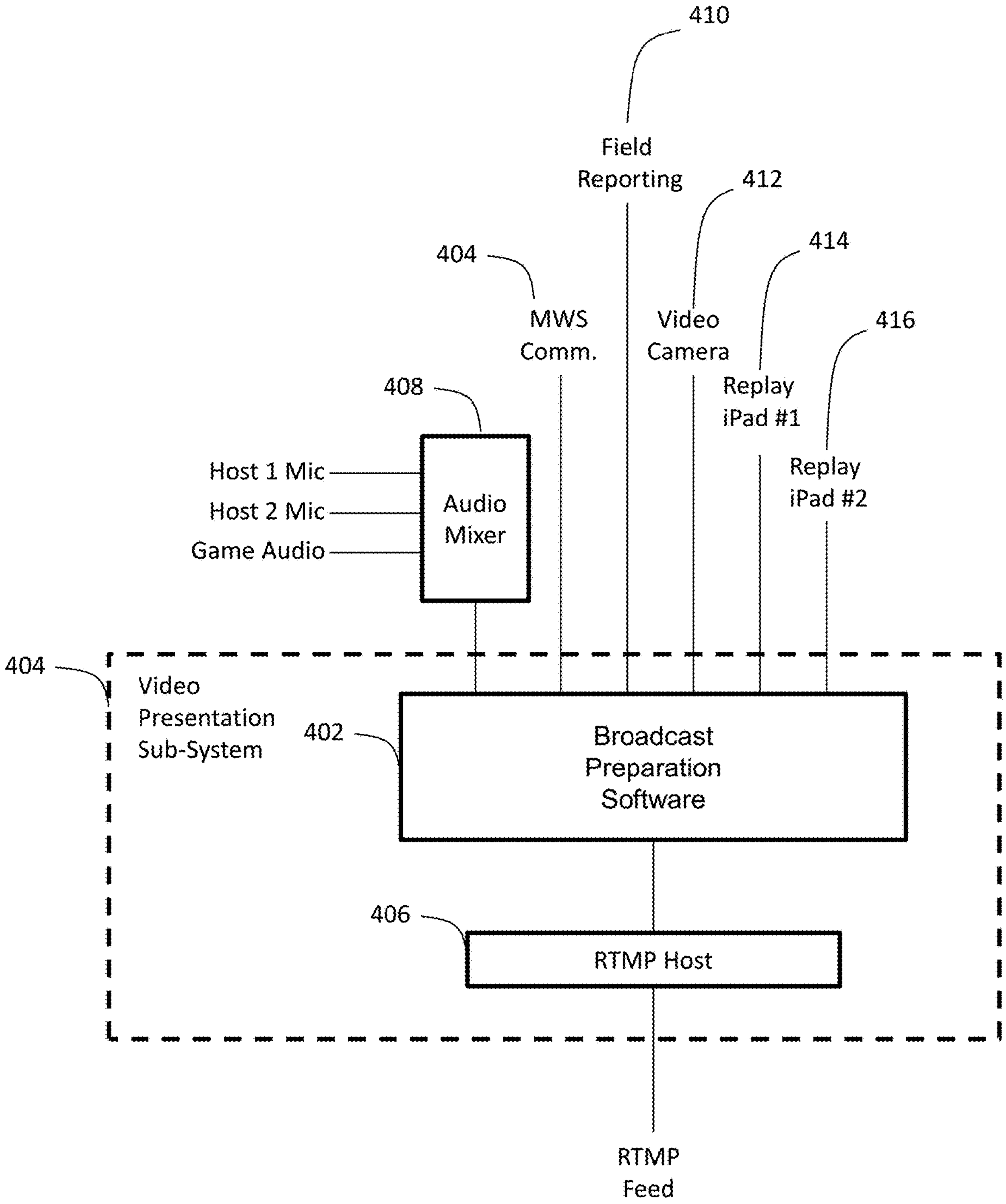
FIG. 4 shows an illustrative video presentation system (VPS).
Figure 5:
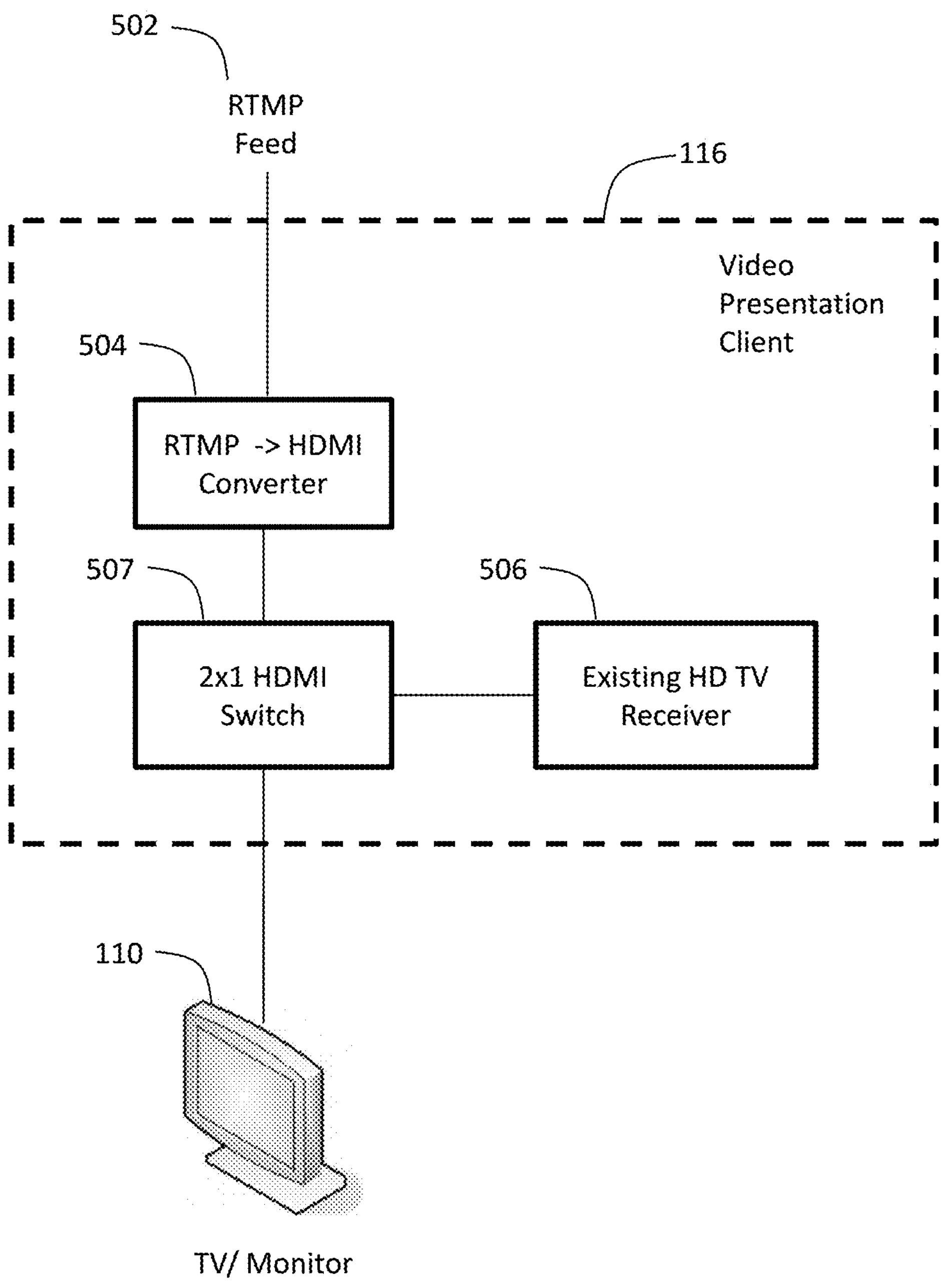
FIG. 5 shows a more detailed view of an illustrative video presentation sub-system (VPS) client.

Referring to FIG. 4, there is shown an illustrative Video Presentation System (VPS). In the illustrative embodiment, the video presentation system (VPS) 104 delivers television content to venues communicatively coupled to the centralized gaming system 100 shown in FIG. 1. The illustrative VPS 104 is communicatively coupled to a VPS client 116, which is also shown in FIG. 5 below.

By way of example and not limitation, the VPS 104 may be associated with linked bingo tournament (LBT) games. This content presented on illustrative monitors 110 (shown in FIG. 1) complements the game experience on the authorized mobile devices 112. Additionally, the content presented on monitors 110 is configured to involve other patrons at participating venues who are not participating in the games. This may create a social gaming environment that may appeal to a broad spectrum of players.

The illustrative VPS 104, shown in FIG. 4, includes a plurality of inputs that the system may incorporate into broadcast content. For example, communications with the mobile gaming sub-system 102 may include a data feed generated by the mobile gaming sub-system 102, which provides real time data on the status of an illustrative tournament. The illustrative data feed may include player names, player scores, remaining plays for player game sessions, time remaining in the tournament, prize values and other such tournament information.

A broadcast preparation software module 402 is configured to integrate a plurality of inputs into a broadcast data stream. In the illustrative embodiment, the integration is performed by a suite of commercial products such as Open Broadcaster™, Quicktime™ and proprietary software products. The tasks performed by the broadcast preparation software module 402 includes formatting an illustrative mobile gaming sub-system data feed 404. Note, the mobile gaming sub-system data feed 404 is generated by the mobile gaming sub-system 102. The mobile gaming sub-system data feed 404 includes information such as the tournament leader information, which can be converted into an easily readable display format.

For example, the mobile gaming sub-system data feed 404 may be transmitted over the Internet to a Real Time Messaging Protocol (RTMP) host 406, which may then transmit the data signal from the illustrative RTMP host 406 using an RTMP protocol over the Internet to the illustrative VPS client 116. In addition to RTMP, the system also supports HTTP Live Streaming (HLS), MPEG-DASH or Secure Reliable Transport (SRT)

The broadcast preparation software module 402 may also be configured to interface with an illustrative audio mixer 408, which accepts a variety of audio feeds. The illustrative audio feeds received by the audio mixer 408 include host microphones and audio from selected live game play; a wide variety of such devices are commercially available. Additionally, the broadcast preparation software module 402 is configured to provide live field reporting 410 from game locations using a tool such as Facetime™. Live field reporting 410 may add excitement to the broadcast. Furthermore, the broadcast preparation software module 402 is configured to interface with various video signals that include studio video cameras 412 and live images corresponding to those displayed on the illustrative authorized mobile device, which are replayed as feed 414 and feed 416.

Referring to FIG. 5, there is shown a more detailed view of an illustrative video presentation sub-system (VPS) client 116. In the illustrative embodiment, the VPS client 116 is communicatively coupled to the video presentation sub-system 104 via an illustrative wide area network, e.g., Internet, and a local wireless connection, e.g., local Wi-Fi. The illustrative RTMP feed 502, which is generated by the RTMP host 406, is received by the VPS client 116. The VPS client is also operationally coupled to the illustrative stationary monitor 110.

The RTMP feed 502 is received at an illustrative venue and the RTMP feed 502 is routed to the VPS client 116. By way of example and not of limitation, the RTMP feed 602 is communicated using a dedicated and secure Wi-Fi channel. In the illustrative embodiment, the RTMP feed 502 includes a streaming video data stream, which is converted to a video display signal. For example, the RTMP feed may be converted to an HDMI video signal with an RTMP/HDMI converter 504. For example, the RTMP/HDMI converter 504 may be implemented with special purpose firmware inside an embedded computing element, such as a Raspberry PI™. The resulting video signal generated by the RTMP/HDMI converter 504 is then sent directly to a compatible television or sent to the television using a commercial 2×1 switch 507, such as the Fosman 8024™, which may also be coupled to an existing HDTV data source such as receiver 506.

The illustrative converted HDMI video signal is then presented on the stationary monitor 110. This allows for a variety of installation models. Where there is a television dedicated to use with the VPS the output of the special purpose RTMP/HDMI converter 504 may be left permanently connected to the television or stationary monitor 110. If the television is used for different purposes at different times the data feed to the television can be switched on or off with the introduction of the 2×1 HDMI switch 507, allowing normal use of the television when the VPS data feed is not in use.

The centralized gaming system 100 described in FIG. 1 through FIG. 5 supports a variety of different types of games and game play. For the illustrative mobile gaming sub-system 102, a game session is initiated after a player registration is received and the game session ends when game play is completed, when a prize is awarded, or according to any other predetermined game mechanic that reflects the game session has ended.

A variety of different game mechanics may be associated with each game session. For example, a tournament game awarding a limited number or prizes may present player rankings for prizes awarded to the ranked players.

The player rankings may then be presented on one or more of the authorized mobile devices 112. Additionally, the player rankings may result in the video presentation sub-system 104 generating a player rankings game session output that is presented on the stationary monitors 110.

Figure 6:
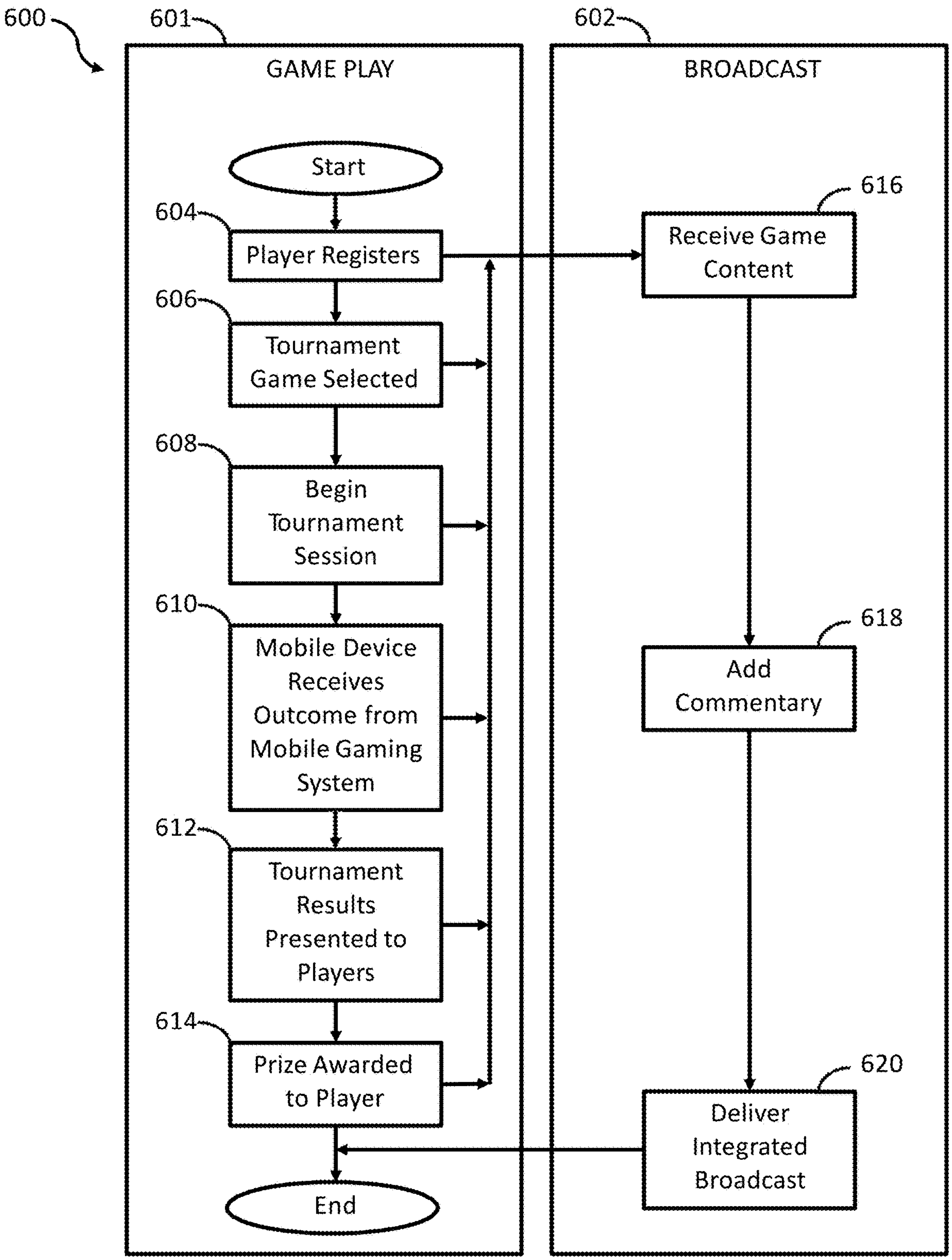
FIG. 6 shows an illustrative promotional gaming method that describes the various steps performed by a player interacting with the promotional gaming system and the various steps simultaneously performed by the VPS during the player interaction.

Referring to FIG. 6, there is shown an illustrative centralized gaming method comprising a series of game play steps 601 that describe the various steps performed by a player interacting with the centralized gaming system and a series of broadcast steps 602 that describe the steps performed by the centralized gaming system during game play. The illustrative centralized gaming method 600 begins with the game play steps 601 at block 604 where an illustrative player enters one of the venues and uses an illustrative player interface unit 200 to register for a tournament game session with the centralized gaming system 100. Player registration may require player input in the form of a code input by the player at the player interface unit 200. The code may be associated with a ticket providing entry to a stadium venue or event occurring at the stadium venue, such as a football game, baseball game, soccer game, hockey game, basketball game, monster truck rally, music concert, or any other similar event. The ticket code may also be scanned/read by the player interface unit 200, thereby automating player registration.

In other embodiments, player registration may occur automatically when the player opens a tournament game application on the player interface unit 200. In these embodiments, the player registration code is inherent to the tournament game application or the particular player interface unit 200 operated by the player, such as through login information collected by the player interface unit 200 or the tournament game application. The registration information collected by the mobile gaming sub-system or the centralized gaming system from the tournament game application running on the player interface unit 200 may include player account information, such as a player loyalty account associated with a venue or a casino property.

Player registration for the tournament game session may be limited to a registration time period, such as prior to the scheduled start time for event occurring at the venue, i.e., scheduled kickoff for a football game, scheduled puck drops for a hockey game, scheduled tip off for a basketball game, etc. The registration time period may also include a starting time, such as a time at which the venue opens for the event or for the business day.

Upon completing player registration for a tournament game, the method then proceeds to block 606 where one or more tournament games are presented to the player on the player interface unit 200. The player may then select the tournament game(s) which the player desires to enter, such as a stadium wide blackout bingo game. The player selection of a tournament game type may require player input, such as selecting an icon on a touch screen of the player interface unit 200 or may be automated where only a single tournament game type is available to the player based on location or player registration.

At block 608, the tournament game session is initiated, and an associated game session is displayed on the player interface unit that is specific to that player interface unit 200. Thus, the tournament game session comprises a plurality of game sessions that are each particular to a registered player and their player interface unit 200. Further, each game session may comprise a bonus game session that is triggered during the game session, or the bonus game session may be a prize awarded to a player as a result of game play during the game session, and therefore occurs after the game session. In the blackout bingo embodiment, the game session displayed on the player interface unit includes a bingo card. The bingo card displayed on a given player interface unit 200 corresponds to a bingo card issued to the associated authorized mobile device 112 by the mobile gaming sub-system 102. The mobile gaming sub-system generates all bingo cards and associates at least one bingo card with each registered player. The game displayed may further include a list of previously called bingo numbers, a currently called bingo number, a number of players entered in the tournament game, a number of players remaining in the tournament game session, a time remaining in the tournament game session, and a prize structure for the tournament game session.

By way of example and not of limitation, the player may initiate the tournament game session by pressing a PLAY button, which is an illustrative game input received by the authorized mobile device 112.

At block 610, game outcomes for each game session associated with each player interface unit 200 are determined centrally by the mobile gaming sub-system 102 or the centralized gaming system 100 and communicated from the mobile gaming sub-system 102 to each player interface unit 200, i.e., the illustrative authorized mobile devices 112. In the exemplary blackout bingo tournament game session, the mobile gaming sub-system randomly generates a bingo number, communicates that bingo number to each authorized mobile device 112 associated with a registered player remaining in the bingo tournament game session. In some embodiments, the mobile gaming sub-system 102 also updates each registered player's bingo card and communicates the update to each authorized mobile device so that each player interface unit 200 presents the updated bingo card to the player associated with the bingo card. In other embodiments, the mobile gaming sub-system 102 simply communicates each called bingo number to a plurality of authorized mobile devices 112, which each update the bingo card(s) associated with the registered player using the particular authorized mobile device and communicate these updated bingo cards to the mobile gaming sub-system.

In the illustrative blackout bingo example, the mobile gaming sub-system periodically communicates randomly determined bingo numbers to each authorized mobile device associated with a registered player. Thus, the mobile gaming sub-system 102 may communicate a randomly determined bingo number every minute, 5 minutes, 10 minutes, 30 minutes, hour, or other appropriate time. When the blackout bingo tournament game is provided at a stadium venue, the mobile gaming sub-system 102 may communicate a randomly determined bingo number at the end of each song played by an event performer, during each commercial break of a televised professional sporting event, or during any other pause/break during the event occurring at the stadium.

In other embodiments, the authorized mobile device 112 is configured to present animations and other results associated with the tournament game session. The authorized mobile device 112 may also include an updated accounting of prize amounts awarded.

At block 612, after communicating the game outcomes to each authorized mobile device associated with the registered players the mobile gaming sub-system determines a tournament result and presents that result to the registered players. The tournament result may be communicated to the VPS 104 and displayed on a stationary monitor 110 at the stadium venue 108. Simultaneously, or alternatively, to communication and display of the tournament results by the VPS, the tournament results may be communicated to each authorized mobile device 112 and presented on the authorized mobile devices to the associated registered player. After the tournament game session is completed, the player can return to the game menu at any time and select a different game to play. The tournament game session may complete/terminate at the conclusion of a set time, at the occurrence of an event at the venue, i.e., expiration of game time (such as the end of the fourth quarter of a football game, or at the end of over time), upon completion of all game sessions, upon occurrence of a particular game event, or some other appropriate occurrence. Thus, the tournament game session is active/operable for a duration of time that may be defined by a starting time/event and a terminating time/event. In the blackout bingo tournament game embodiment, the tournament game session terminates when only a single game session remains active, or in the event of a tie (more than one game session reaches blackout/covers all bingo card spaces upon the calling of one bingo number) when no game sessions remain active. In another embodiment, the tournament game session terminates when all prizes have been awarded.

At block 614, one or more prizes may be awarded to one or more registered players according to the tournament results. The tournament results may satisfy a tournament requirement, such as all but one game sessions terminated, i.e., only one remaining active game session. The tournament results may include where one player has the greatest number of game points or a specified number of game points. The prize(s) may be awarded according to a prize structure. The prize structure may include a single prize to be awarded to a winner of the tournament game session, or multiple prizes of tiered value to be awarded to more than a single winner of the tournament game session based upon a player ranking in the tournament game. The player ranking may be accumulated points or length of gameplay, such as for the blackout bingo tournament game session. For example, the last remaining player in a blackout bingo tournament session may receive the highest tiered prize, while one or more players that blacked out their bingo cards on the last called bingo number receive a second highest tiered prize, and one or more other players that blacked out their bingo cards on the second to last called bingo number receive a third highest tiered prize.

In one embodiment, the mobile gaming subsystem 102 determines a prize result and a graphic representation (or representations) of the prize result. Additionally, the mobile gaming sub-system 102 logs the transaction, updates database game information, and updates an accounting module to reflect the player winnings corresponding to the tournament game session. Furthermore, the mobile gaming sub-system 102 sends a response message (or messages) to the authorized mobile device specifying the information to be displayed and the new value of an associated player account.

Simultaneous with the game play steps 601, the broadcast steps 602 are performed by the centralized gaming system 100. Beginning with player registration, at block 616 the mobile gaming sub-system 102 communicates game content, such as player names, to the video presentation sub-system 104, which organizes the received name information to compile a leader board and thus provide game play topics for commentators to discuss. At block 618, this discussion and organized player/game information, such as the leader board, are combined into an integrated broadcast as described above. At block 620, the integrated broadcast is communicated to the authorized mobile devices 112 and stationary monitor 116 via a private network, where the integrated broadcast is subsequently displayed.

As described above a stationary monitor 110 is communicatively coupled to the video presentation sub-system 104 via the video presentation client 116. The stationary monitor client is configured to receive and present the game session output generated by the video presentation sub-system. In one illustrative embodiment, the video content is designed to provide enhanced content to the players and to increase the interaction between the players and the games. Additionally, the video content adds interest and excitement to the games. In addition to game-specific content, such as broadcasting a live tournament, the system can be used for a multitude of purposes, including, but not limited to, announcements and pictures of winners, informational videos about sponsoring charities, announcements of new games and upcoming events, advertising, etc.

Game content and information, such as an updated leader board, number of players remaining, time to next calling of a bingo number are communicated from the mobile gaming sub-system 102 to the VPS 104 at each step of game play. This continual communication pipeline between the mobile gaming sub-system 102 and the video presentation sub-system 104 allows for continual updating of the integrated broadcast and provides dynamic game play/content for commentators to discuss.

Figure 7:
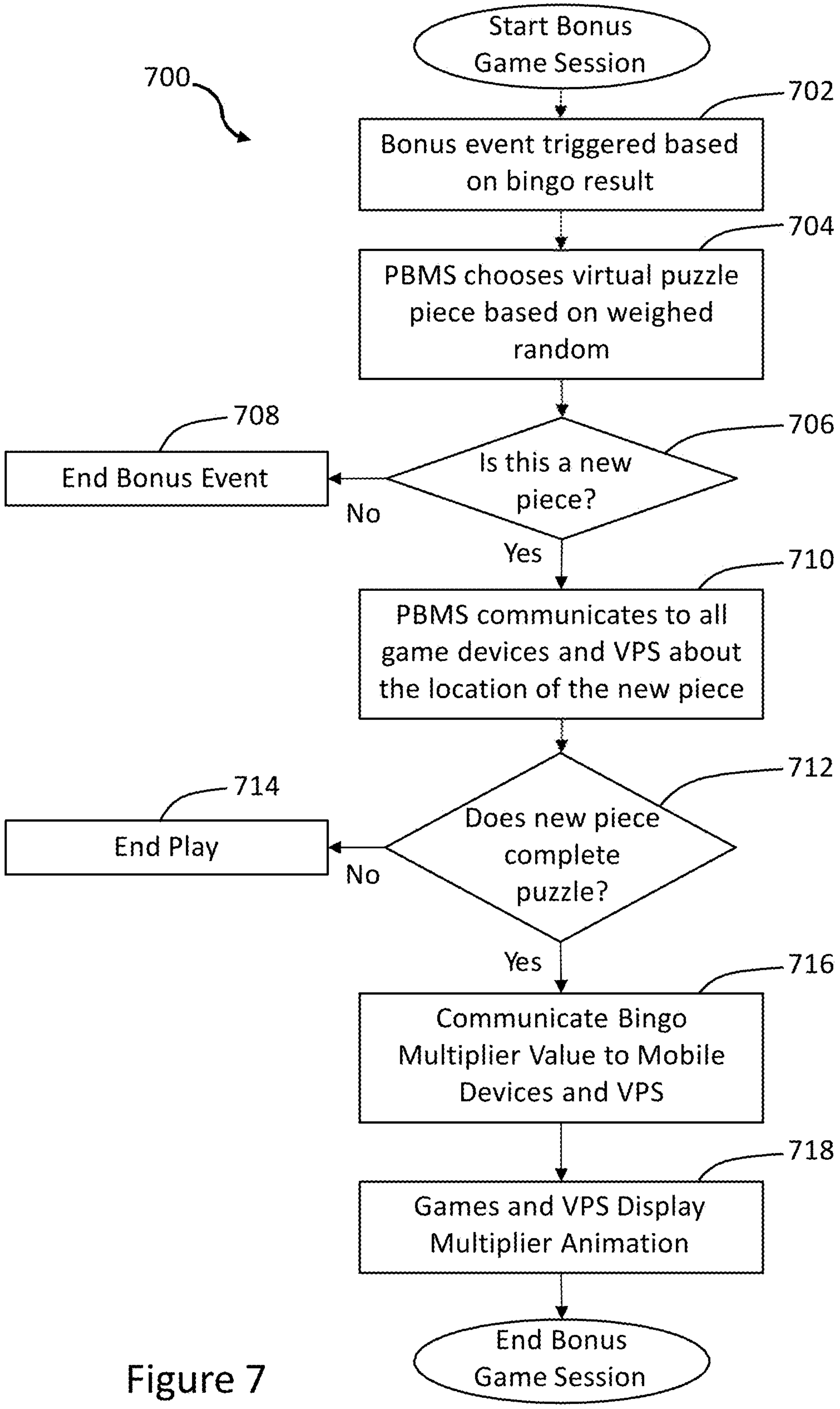
FIG. 7 shows an illustrative bonusing method for promotional bingo tournaments.

Referring now to FIG. 7 there is shown a flow chart for an illustrative bonusing method 700 for promotional bingo tournaments. The method 700 begins at block 702 when one or more players begin play of a base game in a bingo tournament and one of the players triggers a bonus game event based upon a bingo game session result, i.e., a triggering event occurs. The bonus game event is one element of a bonus game session shared by all players participating in the promotional bingo tournament. The bonus event may include the player receiving a virtual puzzle piece that is part of a virtual puzzle, as shown and described in more detail below in FIGS. 8A-C. In this embodiment, the bonus game session begins with an entirely unrevealed virtual puzzle and ends with either the revelation of all portions of the virtual puzzle or completion of the bingo tournament session. However, in other embodiments, the bonus game session continues from one tournament bingo session to another tournament bingo session so long as at least one portion of the virtual puzzle remains unrevealed. Each portion of a virtual puzzle corresponds to one (1) virtual puzzle piece. The virtual puzzle is a shared bonus element where the virtual puzzle pieces received by each player in the promotional bingo tournament are applied to the shared virtual puzzle.

At block 704 a Promotional Bonus Multiplier Server (PBMS) selects the virtual puzzle piece from a pool of virtual puzzle pieces. The selection may be made according to a weighted random draw, where each puzzle piece may have the same likelihood of being drawn as every other puzzle piece, each puzzle piece may have a different likelihood of being drawn from every other puzzle piece, or any combination thereof. The following table provides exemplary weighted averages for eight (8) virtual puzzle pieces that form a cohesive image and an eight-piece virtual puzzle.

| Virtual Puzzle Piece ID | Weighted Average |
|---|---|
| Piece 0 | 10 |
| Piece 1 | 10 |
| Piece 2 | 15 |
| Piece 3 | 15 |
| Piece 4 | 15 |
| Piece 5 | 15 |
| Piece 6 | 10 |
| Piece 7 | 5 |
| Piece 8 | 5 |

In the illustrative embodiment, each time a player triggers the bonus game event, a virtual puzzle piece is pulled from the virtual pool based on the weighted averages presented in the table above. The weighted averages provided above indicate that during each random selection there is a 10% chance of selecting Piece 0, a 10% chance of selecting Piece 1, a 15% chance of selecting Piece 2, a 15% chance of selecting Piece 3, a 15% chance of selecting Piece 4, a 15% chance of selecting Piece 5, a 10% chance of selecting Piece 6, a 5% chance of selecting Piece 7, and a 5% chance of selecting Piece 8. All virtual puzzle pieces are always available/possible for selection and selecting/removing a virtual puzzle piece in response to a triggering event does not alter or change the odds of selecting either that same virtual puzzle piece or a different virtual puzzle piece in a future selection event.

In another embodiment, an alternate virtual puzzle piece selection algorithm is employed that causes virtual puzzle pieces to be selected based in part upon the portions of the virtual puzzle that have already been revealed. A straight weighted average as described above may not result in exciting play as the bonus game session proceeds and fewer portions of the virtual puzzle remain hidden or unrevealed. For example, when there is only one (1) piece left to reveal, many bonus events will select and show a virtual puzzle piece that has already been revealed. This potential for repetition of a failure to reveal a new virtual puzzle piece may be unappealing to players. In the alternate selection algorithm, upon the occurrence of a triggering event in a base game session the PBMS performs an initial determination of whether the virtual puzzle piece to be selected and revealed will be selected from a pool of previously revealed virtual puzzle pieces or from a pool of unrevealed virtual puzzle pieces. This initial determination is made according to a weighted random event, the weighting of this random event can change or be modified based upon the number of virtual puzzle pieces previously revealed, the number of virtual puzzle pieces remaining hidden, or the number of previous selection events that did not reveal a new virtual puzzle piece and thereby advance the bingo game session. The table below provides exemplary weights for selecting from the pool of unrevealed virtual puzzle pieces based upon the number of virtual puzzle pieces previously revealed.

| Pieces Revealed | Pieces Available | Probability of revealing a new piece |
|---|---|---|
| 0 | 8 | 100% |
| 1-2 | 6 or 7 | 50% |
| 3+ | 5 or less | 25% |

In an exemplary embodiment of this alternate virtual puzzle piece selection algorithm, the virtual puzzle comprises eight (8) virtual puzzle pieces. When the virtual puzzle is completely hidden and none of the eight (8) virtual puzzle pieces have been revealed, the algorithm may weight the random determination of whether a virtual puzzle piece is selected from the pool of unrevealed virtual puzzle pieces or from the pool of revealed pieces so that a virtual puzzle piece is selected from the pool of unrevealed virtual puzzle pieces, i.e. 100% weighting for the pool of unrevealed virtual puzzle pieces and 0% for the pool of revealed virtual puzzle pieces. When there are six (6) or seven (7) virtual puzzle pieces still unrevealed, the algorithm may weight the random determination so that there is 50% chance of selecting from the pool of six (6) or seven (7) unrevealed virtual puzzle pieces thereby revealing a new portion of the virtual puzzle, and there is a 50% chance of selecting from the pool of one (1) or two (2) previously revealed virtual puzzle pieces thereby not revealing a new portion of the virtual puzzle. When there are five (5) or fewer virtual puzzle pieces still unrevealed, the algorithm may weight the random determination so that there is a 25% chance of selecting from the pool of five (5) or fewer unrevealed virtual puzzle pieces thereby revealing a new portion of the virtual puzzle, and there is a 75% chance of selecting from the pool of three (3) or more previously revealed virtual puzzle pieces thereby not revealing a new portion of the virtual puzzle.

When a player triggers a bonus game event based on the result of that player's bingo game session, the PBMS or MGS 102 communicates the updated virtual puzzle to every participating authorized mobile device 112. Additionally, the PBMS or MGS 102 may communicate the updated virtual puzzle to the VPS 104 and to the stationary monitor 110 for display. The stationary monitor 110 and/or each authorized mobile device 112 displays the full puzzle, an animation highlighting the portions of the virtual puzzle that correspond to the virtual puzzle pieces, and either a reveal animation showing where a newly received virtual puzzle piece fits into the virtual puzzle or a separate animation when the newly received virtual puzzle piece is a duplicate of a previously received virtual puzzle piece. This public display of the virtual puzzle in real-time on the stationary monitor 110 provides everyone (both players and non-players) in one or more venues with the ability to participate in the excitement of a bonus game session and each bonus game event.

In some embodiments, the reveal animation includes a cyclic animation where each portion of the virtual puzzle is highlighted by outlining a virtual puzzle piece border on the virtual puzzle with a new color, such as yellow outlining. This highlighting action occurs on only one virtual puzzle piece at a time, pausing on each virtual puzzle piece for a short period of time, i.e., 0.1 seconds, 0.5 seconds, 1 second, 2 seconds, etc. The cyclic animation may highlight each portion of the virtual puzzle corresponding to each virtual puzzle piece in a clockwise sequence or a counterclockwise sequence, thereby simulating a wheel-spin-type animation that creates suspense before the selected virtual puzzle piece is revealed to the players in the animation.

At decision diamond 706, upon selection of a virtual puzzle piece, the PBMS or MGS 102 determines whether the newly selected virtual puzzle piece reveals a previously unrevealed portion of the virtual puzzle or if the virtual puzzle piece is a duplicate of a virtual puzzle piece previously received by any one of the players participating in the promotional bingo tournament. When the PBMS determines that the newly selected virtual puzzle piece is a duplicate, the method proceeds to block 708 where the bonus game event ends, and the player returns to the base bingo game session. When the PBMS determines that the newly selected virtual puzzle piece corresponds to an unrevealed portion of the virtual puzzle, the method proceeds to block 710 where the PBMS communicates the identity and location within the virtual puzzle of the new virtual puzzle piece to each authorized mobile device 112 and the VPS 104. The VPS 104 may further communicate the identity and location within the virtual puzzle of the new virtual puzzle piece to the stationary monitor 110. The information communicated among the PBMS, authorized mobile devices 112, VPS 104, and stationary monitor 110 can include an animation of the virtual puzzle, an animation of the virtual puzzle piece(s), and an animation revealing the location within the virtual puzzle of the new virtual puzzle piece.

After communicating the above virtual puzzle and virtual puzzle piece information from the PBMS to the authorized mobile devices 112 and the VPS 104, and from the VPS 104 to the stationary monitor 110, the method proceeds to decision diamond 712 where the PBMS determines whether the newly received virtual puzzle piece completes the virtual puzzle by fully revealing all portions of the virtual puzzle. When the PBMS determines that the newly received virtual puzzle piece does not complete the virtual puzzle, i.e., because one or more portions of the virtual puzzle remain hidden or unrevealed, the method proceeds to block 714 where the bonus game event ends, and the player returns to the base bingo game session. When the PBMS determines that the newly received virtual puzzle piece does complete the virtual puzzle by fully revealing all portions of the virtual puzzle, i.e., by revealing the last remaining hidden or unrevealed portion of the virtual puzzle, the method proceeds to block 716 where the PBMS awards a mystery point multiplier to each game session associated with the bingo tournament session.

An element of the award process is revealing the value of the mystery point multiplier to each participating authorized mobile device 112. The value may be any value greater than 1, such as a 2×, 3×4×, 5×, 10×, or greater multiplier. While the above listed multipliers are all integer values, these are only exemplary and non-limiting multiplier values. The multiplier values may be non-integer values or any other real number value. The PBMS may apply the revealed mystery point multiplier to a database of points recorded by the PBMS where each record in the database of points corresponds to an authorized mobile device 112, a player, a bingo game session, bingo tournament session, or any combination thereof. Alternatively, the PBMS may issue the revealed mystery point multiplier award to each authorized mobile device 112 participating in the bingo tournament session, and each authorized mobile device 112 then applies the mystery point multiplier bonus award to the points associated with that authorized mobile device 112, player, bingo game session, or any combination thereof. The mystery point multiplier bonus award does not modify the payouts or awards of the tournament bingo session because they are determined by the rank order of the points earned by the participating players in the tournament bingo session, which rank order is not altered by application of the mystery point multiplier bonus award. The mystery point multiplier is applied to all players point totals, increasing those player point totals proportionally. The mystery point multiplier bonus may have the effect of raising the total points earned in a tournament bingo session when the virtual puzzle is completed as compared to a tournament bingo session when the virtual puzzle is not completed, and the mystery point multiplier bonus is not awarded.

After awarding the mystery point multiplier, the method proceeds to block 718 where an animation of the virtual puzzle completion and mystery point multiplier bonus award are presented on each participating authorized mobile device 112 and/or the stationary monitor 110.

Since the virtual puzzle may take several tournament bingo sessions to complete and award the mystery point multiplier bonus, this bonus may entice players to enter a tournament bingo session as the virtual puzzle is approaching completion, i.e., being fully revealed. Each tournament bingo session may follow a previous tournament bingo session immediately, after a short break on the order of minutes or hours, or after a more significant break lasting one or more days, or one or more weeks. As the break period between each tournament bingo session increases, potential players are provided time to analyze the status of the current virtual puzzle, i.e., the percent or portion of the virtual puzzle revealed. Providing this analysis time may entice potential players to enter an upcoming tournament bingo session.

When the virtual puzzle is completed by being fully revealed and the mystery point multiplier bonus has been awarded and applied, the bonus game session ends. A new bonus game session may begin immediately after completion of the previous bonus game session, after a predetermined cool down period, or upon a player participating in an active tournament bingo session triggering a bonus game event. The cool down period may be on the order of minutes, hours, days, or weeks.

The above illustrative bonusing method provides a method of triggering and displaying a bonus result or bonus award across a plurality of authorized mobile devices 112 and/or the VPS 104, and/or a stationary monitor 110. The above illustrative bonusing method further provides a method of awarding all players participating in a tournament bingo session a point multiplier as a result of one or more participating players triggering multiple bonus events. The mystery point multiplier bonus award may be awarded to participating players as a result of one or more participating players triggering multiple bonus events, where the combination of several or all bonus events completes a bonus task, such as fully revealing a virtual puzzle, and where those triggering events may be in the same bingo game session or spread across multiple bingo game sessions.

Figure 8A:
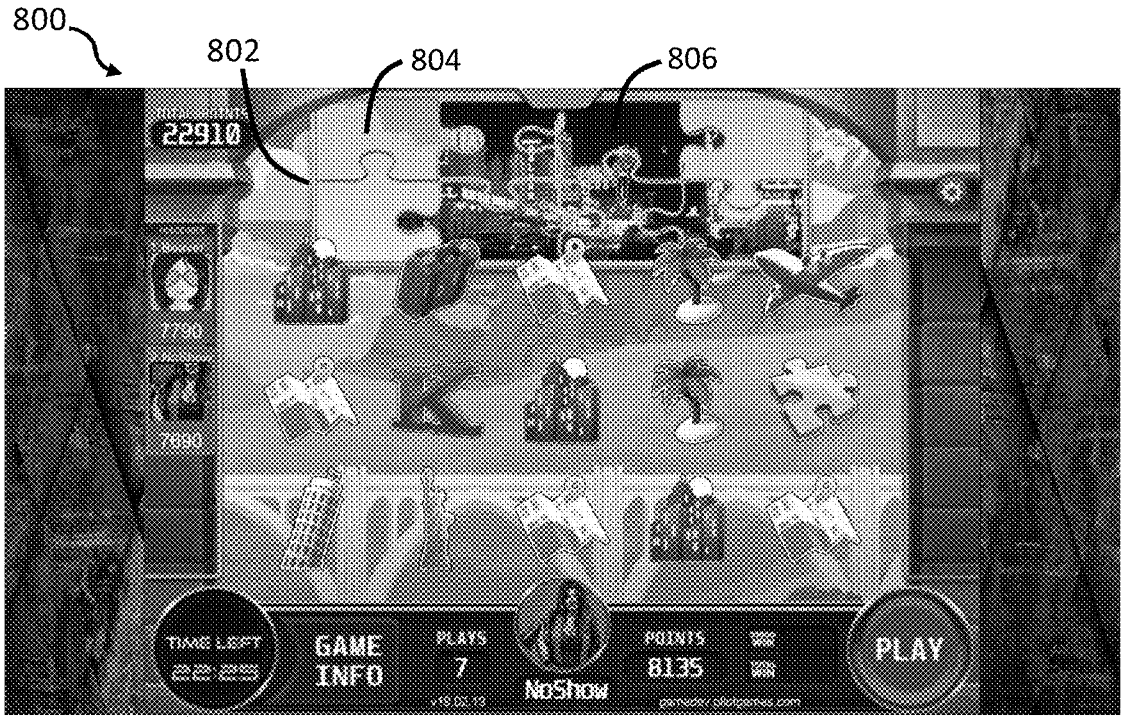
FIGS. 8A-8C show exemplary game screens displaying a virtual puzzle embodiment of a bonus game session in different states of completion.
Figure 8B:
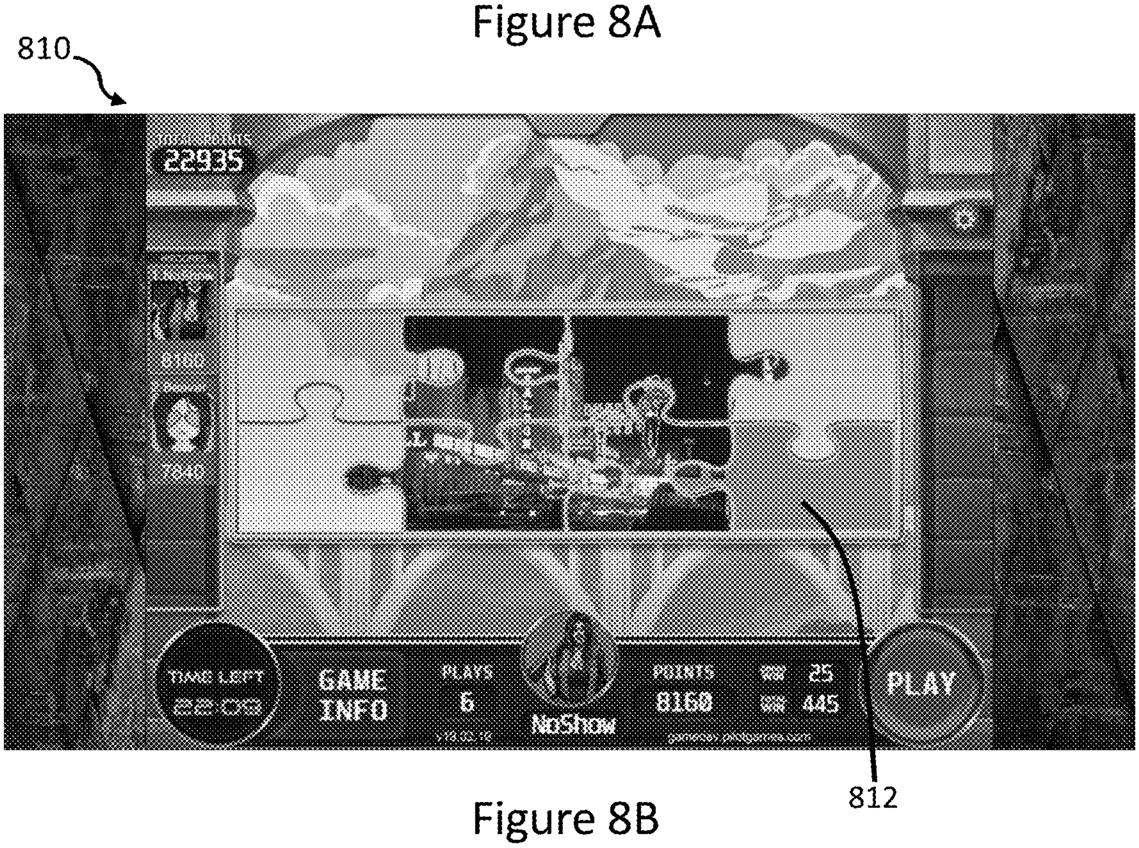
Figure 8C:
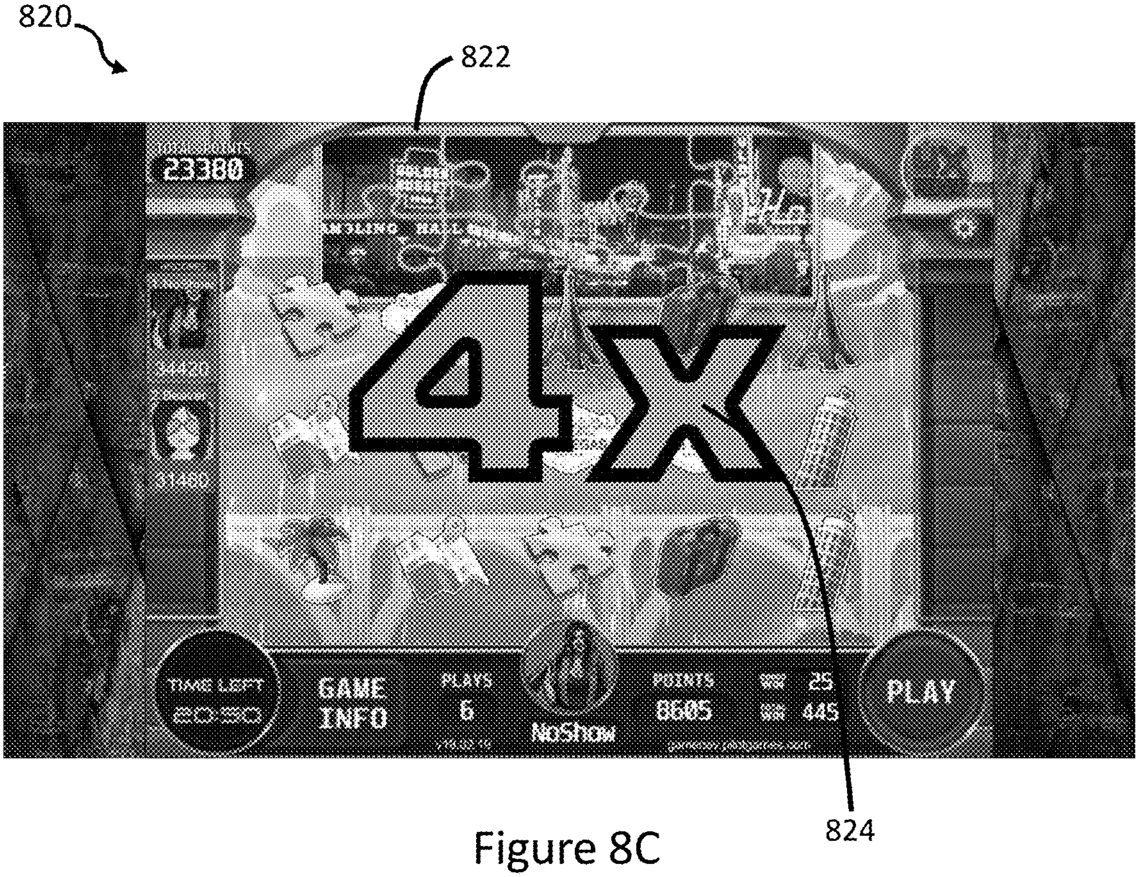

Referring to FIG. 8A through FIG. 8C there are shown exemplary game screens displaying the virtual puzzle in different states of completion. In FIG. 8A, the displayed game screen 800 shows the exemplary virtual puzzle 802 in an incomplete state above the display of the base bingo game. An exemplary unrevealed virtual puzzle piece 804 or portion of the virtual puzzle is shown as a transparent, semi-transparent, translucent, or opaque element. When the unrevealed virtual puzzle piece 804 is shown as transparent, semi-transparent, or translucent, the unrevealed virtual puzzle piece 804 may appear as or present the background screen behind the virtual puzzle 802. An exemplary revealed virtual puzzle piece 806 or portion of the virtual puzzle is shown as displaying a corresponding portion of a picture or other image.

In FIG. 8B, the displayed game screen 810 shows the reveal animation for a virtual puzzle piece. In the animation, a previously unrevealed virtual puzzle piece 812 has changed from the translucent presentation of the background to a green opaque display.

In FIG. 8C, the displayed game screen 820 shows a completed virtual puzzle 822 where each portion of the virtual puzzle has been revealed so that the virtual puzzle 822 shows a cohesive/complete image. The displayed game screen 820 further shows the award of a 4× mystery point multiplier bonus 824 upon completion of the virtual puzzle 822.

Figure 9:
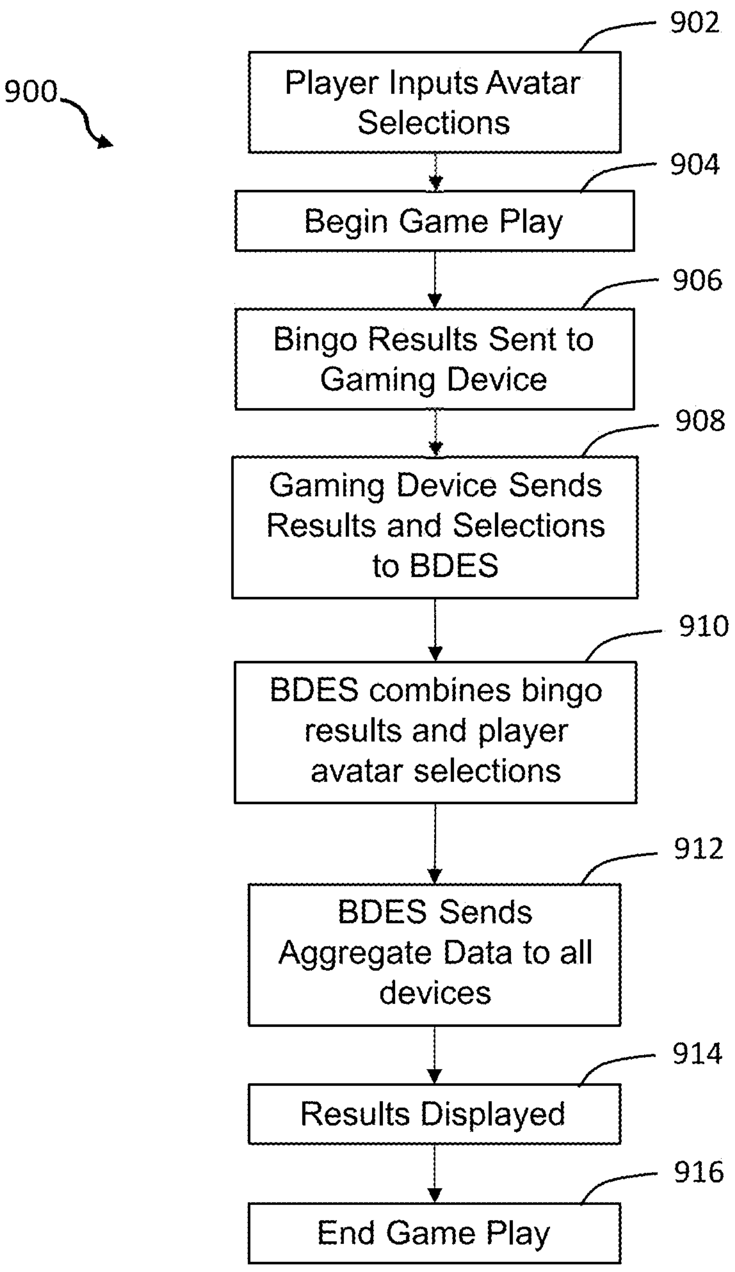
FIG. 9 shows an illustrative method for providing a direction competition representation in a promotional tournament bingo session.

Referring now to FIG. 9, there is shown a flow chart 900 for an illustrative method for providing a direct competition representation in a promotional tournament bingo session. This direct competition representation for a promotional tournament bingo session provides an alternative to the largely anonymous experience of a typical bingo game where players are paired up with one another, balls are drawn one at a time, and the first player to obtain a predefined pattern wins the bingo game without any players knowing who the other player(s) in the game are.

The method 900 begins at block 902, where players input selections on their authorized mobile devices 112 that do not affect the outcome of any ensuing bingo game sessions or tournament bingo sessions. Since these player selections are not necessary for standard game play, they are merely elective and can be bypassed by the player(s). The player input selections may relate to the appearance of an avatar representing the player. The player may select an avatar, one or more pieces of clothing for the avatar, an animation, a player name, an avatar name, and any other identifying characteristics of the avatar. In an exemplary embodiment, optional player selections may be made through a software or application interface on the authorized mobile device 112. The interface receives player input regarding avatar details such as a gender (male, female, other), skin color (white, brown, black, etc.), body type (slim, normal, heavy). Upon making avatar selections, the player may then be prompted to select a particular color or design for shirts, pants, dresses, shoes, etc. from a variety of standard designs and logos. Further, the software application may accept custom requests where players upload particular designs or request the generation of particular designs. The uploaded designs and design requests may be in the form of digital pictures or 3-D models. The 3-D models are particular useful for the submission of a player's likeness. The player may then be prompted to select one or more animations for their avatar. The potential animations that players can select may include dance animations or other animation actions that correspond to the player winning, losing, scoring low, scoring medium, or scoring high in a bingo game. These other animation actions may be celebratory, sport related, race related, or some other action desired by the player. The determination of whether a player scores low, medium, or high in a given bingo game may be made according to a predetermined score range for each category (low, medium, and high), or according to a comparison between one player's score and an opposing player's score, such as in a head-to-head game. Thus, the avatar animation may be termed a head-to-head animation. The user interface may require the player to enter a player name as an element of player registration. Additionally, the user interface may allow the player to enter an avatar name for presentation during the tournament bingo session, during a head-to-head dance off, during a bingo game session, or generally during game play. The avatar name may be the same or different from the player's name.

Upon completing the optional pre-game selections, the method proceeds to block 904 where the player begins their bingo game session. The player's bingo game session may begin at the same time as a tournament bingo session begins, or the player may join an on-going tournament bingo session. The tournament bingo session may include head-to-head competitions among players participating in the tournament to increase interest in each bingo game session of the tournament bingo session. In a head to head game, two or more players can play in competition, cooperation or openly against each other. Players are selected for head-to-head competition randomly by the MGS 102 from a pool of players enrolled in the tournament bingo session. During game play, the method proceeds to block 906 where bingo results for a bingo game session are sent to the authorized mobile device 112 associated with the particular bingo game session. The bingo results may include a point total for the bingo game session, a win or a loss determination for the bingo game session, or other information relating to the bingo game session. At block 908, the bingo results for a bingo game session as well as the player avatar selections are sent by the authorized mobile device 112 to a Bingo Display Enhancement Sub-System (BDES), MGS 102, VPS 104, or any combination thereof. This element of the method is repeated by every authorized mobile device 112 participating in the tournament bingo session, so that the BDES, MGS 102, VPS 104, or any combination thereof receives bingo results and player avatar selections from every authorized mobile device 112 participating in the tournament bingo session.

In an illustrative embodiment, each player participating in the tournament bingo session only receives a subset of tournament information relating to that player's bingo game session result, such as information about that player's bingo card, the balls drawn for the bingo game session, and any prizes won by that player. In the illustrative example, if there are two or more players in the tournament bingo session, each player may not receive information about the other players in the game. This may occur by having each authorized mobile device 112 sends each player's complete bingo game session data set to the BDES. The bingo game session data set may include bingo game outcome determining information: that player's bingo game session result and that player's bingo card; and non-outcome determining information: the player's avatar selections, random selections of player avatar elements such as an avatar dance from the available avatar dances. Each player's data set may further include a serial number that is unique to each tournament bingo session so that the BDES can associate various bingo game session results with a single tournament session. Each player's data set may further still include a serial number unique to that player's bingo game session so that the BDES may associate all data in a player's data set with this unique serial number. In one embodiment, the authorized mobile device 112 may make the random determination of which avatar dance to select and provide to the BDES.

Upon receiving complete data sets, i.e., bingo results and player avatar selections, from every authorized mobile device 112 participating in the tournament bingo session, the method proceeds to block 910 where the BDES combines the bingo game session results with associated player avatar selections to create aggregate bingo game data. The BDES combines the bingo game session results with associated player avatar selections by collating these items, such as by the unique bingo game session serial number, the tournament session serial number, or any combination thereof. The method then proceeds to block 912 where the BDES transmits the bingo game aggregate data to every participating authorized mobile device 112, the BDES, the MGS 102, the VPS 104, a stationary monitor 110, or any combination thereof. Once the BDES has received complete data sets from each player, the BDES prepares animations based upon the bingo game session results and avatar customizations, i.e., pairs certain players' bingo game session results, avatars, and avatar dances for head-to-head competitions. In a head-to-head flash bingo game embodiment, the aggregate bingo game data may comprise combining bingo results from one player's bingo game session, bingo results from an opposing player's bingo game session, and avatar selections corresponding to both players to produce a dance-off animation presenting the bingo results of both players, avatars of both players, avatar names of both players, dance animations for both player's avatars to provide an entertaining dance-off between the two avatars, and a serial number identifying the aggregate bingo game data for a particular head-to-head match-up of tournament players. The dance-off may include a sequential dance animation where first one player's avatar dances according to that player's bingo game result, then the opposing player's avatar dances according to the opposing player's bingo game result. The dance-off may alternatively occur where both player's avatars dance simultaneously, and the avatar dance performed corresponds to each player's bingo game result or to a comparison of one player's bingo game result to the opposing player's bingo game result. The dance-off animations may then be displayed via the VPS 104 on the stationary monitor 110, and/or via the MGS 102 on every player's authorized mobile device 112 so that players not competing in a particular dance-off animation receive a display of the dance-off animation on their authorized mobile device 112.

The method then proceeds to block 914 where the aggregated and organized data are displayed to players and non-players on every participating authorized mobile device 112, the stationary monitor 110, or any combination thereof. Upon displaying the collated/aggregate data the method 900 terminates at block 916 when game play ends.

Figure 10A:
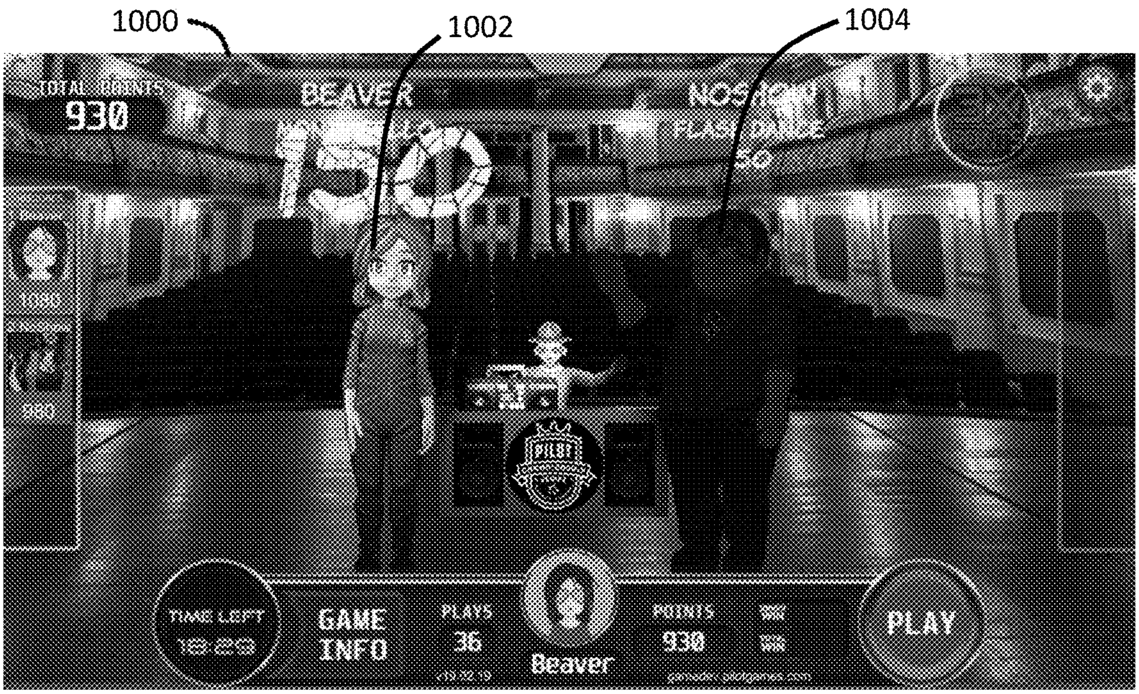
FIGS. 10A-10C shows exemplary game screens displaying avatars competing in a head-to-head dance off corresponding to bingo game results.
Figure 10B:
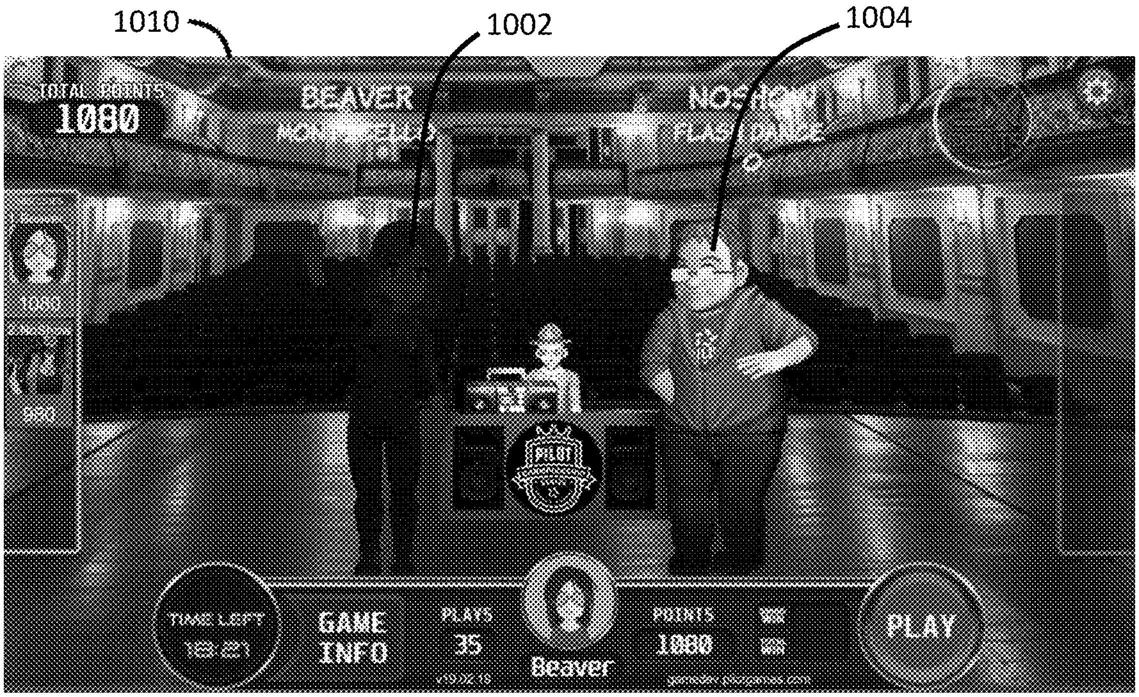
Figure 10C:
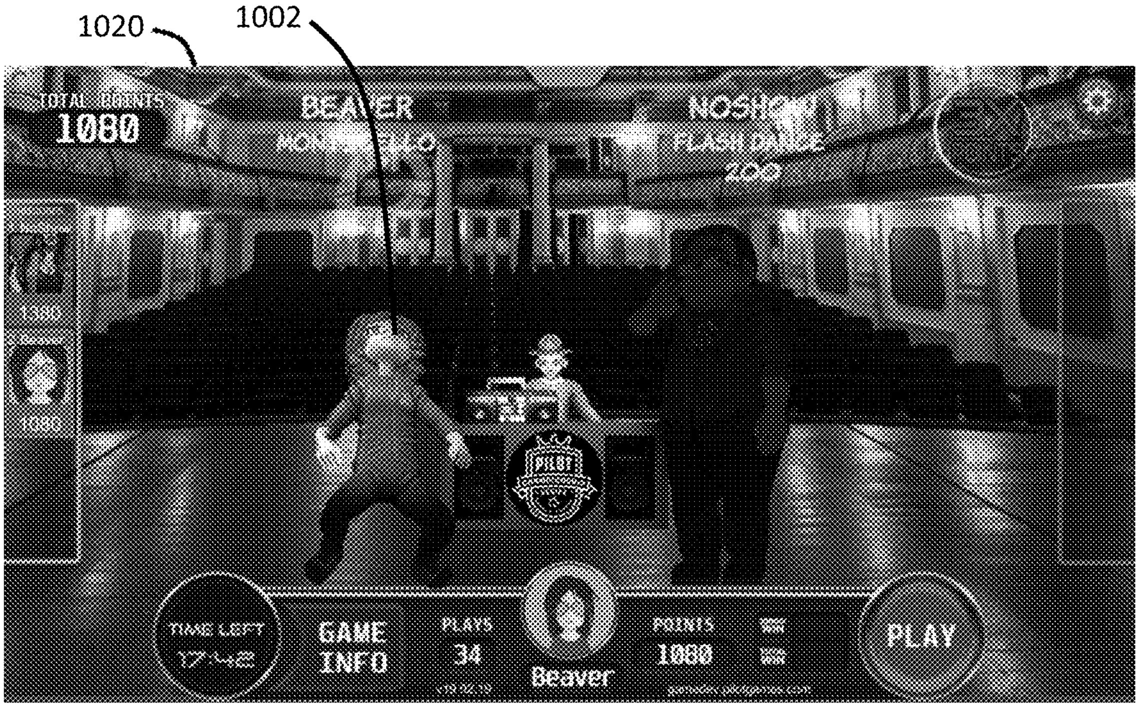

Referring to FIGS. 10A-C, there are shown exemplary game screens displaying collated/aggregate data represented as avatars competing in a head-to-head dance off corresponding to bingo game results. In FIG. 10A, the game screen 1000 shows a highlighted avatar 1002 corresponding to a first player participating in a tournament bingo session and a shadowed avatar 1004 corresponding to a second player participating in the tournament bingo session. In FIG. 10B, the game screen 1010 shows the avatar 1002 corresponding to the first player in shadow, and the avatar 1004 corresponding to the second player as highlighted. Avatar 1004 is animated to perform a low-score dance. In FIG. 10C, the game screen 1020 shows an animation of avatar 1002 performing a high-score dance and highlighted.

Figure 11:
FIG. 11 shows an illustrative menu of games.

Referring to FIG. 11 there is shown an illustrative menu of games. In the illustrative screenshot 1100, an array of icons 1104*a* through 1104*e* representing the menu of available games is presented. The player can then touch or select one of the game icons before beginning a game session. The game session may differ depending on the class or type of game selected. Types of games that can be supported include electronic pull-tabs, bingo, electronic high-speed bingo, electronic high-speed bingo tournaments and other such games of chance. Each game session involves communications with the mobile gaming sub-system 102, which determines the prizes awarded and selects the winners.

The illustrative screenshot 1102 also includes a "Help" button 1106 which is used to alert a venue employee managing the centralized gaming system 100 that some assistance is required.

The session balance 1108 or player account balance output is presented as a "cash" balance; however, "cash" is not stored on the authorized mobile device. The "cash" balance presented in the session balance 1108 output represents credit or monetary value that is available for collection by the player, depending on jurisdictional requirements. If required, the credits may then be converted to fungible cash or other type of financial proceeds, e.g., chips or tickets.

The illustrative screenshot 1100 also includes a jackpot value 1110, which may correspond to a progressive prize. Progressive prizes are prizes that grow in real time as a function of game play. Some progressive prizes may accumulate based upon the games played within a venue. More generally, progressive prizes accumulate prizes from multiple play locations.

By way of example and not of limitation, the types of games supported by the centralized gaming system 100 include electronic pull-tab games, bingo, electronic high-speed bingo, electronic high-speed bingo tournaments, blackout bingo or coverall bingo, blackout bingo tournaments, and other such games of chance.

Electronic pull-tab games are finite pool games that comply with jurisdictional rules limiting prize values and restricting types of permissible video animation. Typically, electronic pull-tab games have small finite-pool sizes, low wager denominations and low prize values compared to casino slot machines. Each game/denomination combination is associated with a different pull-tab deck. Electronic pull-tab games include at least one deck that is always open for each available game. Additionally, electronic pull-tab games include a deck serial number which is displayed on the client game screen as well as in an illustrative Game Information Screens. Available prize limits are generally controlled by jurisdictional regulations. Operators are able to select which games are active for each venue and to be able to close any deck.

Referring to FIGS. 12A through 12D there is shown a plurality of screen shots for an illustrative electronic pull-tab game. A variety of control buttons provide player inputs that are received by the authorized mobile device 112.

Figure 12A:
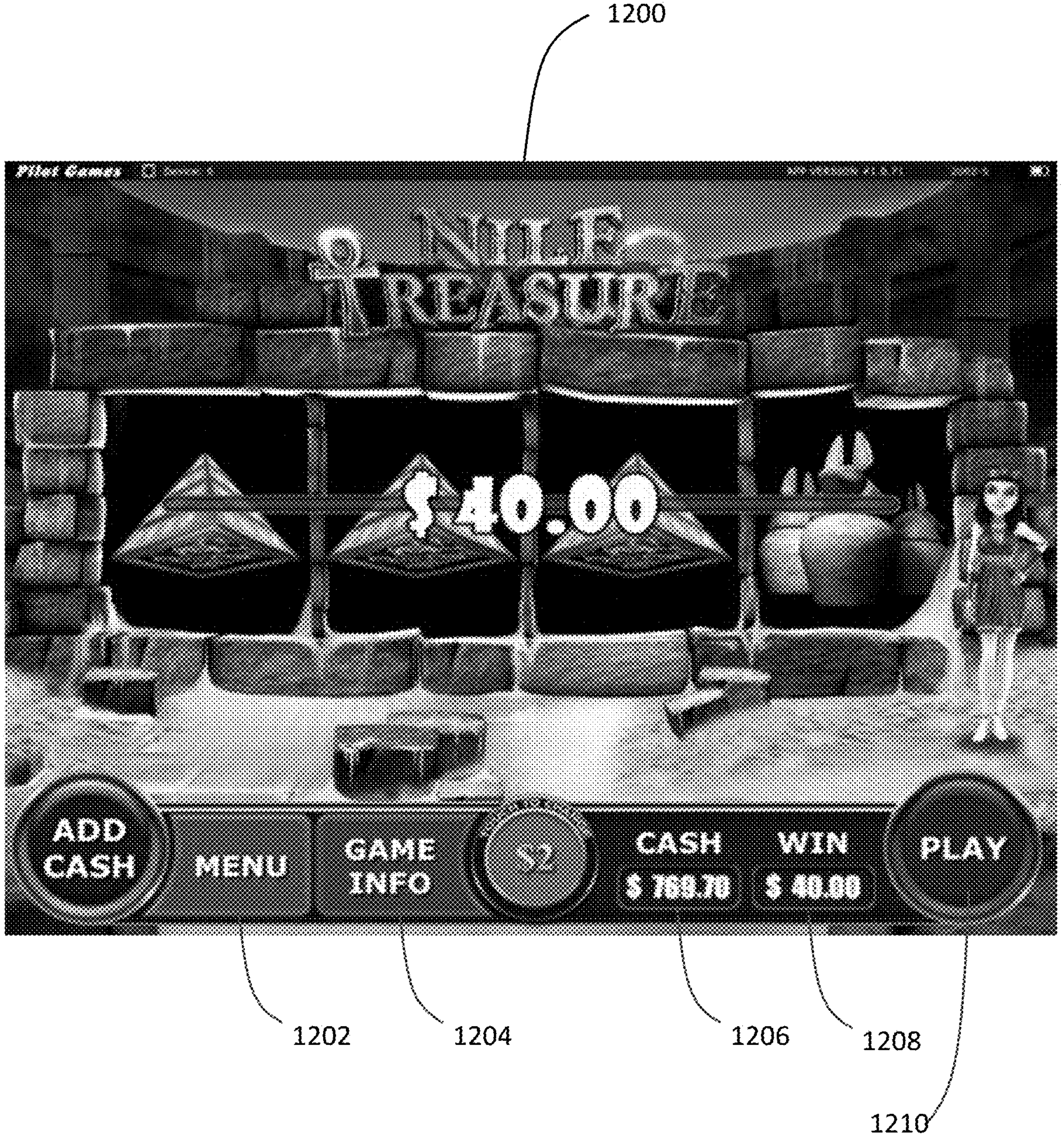
FIGS. 12A through 12D show a plurality of screen shots for illustrative electronic pull-tab games.

The player inputs shown in the FIG. 12A screen shot 1200 include a "Menu" control button 1202, a "Game Info" control button 1204, a "Cash" credit counter 1206, a "Win" credit counter 1208, a "Play" control button 1210.

More specifically, the "Menu" control button 1202 allows the player to return to the game selection menu screen. The "Game Info" control button 1204 provides access to screens which define prizes and rules of play. The "Cash" credit counter 1206 displays the available cash credit balance that is available for withdraw by the player. The "Win" credit counter 1208 displays the amount won in the prior game session. For the illustrative pull-tab game, the "Play" control button 1210 initiates a game session.

Figure 12B:
Figure 12B:

Referring now to FIG. 12B there are shown two screen shots associated with an illustrative game session. Screen shot 1220 shows an unrevealed state corresponding to the pull-tab game before the authorized mobile device receives the "Play" game input. After receiving the "Play" game input, the illustrative game session is initiated and then the pull-tab game outcome is presented in a fully-revealed state as shown in screen shot 1222.

As stated throughout, the mobile gaming sub-system 102 determines the outcome that is presented in the fully-revealed state presented in screen shot 1222.

The pull-tab games presented herein include an auto-close option that may be selected by the operator, for any game played at a particular venue. The auto-close option automatically replaces a finite game pool with a new pool when all prizes exceeding a predetermined value for the deck have been exhausted and the game may no longer be desirable by players. When the auto-close option is turned "ON," a deck may automatically close and be replaced by a new deck when prizes over a game specific value set in the portal are gone. For example, a game may have 3 large value prizes and when the last prize is awarded, the deck may close, and a new deck may open. By way of example and not of limitation, the auto close option is identified in the client game information when it is active, so players may know that it is active. A notification may also be given to all active clients when a new deck is open. This feature is attractive to players because they are always assured that there are always some valuable prizes remaining in a deck they may be playing.

There are a variety of other game features for the illustrative pull-tab games that include providing a reveal mechanism that displays the symbols in portions of the screen to create player anticipation. Another game feature includes background music that is unique to the game theme. Another game feature may include a sound that is triggered when each symbol is revealed; and the sound may be different for each game. A further game feature includes a prize rollup sound which is common to all games. Yet another game feature includes a celebration sound on all big wins. Additionally, game features may include a change in music during bonus rounds. Another game feature may include a prize rollup on the base game screen after a bonus round. A still further game feature may include symbols that slide in from the side or other such animated presentation. Yet another game feature includes game specific math that complies with jurisdictional Rules and Statutes.

Figure 12C:
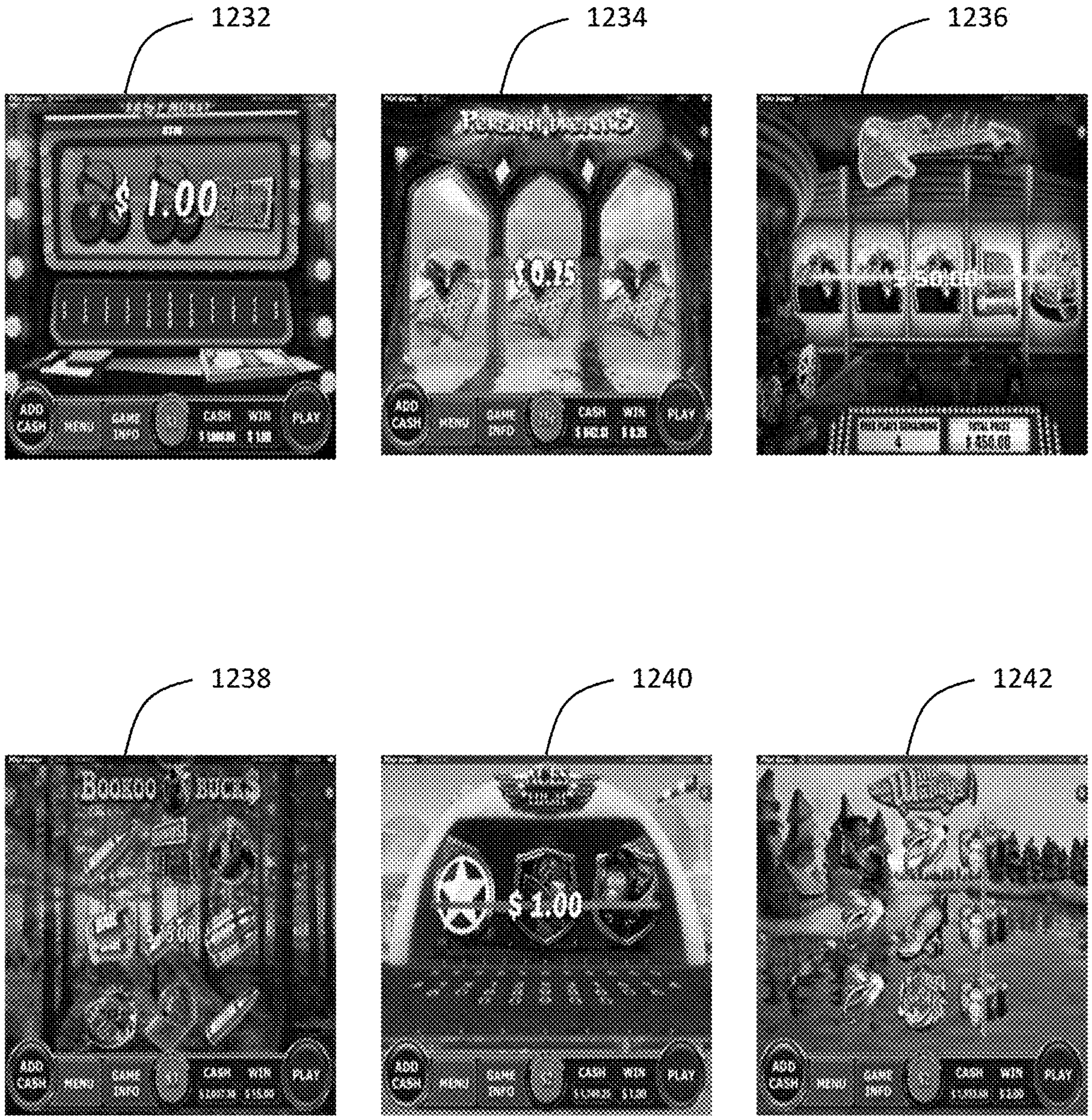

Referring to FIG. 12C there is shown some illustrative screenshots of electronic pull-tab games that include EASY MONEY™ 1232, PERSIAN DREAMS™ 1234, ROCK'N'GOLD™ 1236, BOOKOO BUCK$™ 1240, ACES HIGH™ 1242 and WILD WALLEYE™ 1244. Other titles include ANCIENT PHARAOH™, BIG PHAT CASH™ and VEGAS VEGAS™.

Figure 12D:
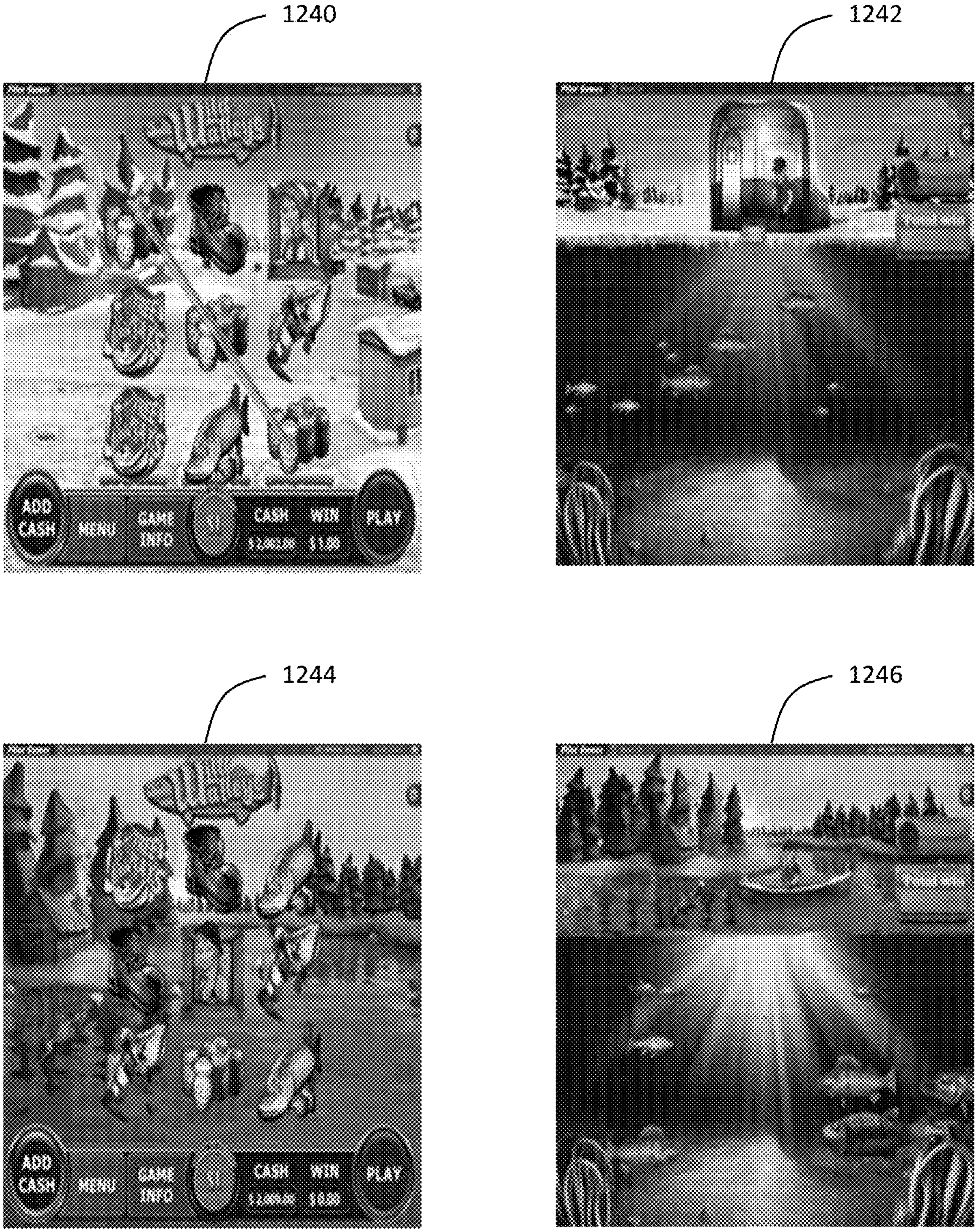

Referring to FIG. 12D there is shown some illustrative screenshots where the background graphics change based on seasonal changes in the weather. For example, in the illustrative WILD WALLEYE™ shown in FIG. 12D, the graphic background presentation changes based on the seasonal changes in the calendar. Screenshots 1244 and 1246 present background graphics associated with a calendar period between November 1 and April 1, which depict ice-fishing graphics. Screenshots 1248 and 1250 are associated with the remainder of the year, and the graphics reflect summer boat fishing.

Figure 13A:
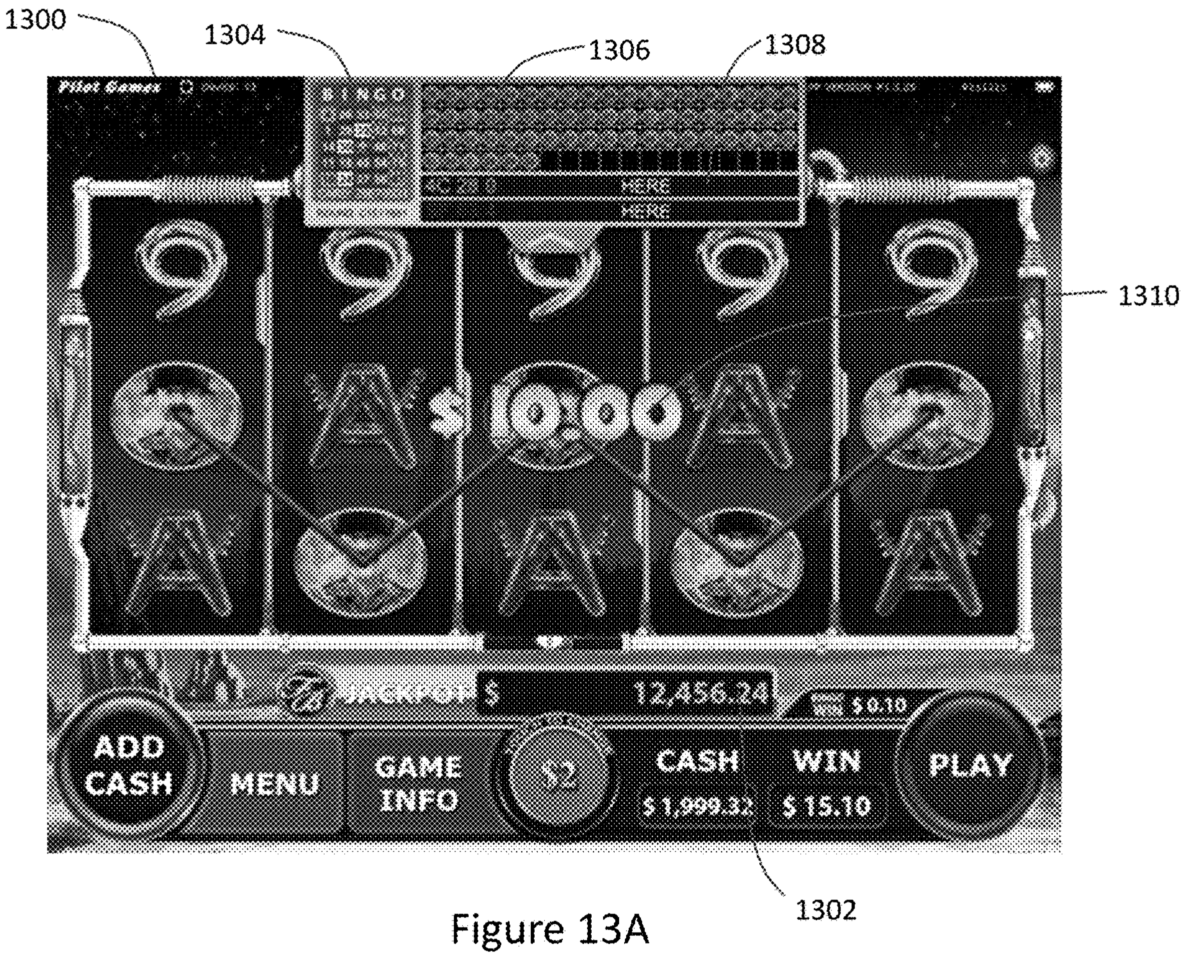
FIG. 13A shows a screenshot of an illustrative high speed bingo game.

Referring to FIG. 13A there is shown a screenshot of an illustrative high speed bingo game 1300. The screen shot 1300 is for an illustrative high speed bingo game that may be referred to as FLASH BINGO™. The panel displayed on the game screen is similar to the one displayed for the pull-tab games, with the addition of a Jackpot Display 1302, which presents the current value of a progressive game jackpot. In the illustrative embodiment, the jackpot size increases every play for the bingo game.

Additionally, the screenshot includes an image of a bingo card 1304 that is assigned to the player by the mobile gaming sub-system 102. The illustrative bingo card 1304 includes twenty-four (24) numbers, a free space in the middle and four (4) randomly located bonus squares. The panel also has a space for displaying ball draw results, termed the bingo display area 1306, from a set of 75 bingo numbers. Additionally, the panel includes a results display area, termed the results summary line 1308, for displaying bingo game results. The largest portion of the illustrative screenshot 1300 includes an entertainment display which is animated and displays the results of the bingo game in an entertaining format. In the embodiment shown the entertainment display portion includes a symbol matrix display 1310, where matching sets of symbols are used to equate to prize values generated from the bingo game.

The illustrative high-speed bingo game is played between players across the network who desire to play the game at approximately the same time. The illustrative high-speed bingo game is played by having the authorized mobile device 112 communicate with the mobile gaming sub-system 102, and the results generated by the mobile gaming sub-system 102 are communicated to the authorized mobile device 112, which presents the bingo game results in an entertaining manner that awards a prized that matches the bingo win.

In the illustrative embodiment, the high-speed bingo game includes two winning patterns, a Four Corner pattern, which is won by the first player (or players) to get all four corners of their bingo card called, and a Small Frame, which is won by the first player (or players) to complete the set of eight squares surrounding the center square. The illustrative game session for a high-speed game is initiated when a player touches the PLAY button to initiate the game session. The next game event includes having the bingo display area 1306 "drop down" and shows a blank bingo card and draw. A message is sent to the mobile gaming sub-system 102 requesting the initiation of a game session. The mobile gaming sub-system 102 determines if other players have made a similar request. If no other player is found in a specified time period then the initial play request is aborted and the cash balance in the player account is refunded the play amount.

If at least one other player is found within a specified wait time, then a bingo card is assigned to each player and the game is played rapidly by the mobile gaming sub-system 102. As an example, the total time for the MGS 102 to process player input or registration input may be under one second. The mobile gaming sub-system 102 then sends game information and results to each participating client. The game information broadcast by the mobile gaming sub-system 102 may include bingo card numbers, the location of bonus squares, color coded ball draw results (green for completion of the Four Corner (4C) game and blue for completion of the Small Frame (SF) game), results summary lines, prize value for each authorized mobile device and other such bingo game information.

Referring to FIG. 13A, the illustrative mobile application running on the authorized mobile device 112 displays the bingo card and bonus squares. Additionally, the illustrative mobile application displays the ball draw in sequence and indicates squares on the bingo card image that have been called. The authorized mobile device also displays the results summary line 1308, which shows the results of the illustrative four corner competition and the status of the small frame competition.

Figure 13B:
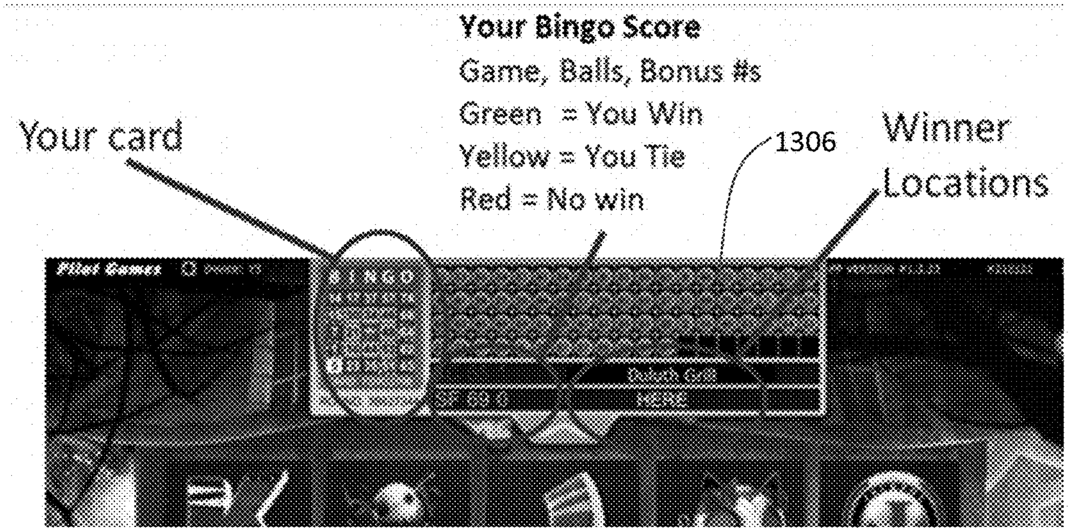
FIG. 13B shows further detail of the results summary line.

Referring to FIG. 13B there is shown further detail of the results summary line. By way of example and not of limitation, the results summary line 1308 includes a) an abbreviation for the pattern type (4C or SF). Additionally, the results summary line 1308 includes b) the number of balls that it took to win the pattern. Furthermore, the summary results line 1308 includes c) the number of bonus squares that were in the winning pattern and the venue name(s) of all the participants(s). Note that fields a, b, c are color coded. Green means that this player was a winner. Red means that another player was the winner and yellow means that the player was tied with another player or players for the win.

The illustrative authorized mobile device 112 includes a touch sensitive display with visual elements that can be pulled or retracted or retracted from the touch sensitive display. For example, a tab may be "up" and not visible as it moves down during the game session to enable the player to see the bingo play and then automatically moves upwards and out of sight when the entertainment display begins. If the player touched the tab to "pull down" the display it may remain down during all phases of the play cycle.

Figure 14A:
FIG. 14A shows an illustrative lobby with an icon labeled "MegaSota Game Nite," which identifies access to a Linked Bingo Tournament (LBT).

Referring to FIG. 14A there is shown an illustrative lobby with an icon labeled "MegaSota Game Nite," which identifies access to a Linked Bingo Tournament (LBT). The MegaSota icon 1402 identifies the data and time of the next scheduled tournament. If the next scheduled tournament is close, then the timer may perform a count-down to the actual game start.

A Linked Bingo Tournament (LBT) is a variation of high-speed electronic bingo, in which players win prizes based on a series of bingo games played against other players for prize points during a predetermined interval. In some embodiments, the LBT is a blackout bingo tournament. In the illustrative linked bingo tournament (LBT), players are charged a fee to enter the tournament. Similarly, to the high-speed bingo game described above, all bingo games in the tournament are played against other tournament players. In the LBT bingo game winners may be awarded points, instead of cash. At the end of the predefined tournament play period, cash prizes may be given out to the players that have achieved the highest and/or lowest point scores during the course of the tournament.

In the illustrative embodiment, the linked bingo tournament (LBT) sessions are held on scheduled days of the week at specific times. For example, Tuesday evenings between 7:00 and 9:00 may be the schedule time slot for the LBT sessions. Using the Tuesday example, LBT games could begin at 7:00, 7:30, 8:00 and 8:30. The dates and times are scheduled using portal functions that create schedule files in the database of the central system and may be changed from time to time. Notifications of upcoming LBT times may be given to players on their game client devices.

Figure 14B:
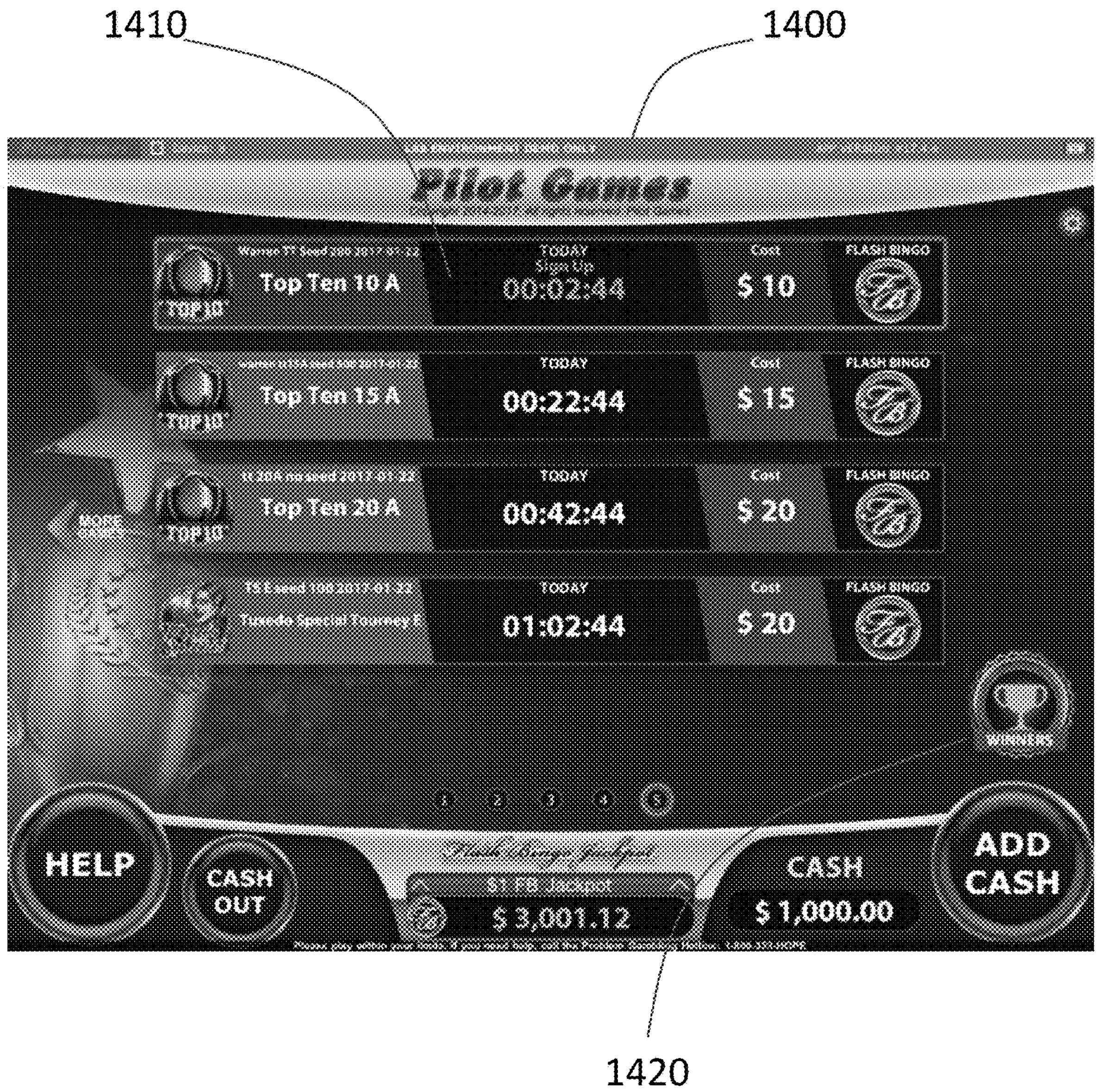
FIG. 14B shows the schedule of tournaments presented to the player that correspond to the MegaSota Game in FIG. 14A.

With reference to FIG. 14A, when a player touches the LBT icon, labeled MegaSota Game Nite 1402 in the illustrative example, the schedule of games shown in FIG. 14B may be shown to the player. This schedule may be available at all participating venues on all enabled devices. Players can participate in a common game experience across a wide geography. In one example, participating venues can be located all across the state of Minnesota, so many participants may be able to compete in real-time.

Figure 15:
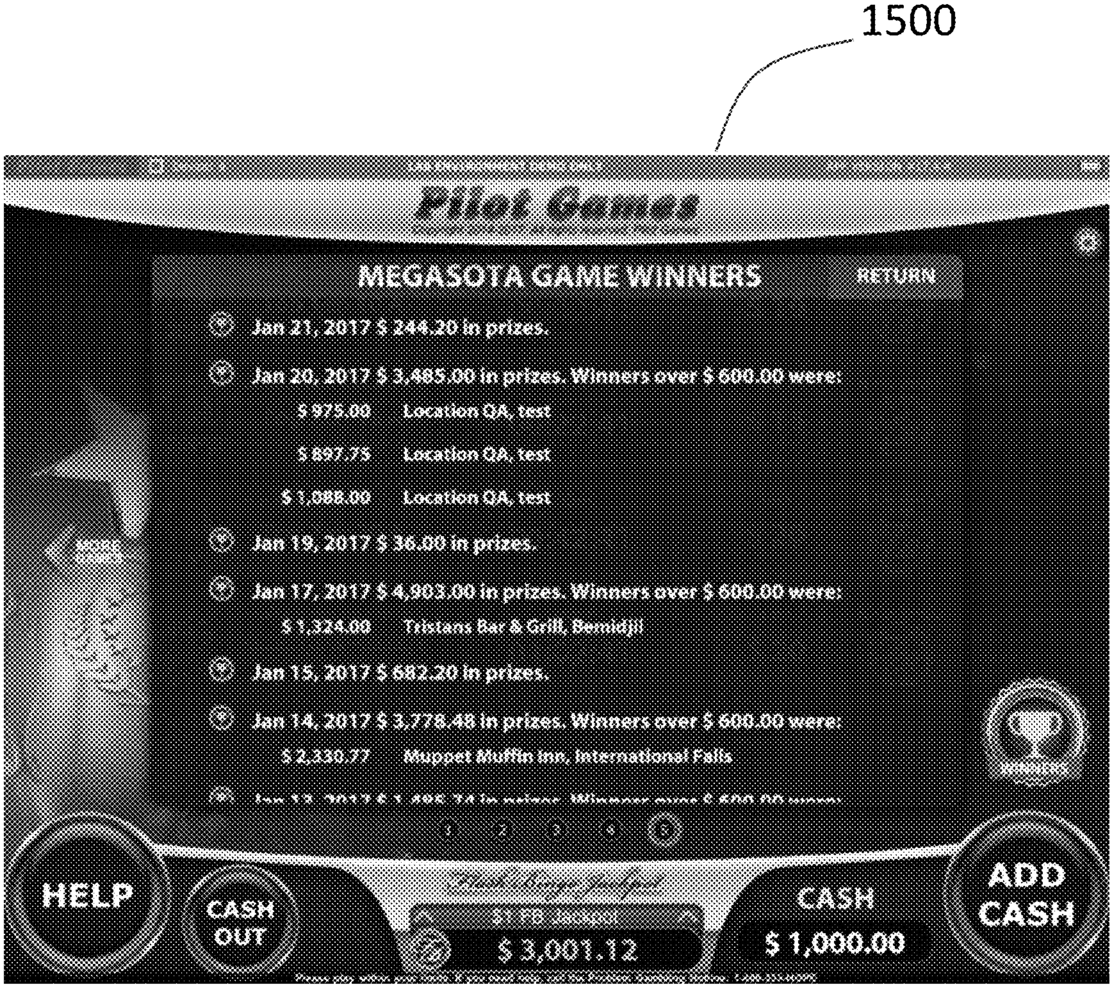
FIG. 15 shows a list of recent tournament winners associated with linked bingo tournaments (LBT).

With reference to FIG. 14B, a player may select a scheduled tournament. The menu item shows the date and time that the LBT is scheduled for. If the LBT is scheduled in the current business day, then the time is shown in the form of a countdown. If the LBT is in the pre-scheduled enroll period, then the color of the time changes. The menu description also includes a name for the LBT, the name of the game theme being played, and the entry requirements. Another item on the LBT Menu screen is the WINNERS icon 1420. Touching the Winner icon brings up a list of recent tournament winners as shown in FIG. 15. This may include LBTs and/or Bingo games.

Figure 16:
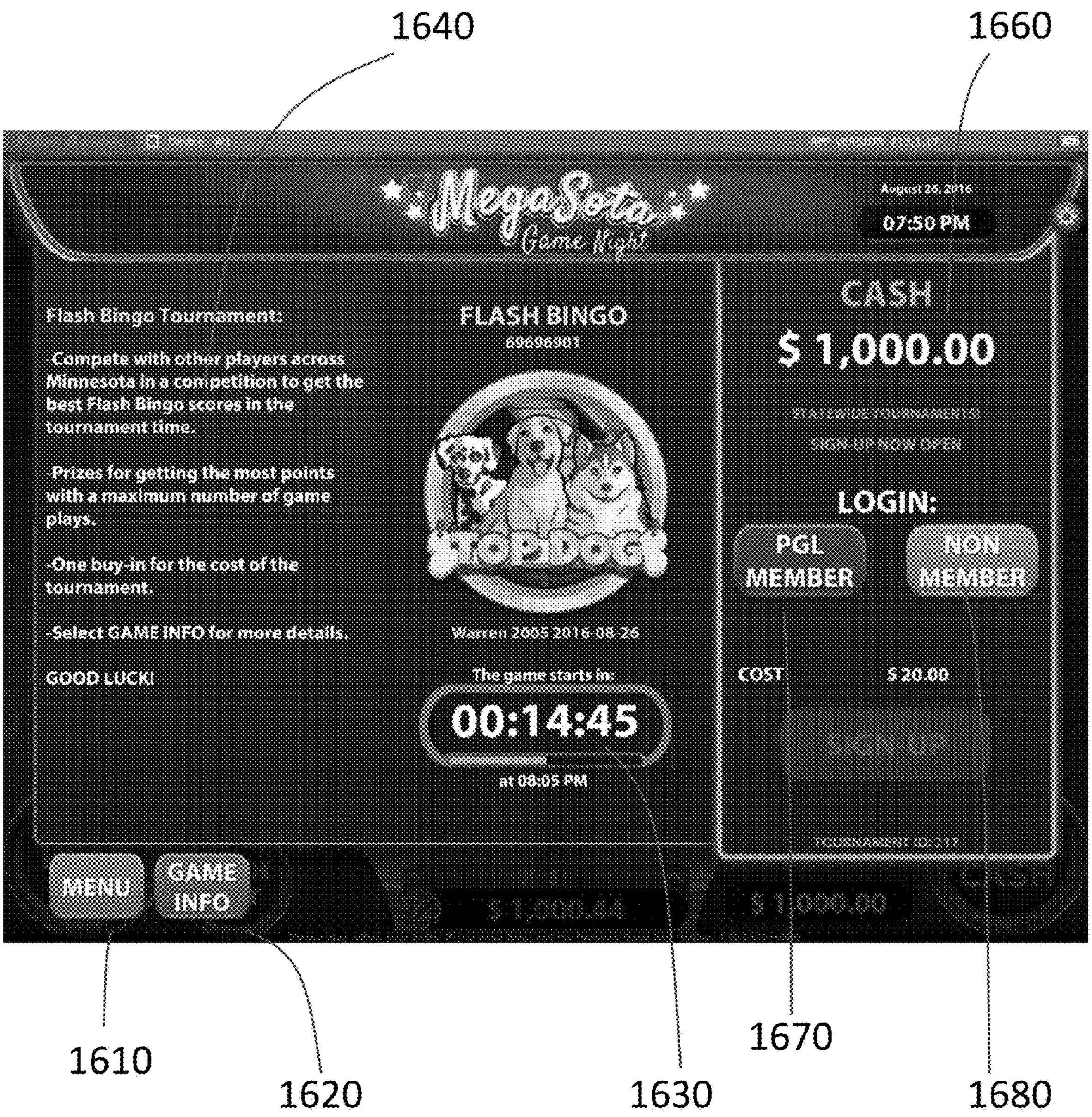
FIG. 16 shows a tournament login screen.
Figure 17:
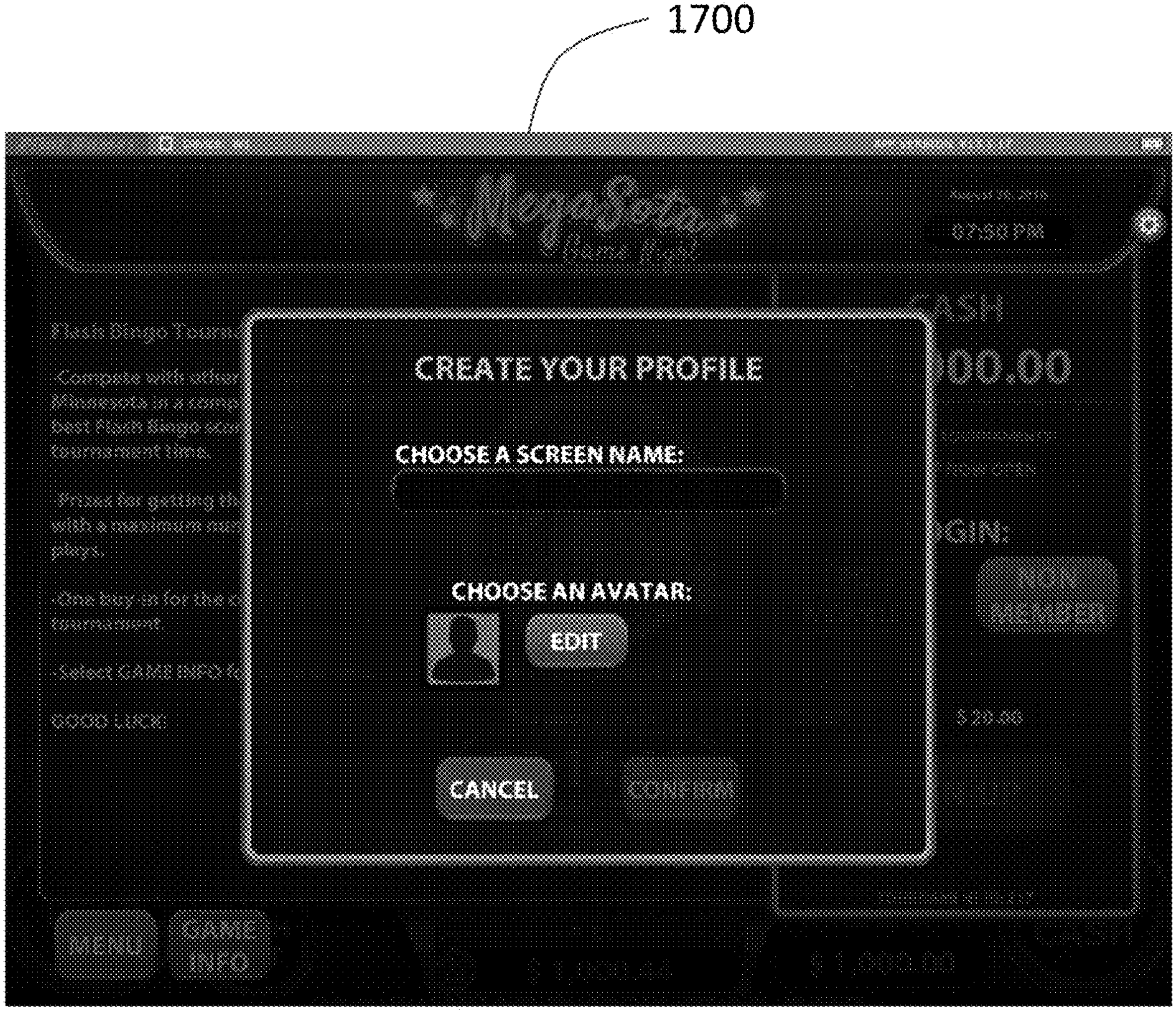
FIG. 17 shows a screen where a player chooses a screen name for a tournament.
Figure 18:
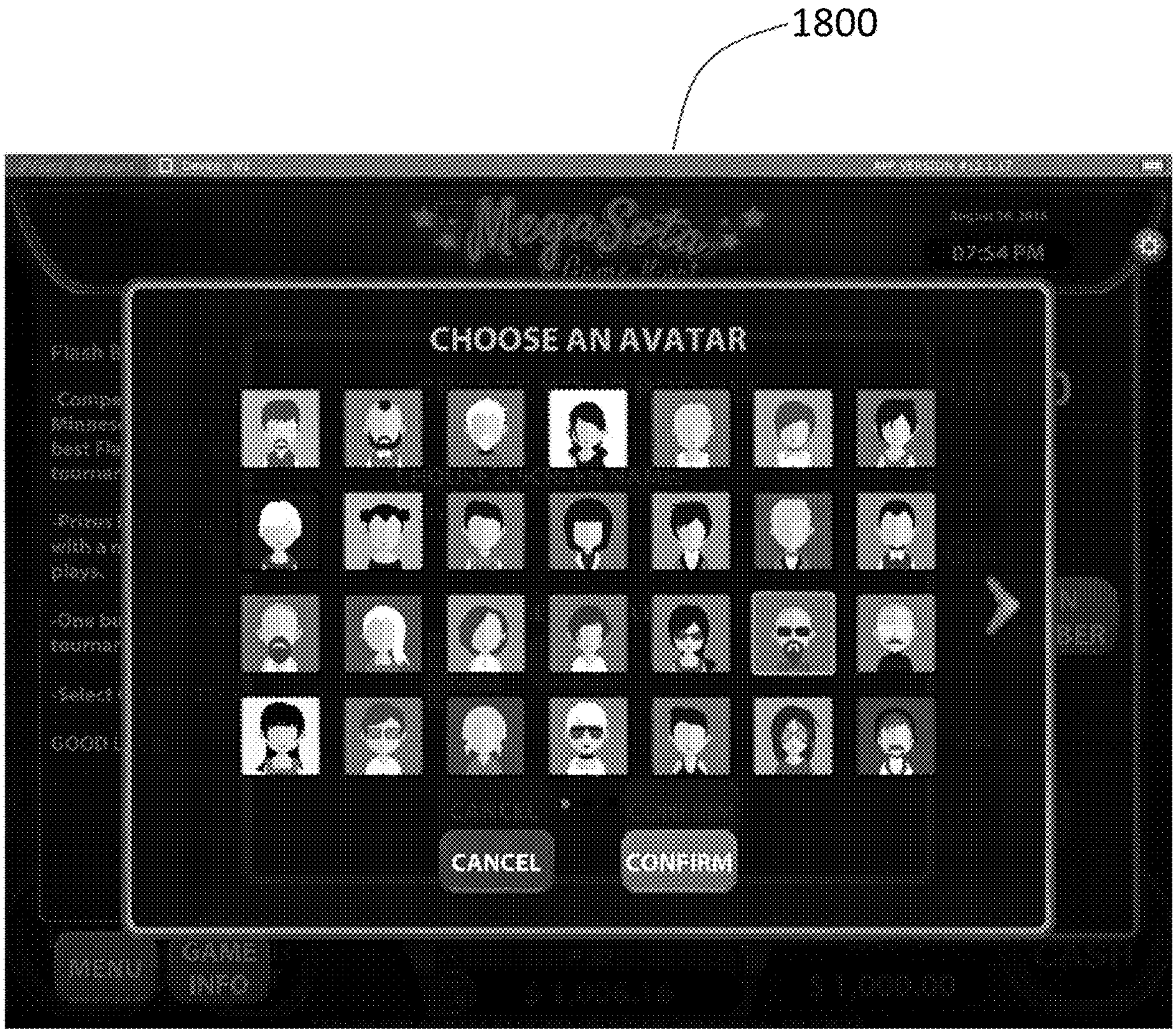
FIG. 18 shows an avatar selection screen.
Figure 19:
FIG. 19 shows a sign-up screen for a linked bingo tournament.

When the player selects a menu item 1410 as shown on FIG. 14B, the player is presented with the enrollment screen shown in FIG. 16. More specifically, FIG. 16 includes a Menu button 1610 that allows the player to return to the tournament menu screen. The Game Info button 1620 takes the player to descriptive information describing the play of the electronic high-speed bingo game, the points that can be won, rules for play, and the prizes available for final point score rankings. The screen also may have alternative buttons for logging in as a member of a group (PGL) or as an unaffiliated player (Non PGL). In either case, the player may be taken to a player profile screen as shown in FIG. 17. The player may be asked to enter a screen name, using an iOS or Android pop-up keypad and also to use the Edit button to bring up the avatar selection screen illustrated in FIG. 18. With reference to FIG. 19 once the player has selected an avatar and screen name, they may be presented with the opportunity to sign up for the LBT using the SIGN UP button 1910 as shown in FIG. 19. In addition to those requirements the LBT must be in its pre-scheduled enrollment period.

Figure 20:
FIG. 20 shows a successful sign-up screenshot.

When the player sign up is successful FIG. 20 may be shown until the tournament starts. In one implementation the player may leave this screen using the Menu button and play other games, such as electronic pull-tab games or Flash Bingo games until the tournament starts. If a player is enrolled in an upcoming tournament and is playing another game a special icon may appear on those games, similar to the one shown as 2020. Touching that icon may bring the player back to the tournament.

Figure 21:
FIG. 21 shows a tournament start screenshot.

The screen shown in FIG. 21 may appear when the tournament starts. It shows the number of players in the tournament in all venues 2130. The Play button 2110 may take the player to the tournament game screen.

Figure 22:
FIG. 22 shows an illustrative screenshot for an LBT game called Top Dogs.

FIG. 22 is an illustrative LBT game screen. The displayed game is TopDogs, but many game themes are possible. As with Flash Bingo all prize wins are determined by the result of a high-speed electronic bingo game 2270. In the case of the LBT the prizes are expressed in points. After the bingo game is complete the screen may be animated with symbols and the final position of the symbols may have values that add up to the total points awarded in the bingo game. The graphic entertainment is intended to make the game more interesting and entertaining for the player. The play count 2210 shows the number of plays left that the player has which decrements with each play from the starting point which is a predefined play total that is determined when the tournament is scheduled. The Points meter 2220 shows the total points accumulated by the player in the tournament. The Win meters 2230 show the points won by winning the bingo patterns and by winning bonus points. The clock 2240 shows tournament time left and ticks downward from the starting value which is the prescheduled length of the tournament. On the left and right side of the screen are sets of screen names. Points, avatars, and locations 2250 and 2260. These are a critical element in establishing the social nature of the competition. They give the screen names of the players they are playing against and in which venue each player is located. The icons on the left 2250 are the 3 highest point earners. If the player on the device is not one of the top 3 point getters, then the players position may be shown in the 3 icons on the right 2260, which may show the player's position and the players nearest to him or her.

Figure 23A:
FIG. 23A shows a tournament play screenshot in which all players have completed their allotted number of pays or the tournament time expires.
Figure 23B:
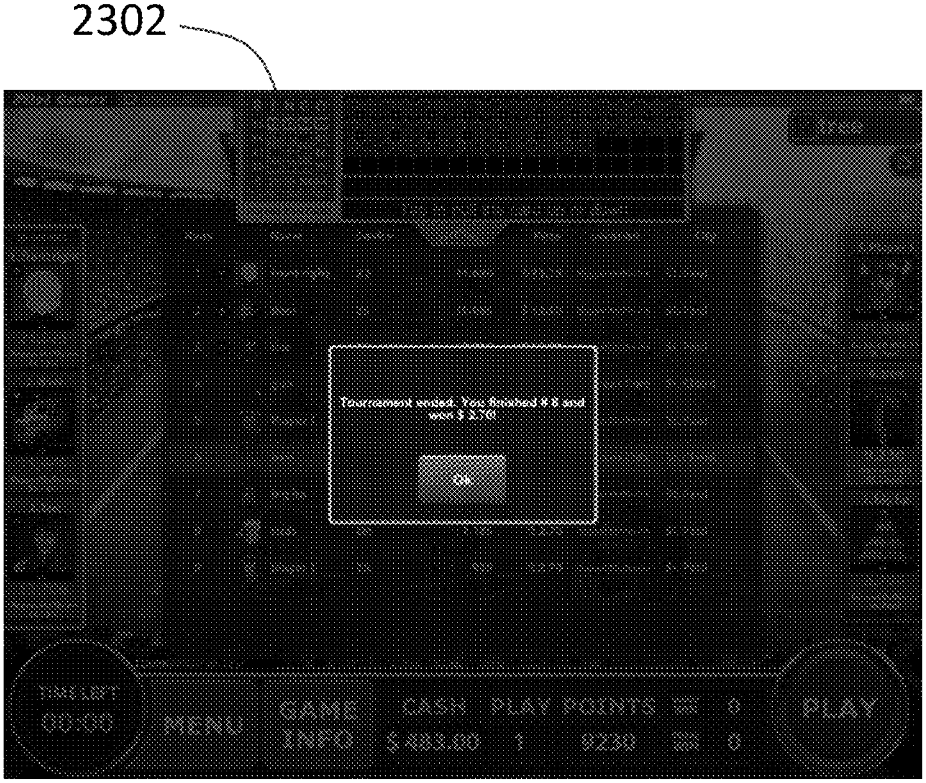
FIG. 23B shows a screenshot that the tournament has ended and that the player has been awarded a prize.

Tournament play continues until all players have completed their allotted number of pays or the tournament time expires, at which time a screen appears as shown in FIG. 23A. More specifically, FIG. 23A provides a screenshot 2300 associated with having completed the player's rounds and an instruction to wait until the end of the tournament to obtain the tournament results. FIG. 19B provides an illustrative screenshot 2302 that the tournament has ended and that the player has been awarded a prize.

A special provision may be made to cover the case where a player is trying to play a game and cannot complete it because bingo requires a competitor, and all other players may have completed their allotted games. In one illustrative embodiment, the player in that condition receives a predetermined allotment of points.

Figure 24:
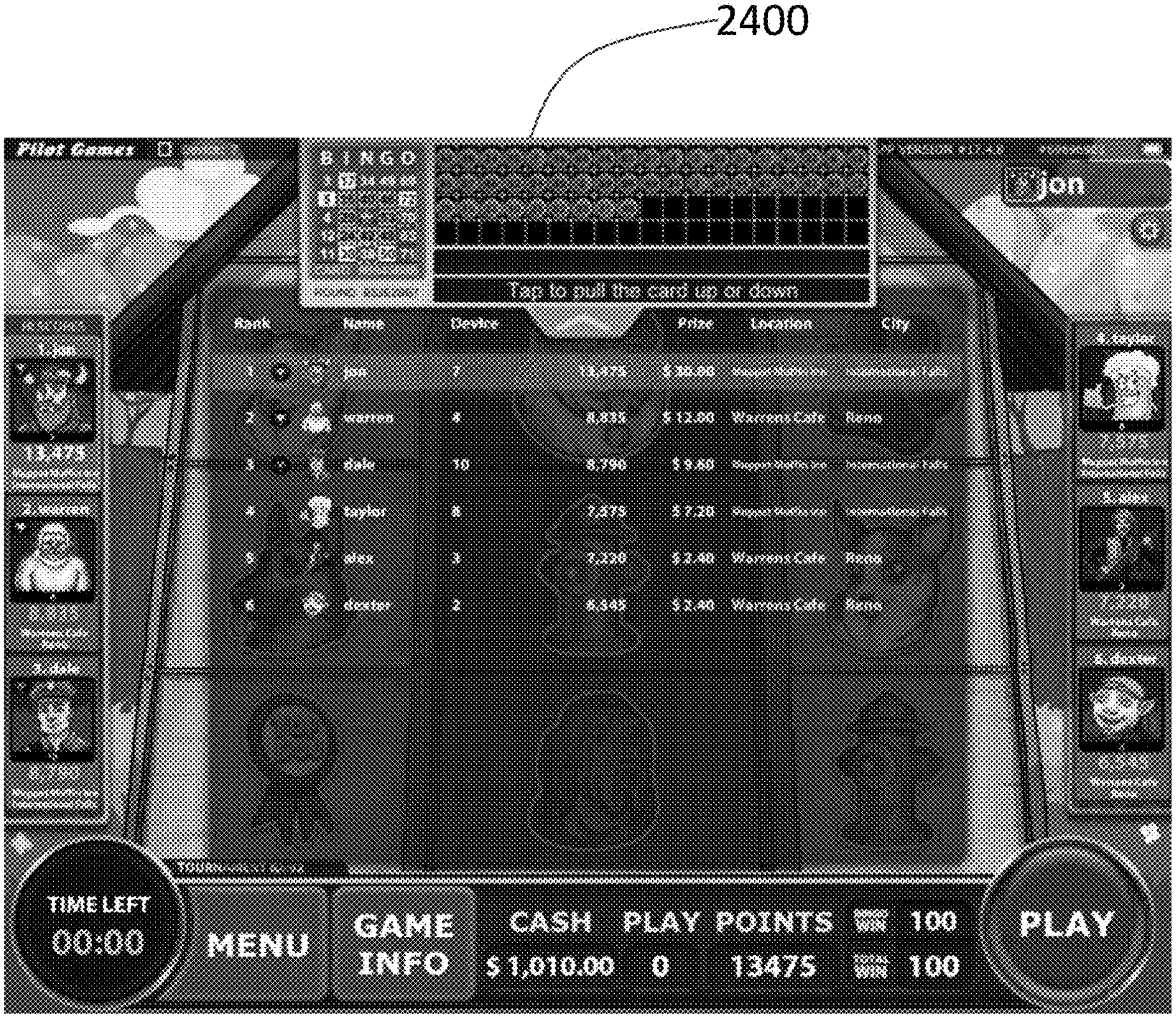
FIG. 24 shows a summary screenshot of players who won prizes.

FIG. 24 illustrates an implementation of a final screenshot 2000 showing all participating players a summary of all players who won prizes, including their screen name, point totals, prizes won, and location. For example, the top prize winner is "jon," and jon was playing at the Muppet Muffin Inn where he achieved 13,425 points in tournament play and won a prize of $30.00.

If the player interacting with the authorized mobile device 112 is a winner, the prize amount may normally be added to the players Cash, unless jurisdictional or IRS rules require special handling. After the tournament game session is completed, the player may cash-out to redeem their prize or continue playing any offered games. Note, large prizes may be subject to reporting and claim procedures to comply with federal or jurisdictional reporting requirements.

Excitement and player enthusiasm for the illustrative linked bingo tournament (LBT) games are greatly enhanced when the basic game is combined with the video presentation sub-system (VPS) 104, a VPS monitor or stationary monitor 110 and broadcast content that includes player ranking information during the LBT game session or game sessions. For example, the video presentation sub-system 104 may be configured to combine output from the mobile gaming sub-system 102 with commentary from a broadcaster and visual images of the games in play. The video generated by the VPS 104 and presented on the venue VPS monitor or stationary monitor 110 converts an individual bingo gaming experience to a group bingo experience, in which many people in a venue can watch and/or participate. It may be expected that when a player in a venue is doing very well and competing against players in the same or other venues in other towns in a visible way, that the local players/viewers may enthusiastically support the local player. Expanding the degree of involvement provides a significant way of converting individual game play into a social event that attracts other players.

By way of example and not of limitation, linked bingo tournament (LBT) games have a short duration, e.g., 15 minutes. LBT game count-downs may be shown on the authorized mobile device 112 and the venue's VPS monitor or stationary monitor 110. In the illustrative embodiment, the venue's VPS monitor or stationary monitor 110 may be activated at least 30 minutes before the LBT game session begins and through the duration of the LBT session and for at least 30 minutes after the completion of each LBT game session.

In operation, LBT tournaments may be identified by a specific game icon on the game client Menu screen. Activation of the game requires that the player have sufficient credits to play according to the game rules. Also, a minimum number of participating players entering into the prize pool may be required to initiate a linked bingo tournament game. In the illustrative embodiment, each bingo tournament game session includes of at least two (2) players playing modified Flash Bingo with a standard 24 number bingo card numbered 1 through 75, B-1-N-G-O with a FREE space in the middle. Games are activated by a player pressing PLAY, which initiates play and selects auto-daubing for each round. During the roll-up period prior to the commencement of a linked bingo tournament (LBT) game session, information regarding the total number of player participants and total prize pool for that specific tournament may be exhibited on the player screen and VPS video monitor as shown in FIG. 25 and FIG. 26.

Figure 25:
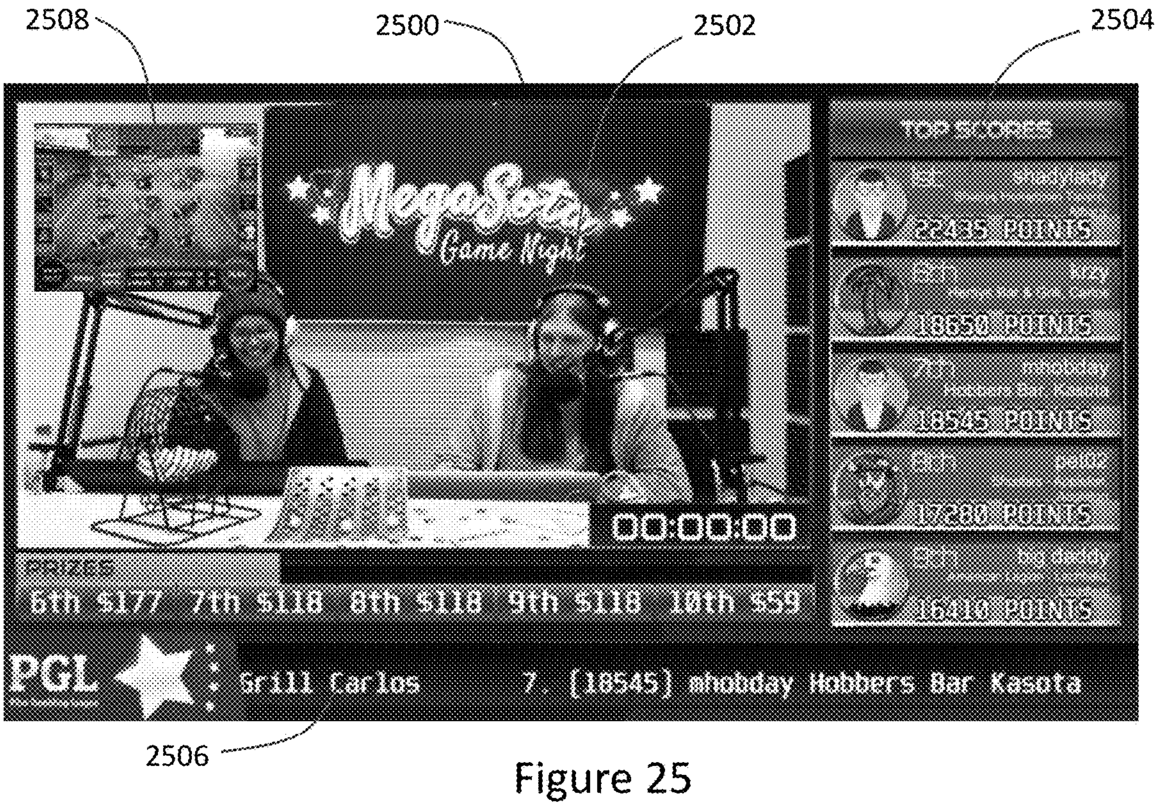
FIG. 25 shows an illustrative screenshot for a VPS broadcast of a Flash Bingo tournament that is presented on the venue based VPS video monitor.
Figure 26:
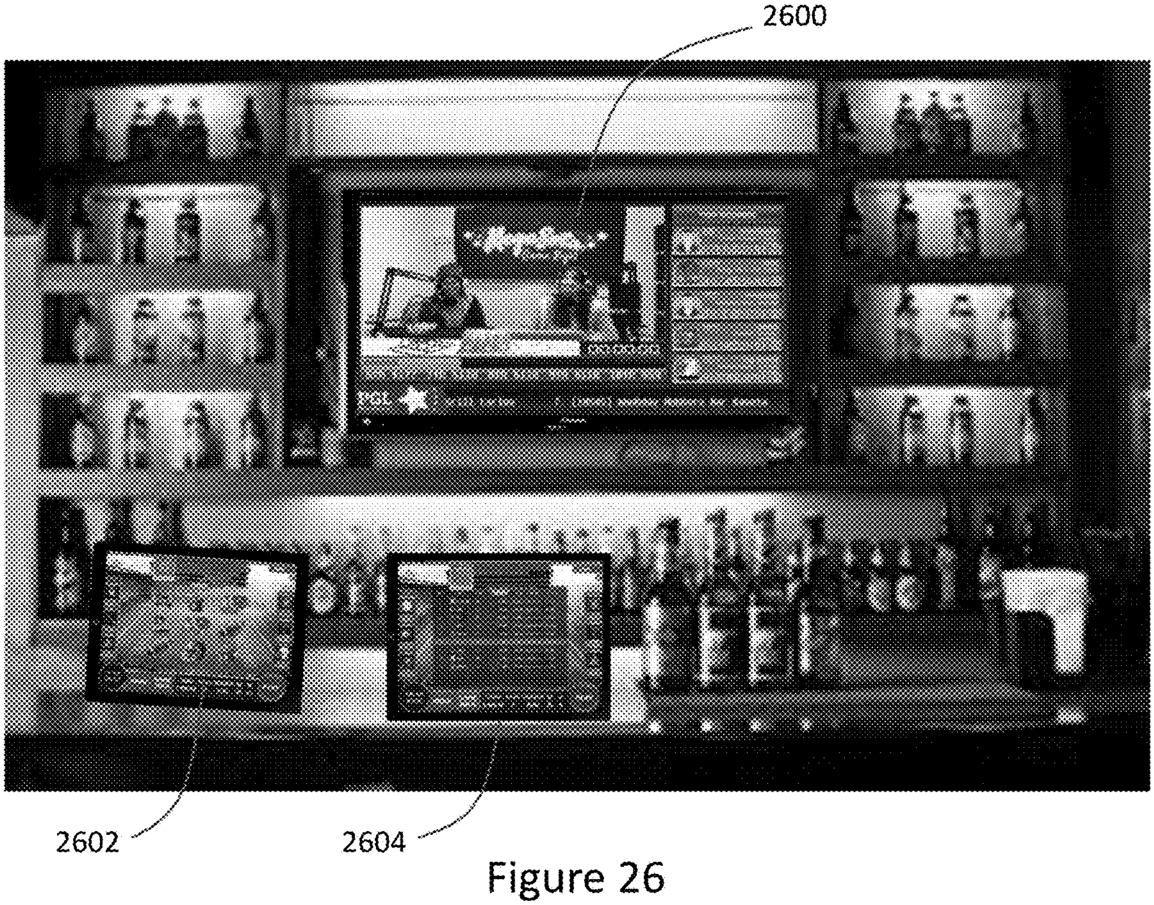
FIG. 26 shows an image reflecting the player experience at an illustrative venue.

Referring to FIG. 25, there is shown an illustrative screenshot for coverage of a tournament game as implemented on the VPS and is presented on the VPS video monitor in one or more of the venues. The video screenshot 2500 includes a host 2502 that is presenting the tournament event, an updated leader board 2504, a banner with local site data 2506, and a background screen 2508 showing an illustrative tournament game from selected devices playing at selected venues.

The illustrative screenshot 2500 may be presented on a VPS monitor or stationary monitor 110. During the illustrative tournament game, the venue based VPS video monitor or stationary monitor 110 may be configured to present a leader board 2504 to players on a real-time basis. The VPS output may also be configured to show the point totals for leading players and identifies the city and venues where the players are playing 2504. Additionally, the VPS video monitor or stationary monitor 110 may display the time remaining in the tournament. In the illustrative embodiment, leading players are identified by a chosen screen name and player selected avatars. The centralized gaming system 100 incorporates a commercially available software filter to avoid use of improper names or initials on the leader board. As described above, the leader board may also be available on player's client devices.

In another illustrative embodiment the video presentation sub-system 104 provides streaming content to support mobile gaming sub-system 102 games, including Tournament Bingo. The video presentation sub-system 104 may be broadcasting 60 minutes, for example, prior to the illustrative linked bingo tournament (LBT) and 30 minutes following the conclusion of tournament sessions. By way of example and not of limitation, the content presented on the VPS video monitor may include games, promotional games, promotional videos, streaming Flash Bingo Jackpot information, charity promotional videos, advertising and the actual sports-style coverage of the LBT games and bingo games themselves. It should be understood that the time period for a broadcast may be determined by the producers and can be any suitable length of time.

Referring now to FIG. 22 there is shown is an image reflecting the player experience at an illustrative venue. The VPS broadcast is shown on an illustrative TV monitor 2200, identified also in FIG. 5 as item 506, and gaming clients 2202 and 2204 are shown on a counter. An objective of the VPS 104 is to provide a social interaction that greatly enhances the interest and enjoyment in the play of the games. In addition, since the broadcast is designed for a large-format visual representation in the gaming venue, it is also visible by non-players and may advertise the game and in many cases find non-players in the venue rooting for the success of the active players in their location. This interactivity is a major component of generating a social quality to the game which may be especially attractive to desirable younger-generation players.

During the linked bingo tournament game session, the leader board information may scroll to show the top scores in the network on a "real-time" basis. This leader board information may be expected to cover a state, or more, depending on the jurisdiction hosting the game. The leader board updates may occur frequently, e.g., every 10 seconds. At the end of the LBT game, the winners, the venue where they played, and the prizes won may be broadcast. This information may scroll and could remain on a split screen for a period of time. The top winner(s) may be celebrated. As described above, the prize meter indicates the total prize pool for an upcoming game based on the volume of players enrolling in the LBT.

By way of example and not of limitation, for an illustrative Tournament Bingo games the player is advised in real-time of information about the status of the tournament, including size of a jackpot, number of players, leaders (identified by a "handle" and location), and time remaining in the tournament. This data may be enhanced with visual representations and comments from a moderator and field reports. Thus, the player obtains a sense of community and competition which cannot be gained from the client game interface itself.

Another game style related to the Linked Bingo Tournament is Bingo. This is a more traditional style of bingo as compared to the high-speed bingo that is the basis for Flash Bingo and the Linked Bingo Tournaments.

Bingo games may be scheduled in the tournament menus interspersed with linked bingo tournaments. In one example, a tournament series may be scheduled that has four (4) events, namely, two (2) Flash Bingo Tournaments and two (2) bingo games. Each event may take 30 minutes, so the entire session, supported by the VPS would be a two hour session.

The following describes an illustrative implementation of a bingo tournament session. From the tournament menu illustrated in FIG. 10B a player may select a bingo game.

Figure 27:
FIG. 27 shows an illustrative bingo game enrollment screen for an illustrative bingo game.

Referring to FIG. 27 there is shown an illustrative bingo game enrollment screen for an illustrative bingo game. An illustrative embodiment may present a broad array of bingo variations, distinguished by graphic theme, jackpot possibilities, winning patterns, wagering denomination and prize structures. In the illustrative embodiment, different customizable bingo games may be scheduled and configured through the management system portal. The illustrative enrollment screen 2700 requires that a player select a screen name in space 2710, which is performed with a pop-up keypad. A jackpot value, if appropriate to the bingo variant, is displayed in space 2720. Space 2730 indicates a countdown to the game start.

Figure 28:
FIG. 28 shows a screenshot of bingo game play.

Referring now to FIG. 28 there is shown a screenshot 2800 of bingo game before the player initiates game play. In the illustrative embodiment, the player may be required to touch the PLAY button 2810 to enter the game after the game countdown goes to zero. When it is time for the game to start, the number of players enrolled in the game 2830 may be displayed on the right side of screenshot 2800. Additional game information including rules and prizes may be provided by having the player touch the "Game Info" button 2840. When the bingo game play is occurring, the status 2850 indicates that the bingo game is being played and the player should press the PLAY button 2810 to join the game. When the game is joined, FIG. 28 illustrates the main game screen which may display up to 5 cards. If the player has more than 5 cards in play the screen can be scrolled or moved to show the additional cards, 8 to a screen.

Figure 29:
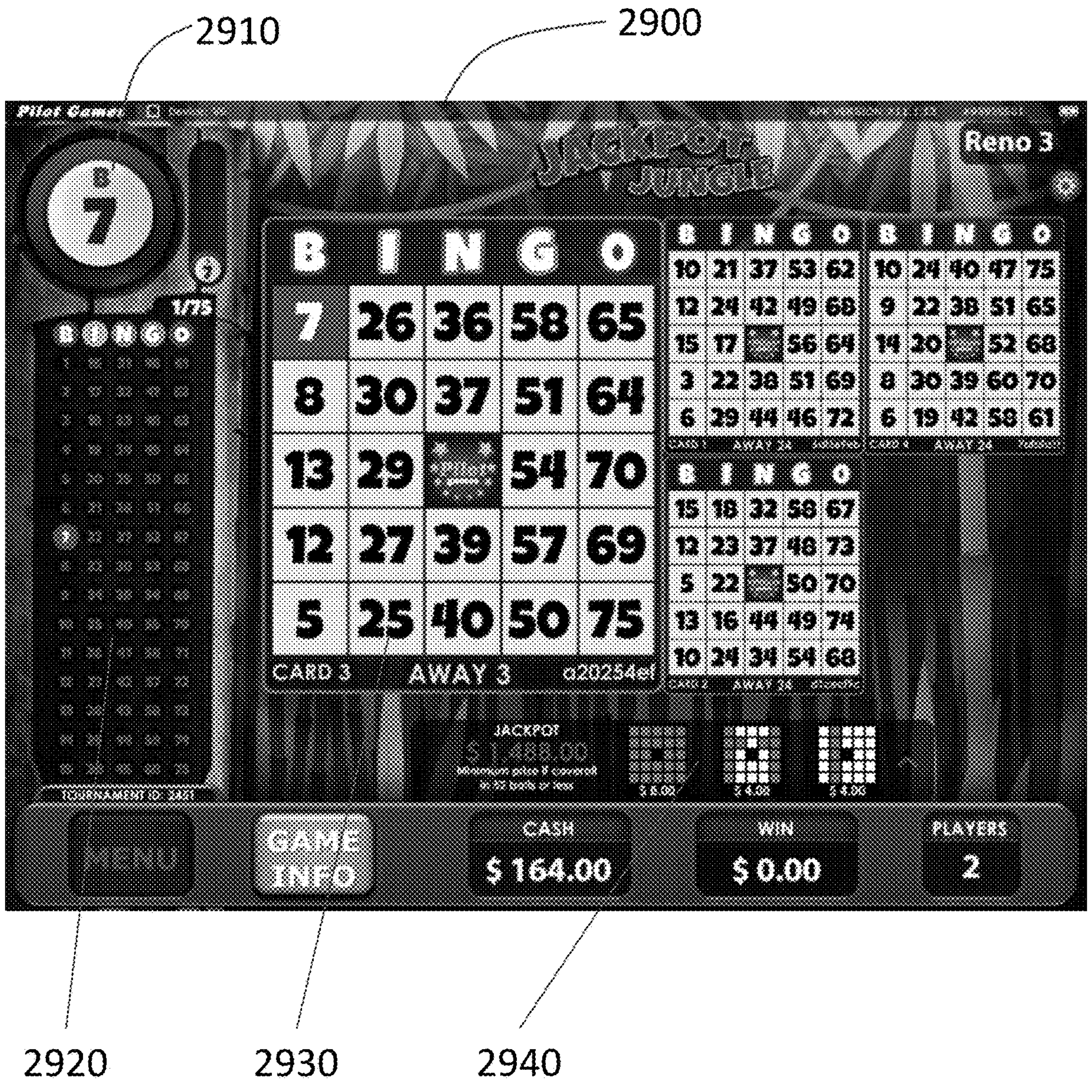
FIG. 29 shows an illustrative screenshot of bingo game play with multiple bingo cards.

Referring still to FIG. 29 there is shown an illustrative screenshot of bingo game play with multiple bingo cards. In the illustrative embodiment, the large card on the first screen is always the one that is closest to getting the next winning pattern. Each card face at the bottom says AWAY X, where X is the number of spaces that need to be filled on the card to get the next winning pattern.

In operation, the central system 100 sends down messages with the ball draws. As each ball draw is revealed the ball is shown on the screen in space 2910. The game board 2920 displays all called numbers and all player cards are marked on the screen as each ball is called. Balls are called at a settable rate in the central system 100. A typical rate may be one ball each 10 seconds, which is similar to the familiar rate that a ball "caller" in a traditional bingo hall might announce balls as they are drawn. A jackpot value may be displayed in space 2930 and the winning patterns and associated prizes are displayed in area 2940. During the ball call the game client may include audio simulating the voice of a caller calling the balls. In the illustrative embodiment, the game displayed has three winning patterns—a straight line, a large M, and a coverall or "blackout", meaning that all 24 fillable spaces are called.

Figure 30:
FIG. 30 shows an illustrative screenshot for a winning bingo pattern.

Referring to FIG. 30 there is shown an illustrative screenshot for a winning bingo pattern. In the illustrative screenshot 3000, the winning bingo pattern is a large M and the awarded prize 3020 is $4.00. As each prize is awarded, the corresponding authorized mobile device presents the awarded prize, e.g., $4.00. If a player is not awarded a prize, then the corresponding authorized mobile device presents a message indicating that another player has been awarded the prize, including the amount, player screen name, and location.

Figure 31:
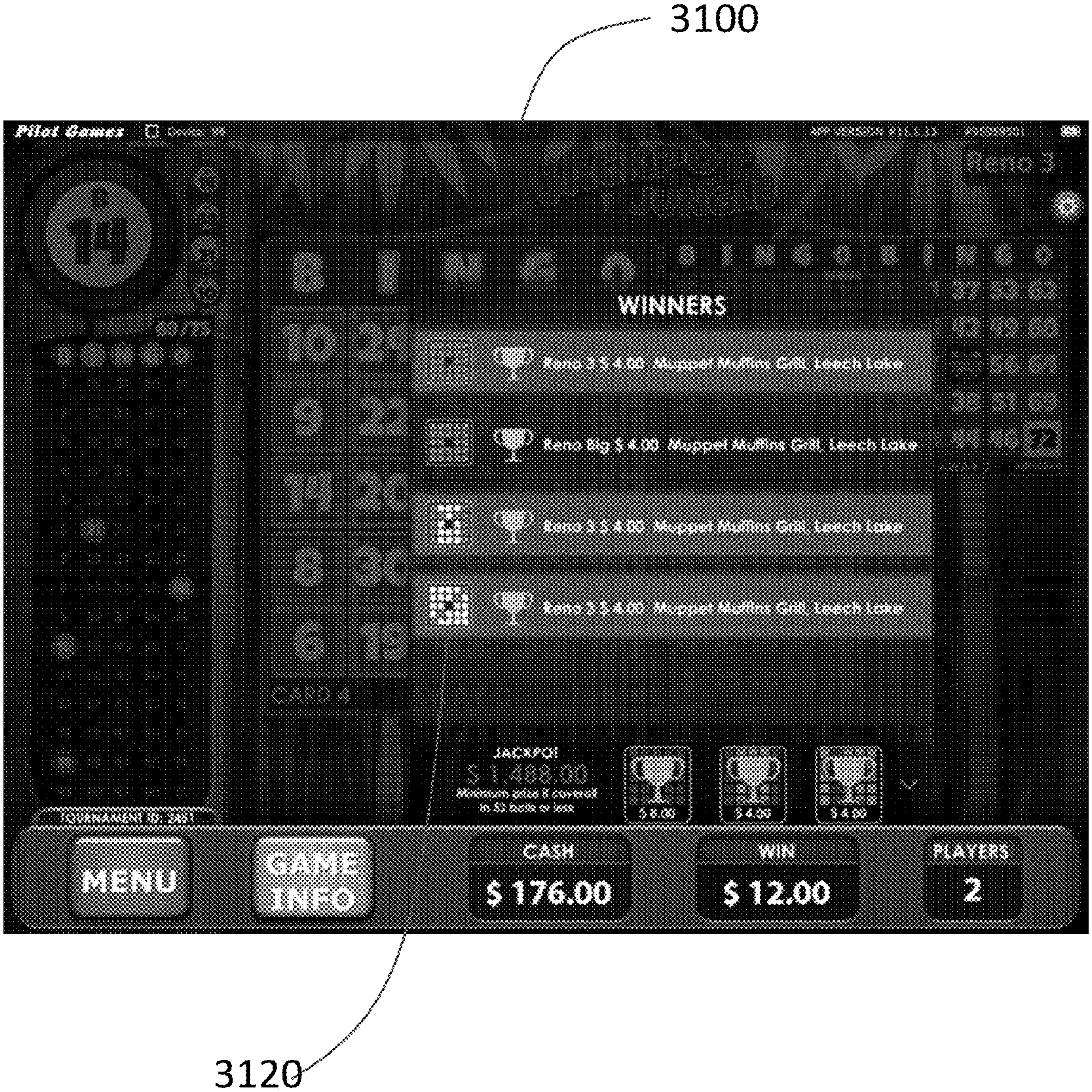
FIG. 31 shows an illustrative winner summary screenshot indicating that all prizes have been awarded for the bingo game.

Referring to FIG. 31, there is shown an illustrative winner summary screenshot indicating that all prizes have been awarded for the bingo the game. In the illustrative embodiment, the illustrative bingo game continues until all patterns are complete. At the end of the bingo game, a list of prize winners is presented to each participating player as shown in the winner summary screenshot 3100. The location, player screen name and amount for each prize awarded are presented in the winner summary screenshot 3100. Prizes may be directly added to the player account balance, except where regulatory or IRS regulation require specific processes.

Figure 32:
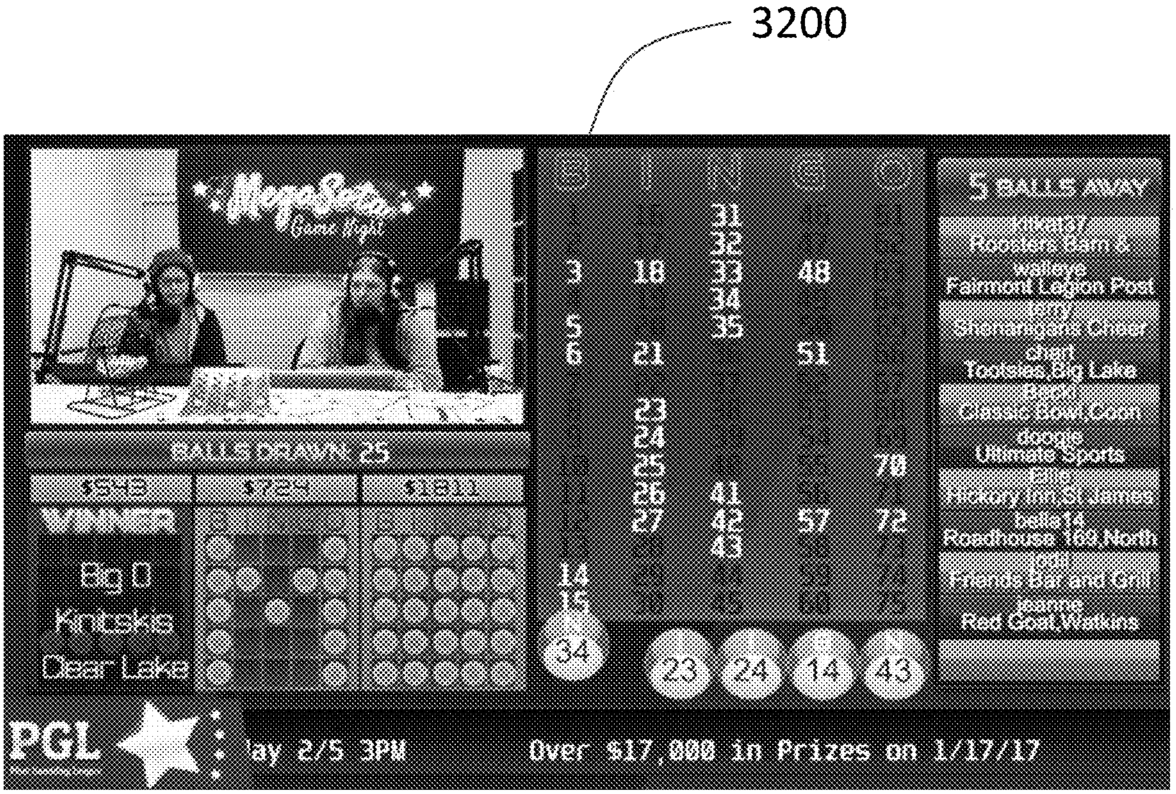
FIG. 32 shows an illustrative VPS broadcast for the bingo game.

Referring to FIG. 32 there is shown an illustrative VPS broadcast 3200 as it might be shown during a bingo game. The player enjoyment of the bingo games is significantly enhanced by the associated presentation on the VPS broadcast. Not only is there the human interest supplied by live hosts, but a competitive element is supplied by listing cards that are getting close to a winning pattern. In a blackout bingo tournament embodiment, the individual bingo cards representing separate game sessions may be listed that remain active in the tournament. The VPS broadcast may also display the number of open or covered spaces on each player's bingo card.

Figure 33:
FIG. 33 shows an illustrative screenshot of graphics for a large VPS stationary display.

Referring to FIG. 33, there is shown an illustrative screenshot of a VPS broadcast focusing on winner data during a bingo game. The screenshot 3300 provides an increased awareness of the winner or winners because the large screen identifies the winning players, their venue and location in real-time during bingo game play.

Figure 34:
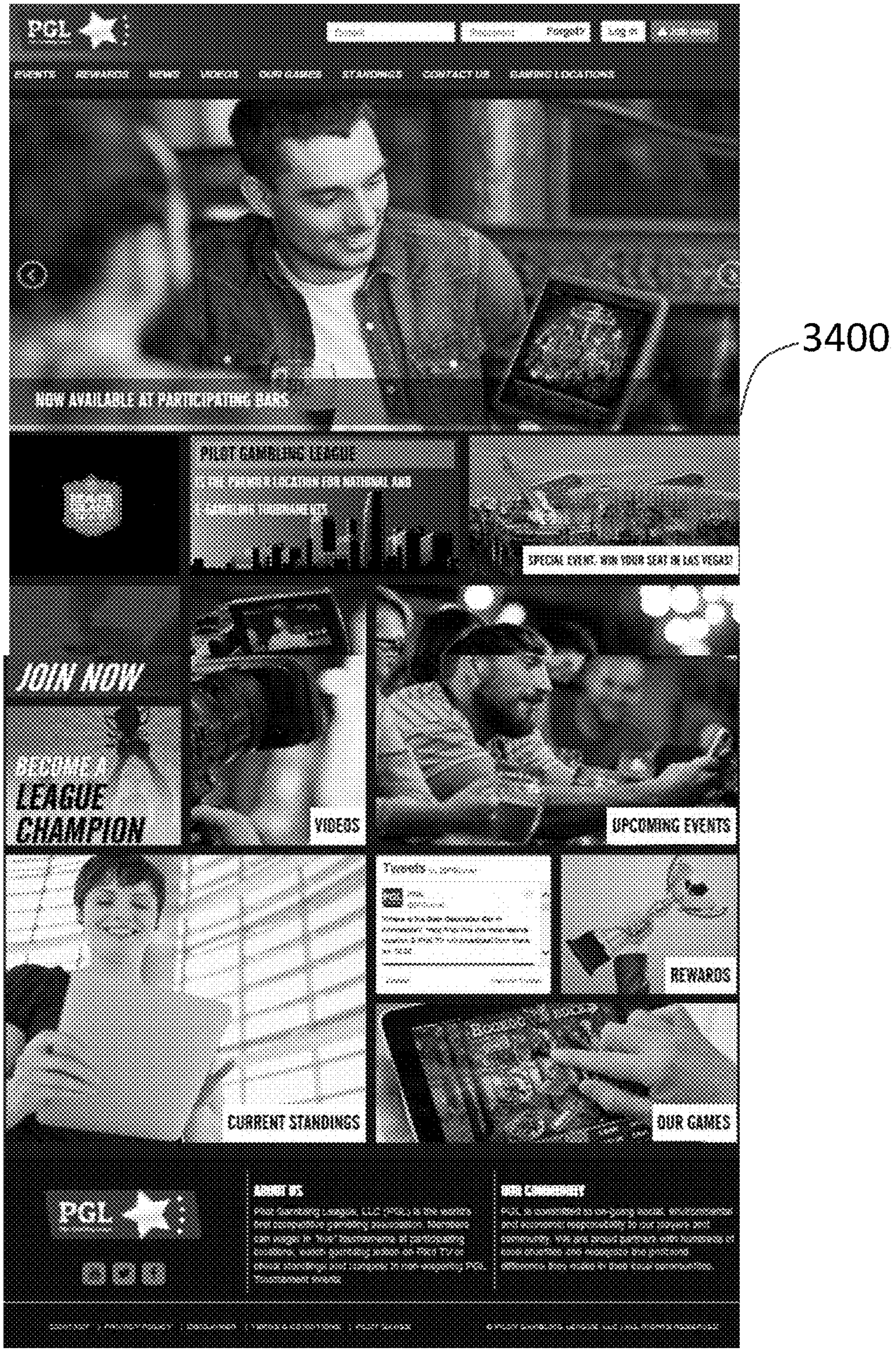
FIG. 34 shows an illustrative Gaming League Website (GLW) main screen.

Referring to FIG. 34, there is shown an illustrative main screen 3400 for a Gaming League Website. The system and methods presented herein support a Gambling or Gaming League Website (GLW), which is a web-based sub-system that interfaces with and is complementary to the Mobile Gaming Sub-System 102 shown in FIG. 1. In the illustrative embodiment, the illustrative gambling league website is commercially identified as the PILOT GAMBLING LEAGUE™ (PGL). The illustrative PILOT GAMBLING LEAGUE™ provides functionality intended to promote player competition between players playing the same game, but in a multiplicity of venues that could be separated by hundreds of miles, and thereby enhancing the feelings of a community event and increasing interest in the associated wagering activity.

Referring back to FIG. 1, there are two technical components of the illustrative Gambling League Website. The first component is referred to as a GLW website server 120, which is accessed with a common browser, e.g., Internet Explorer, Chrome, Safari, or other such browser. Additionally, the GLW website server 120 may be accessed using a computing device 130 that is configured to run a custom Android or iOS "APP." The computing device may be wired or wireless and includes, by way of example, a PC, tablet, or other such computing device that provides Internet access.

The illustrative GLW website server 120 includes a SOL Server database and a software architecture based on .NET, C#, and other such computing languages. The illustrative GLW website server 120 is also communicatively coupled to the mobile gaming sub-system (MGS) 102 with an interface that allows players to log into the GLW 120 or the MGS 102 with the same screen name and password. Additionally, the GLW 120 and MGS 102 both support the common use of player-chosen avatars. Note, in the illustrative embodiment there is no requirement for players on the MGS 102 to login with a password, so that anonymous play is fully supported. However, if players do desire to identify themselves to the MGS 102 with their GLW 120 screen name and password, then they can have the benefit of having aspects of their play transferred to their GLW account. Information that may be transferred from the GLW 120 to the MGS 102 includes scores of tournament, prize winnings, play totals, play locations, number of play sessions, and other such game information.

In operation, periodic tournament scores may be tracked based on the results from the MGS 102 activity. Additionally, the periodic tournament scores are also available to each player that accesses the GLW website server 120. The type of data collected, and corresponding data attributes may vary based upon jurisdictional regulations. In the illustrative embodiment, players may be identified by their chosen screen name and general location. The illustrative website server 120 presents the top players in each region and their corresponding scores and hometown.

Figure 35:
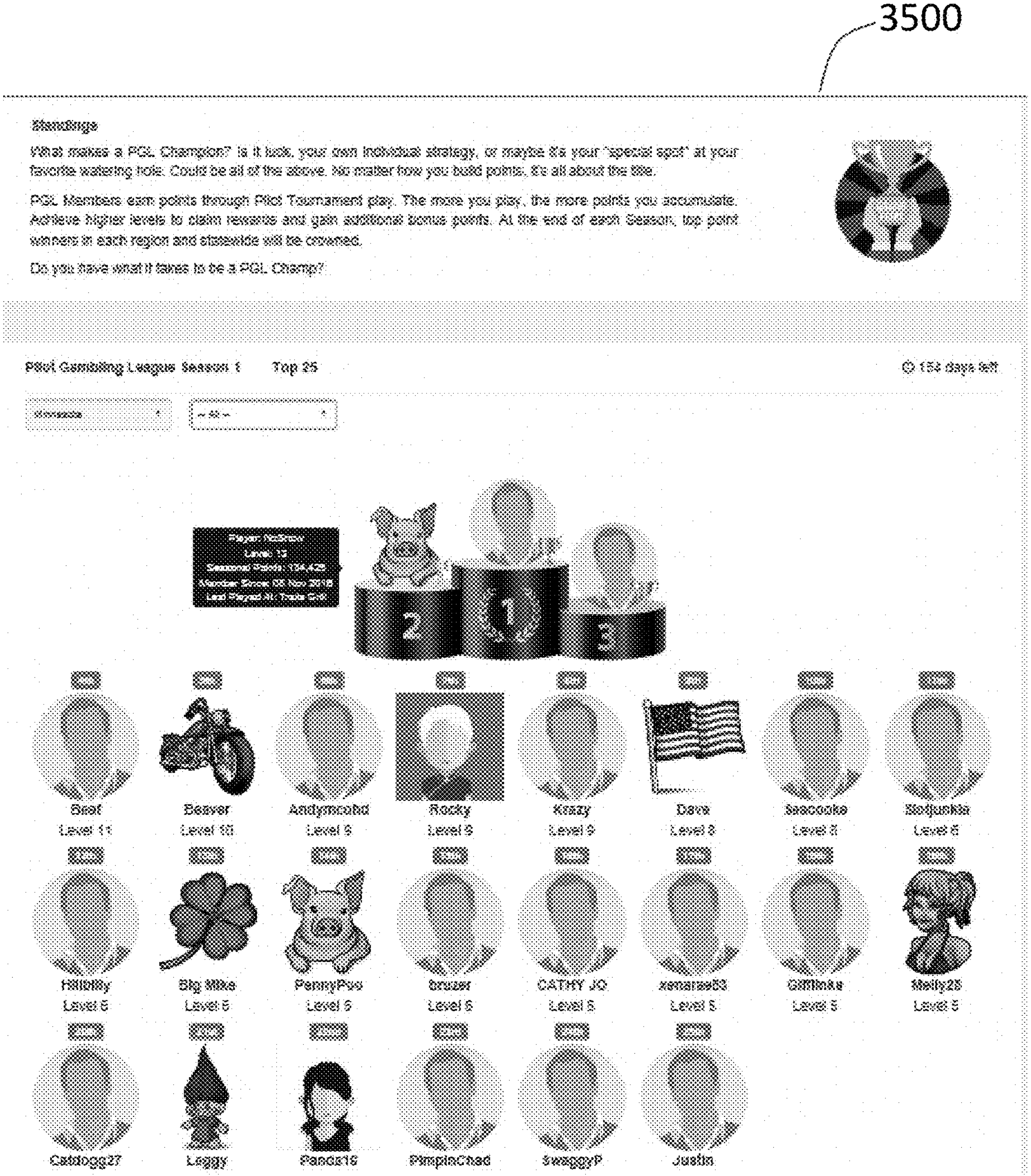
FIG. 35 shows an illustrative GLW screenshot of player standings in a regional or system competition.

FIG. 35 shows an illustrative screenshot of player standings in a regional or system competition. The illustrative screenshot 3500 includes the top players in a particular region.

Figure 36:
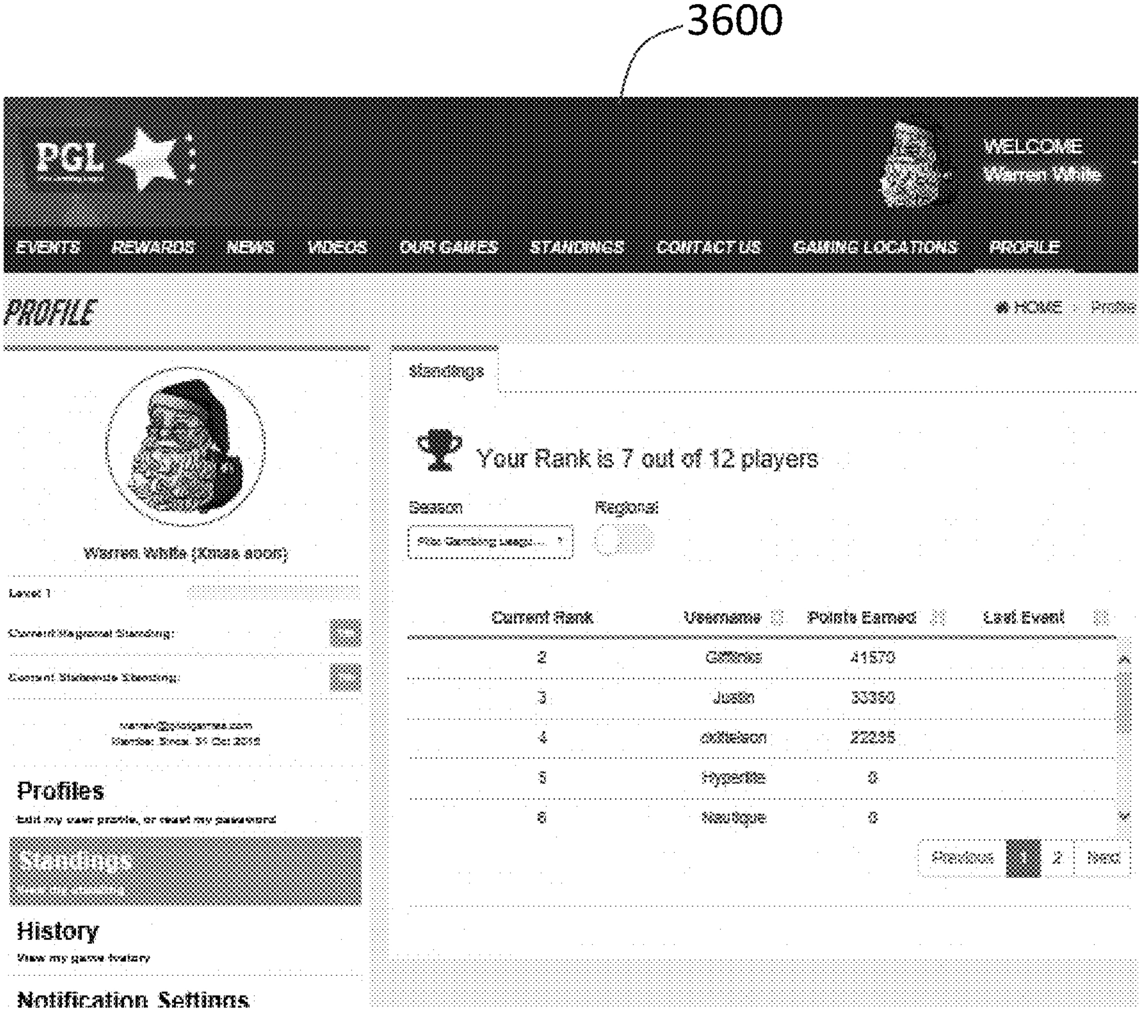
FIG. 36 shows an illustrative GLW portion of the player profile.

Referring to FIG. 36 there is shown a screenshot 3600 of an illustrative portion of the player profile. The screenshot includes the particular player's ranking and additional profile information including profiles, standings, history, and notification settings.

Figure 37:
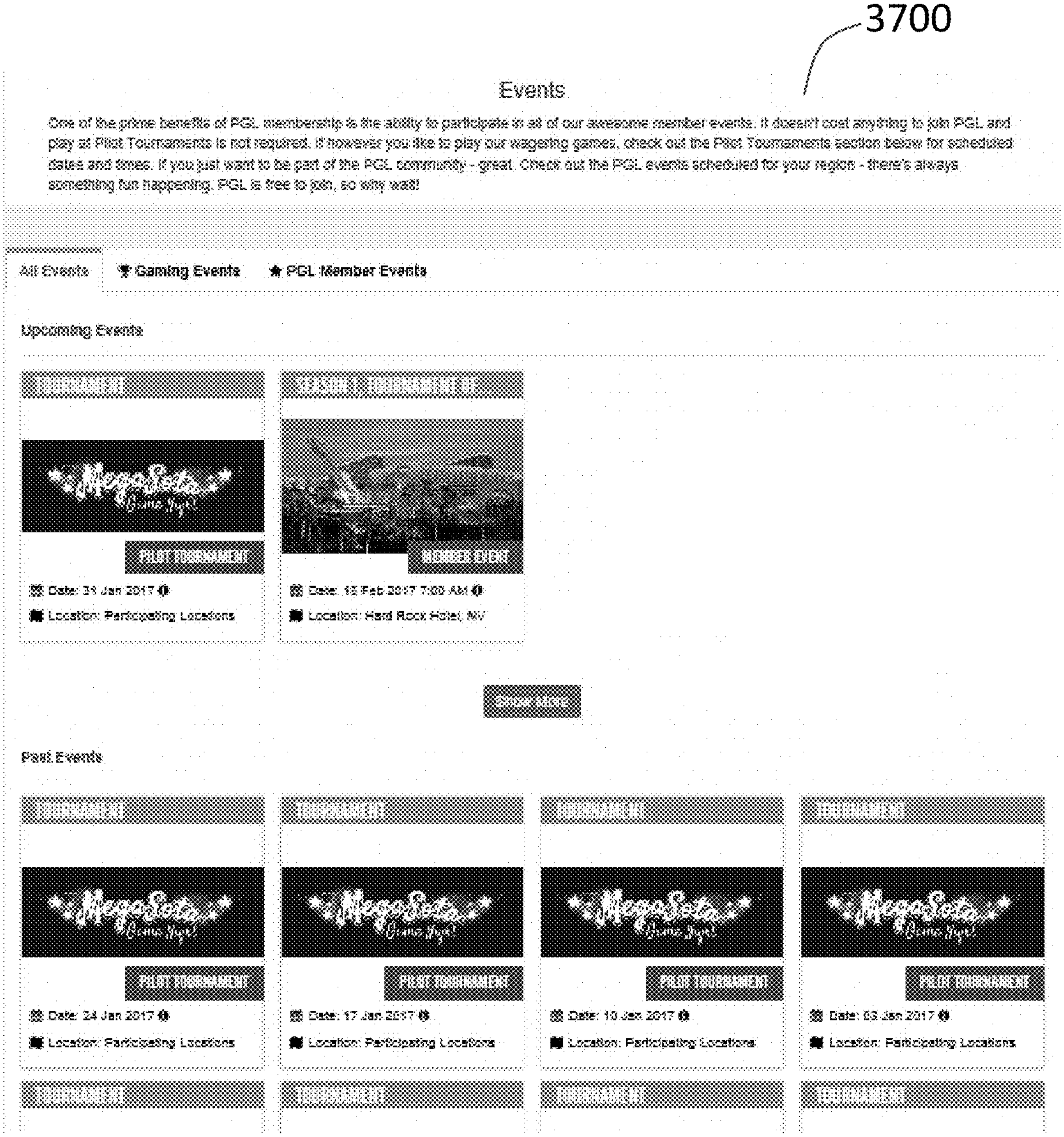
FIG. 37 shows illustrative GLW past events and future events.

Referring to FIG. 37 there is shown illustrative screenshot 3700 of past events and future events. By way of example and not of limitation, the past and future events are tournament events as described above.

Figure 38:
FIG. 38 shows a GLW web page that includes gaming venues that are communicatively coupled to the mobile gaming sub-system locations.

Referring to FIG. 38 there is shown a web page that includes gaming venues that are communicatively coupled to the mobile gaming sub-system locations. The players may access this "locations" web page 3800 to locate venues for game play that support the systems and method presented herein.

Figure 39:
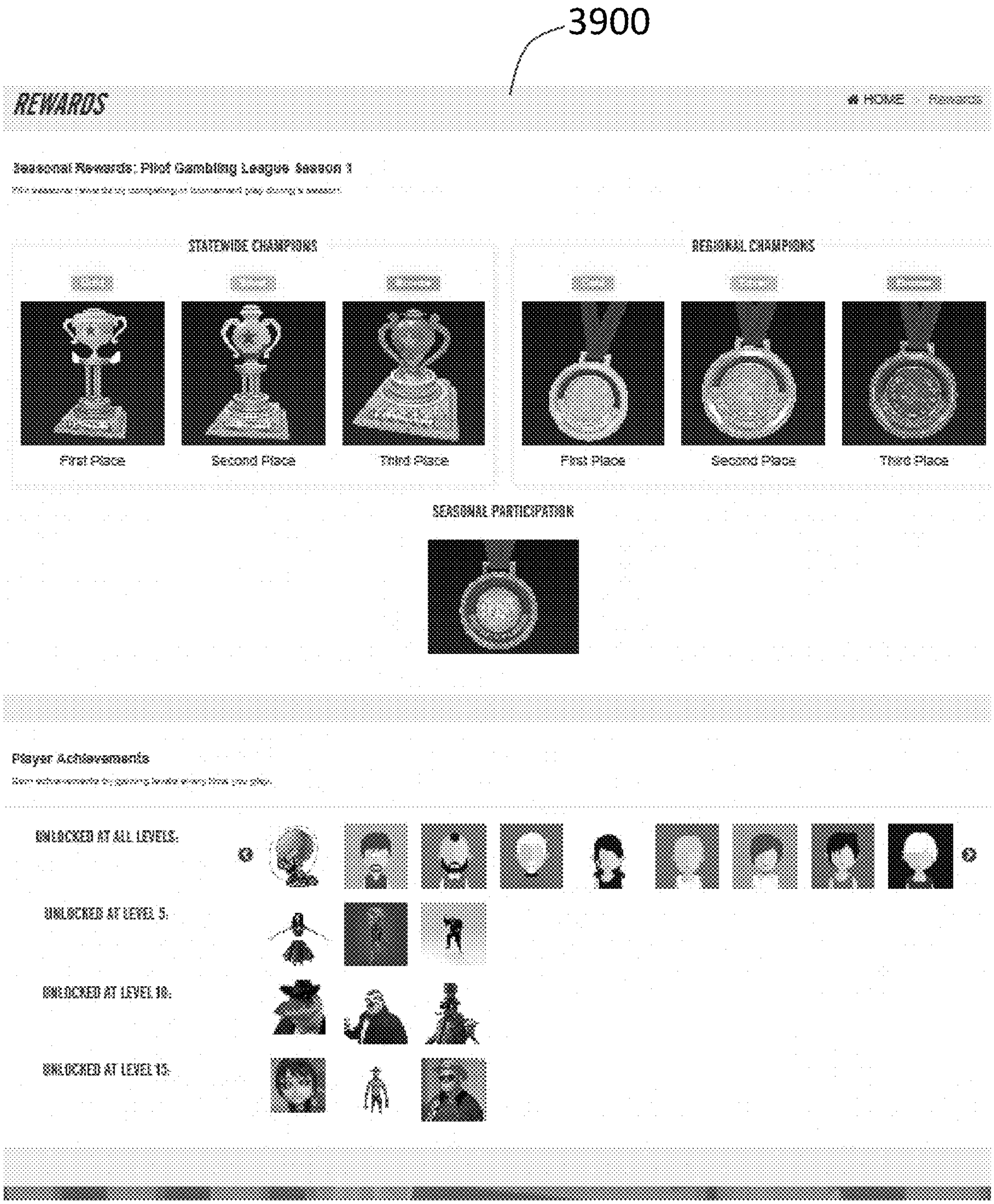
FIG. 39 shows an illustrative GLW screenshot of a player's available virtual rewards.

Referring to FIG. 39 there is shown an illustrative screenshot 3900 of a player's virtual rewards. For example, players may also qualify for "vanity awards." These vanity awards may be granted based on player performance. The vanity awards may provide an expanded choice of avatars, a graphic trophy or trophies that are associated with their screen names, and other such virtual items or awards. The vanity awards may be presented in at least one of the GLW website server 120, the mobile gaming sub-system 102 and the Video Presentation System 104. For example, if a player has won a regional virtual gold trophy prize, then the virtual gold trophy prize may be displayed on the VPS television when the player plays in a new tournament. The player's chosen screen name, avatar and the virtual gold trophy may be displayed on the various VPS television, which may be located in hundreds of participating venues.

Figure 40:
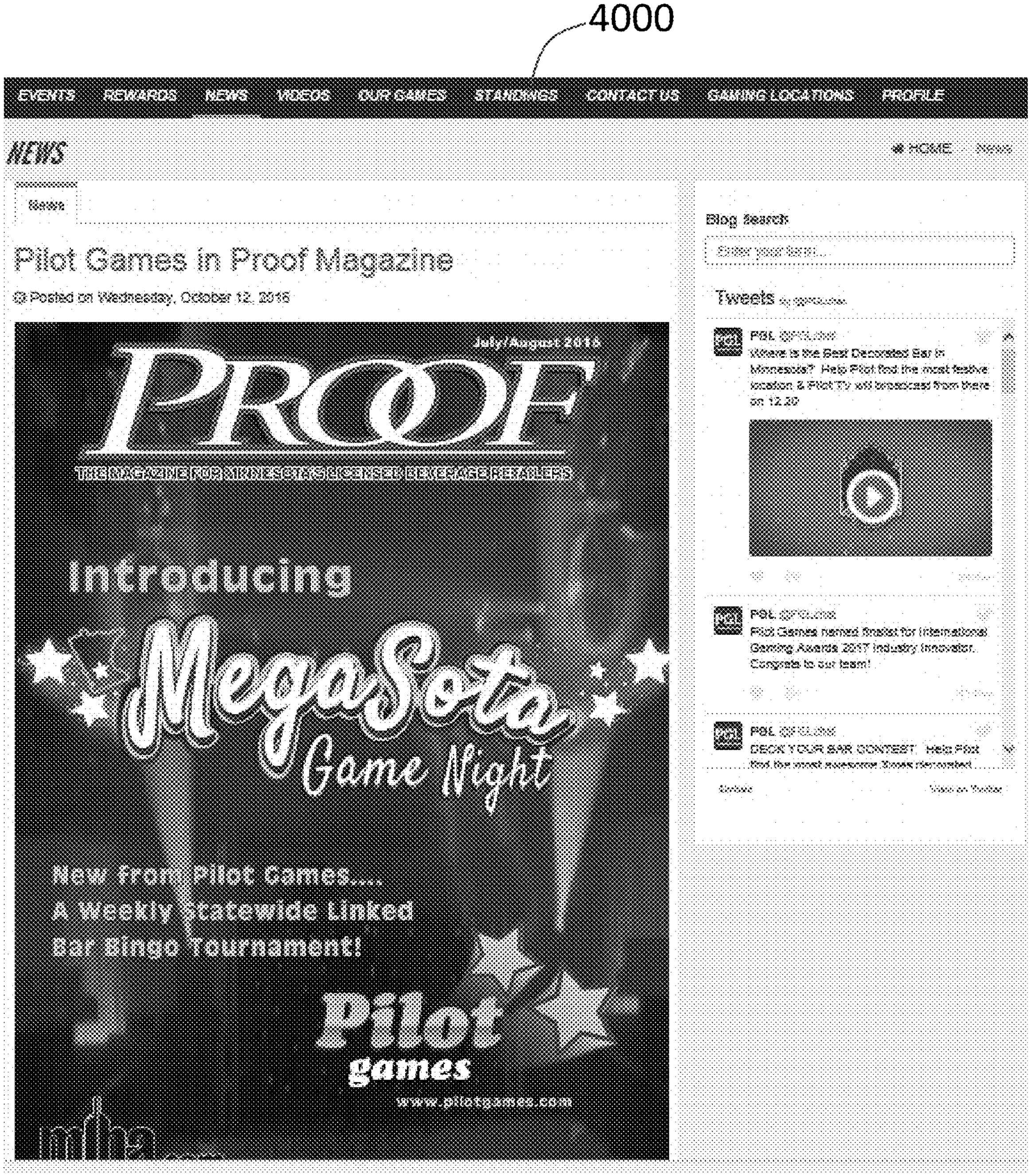
FIG. 40 shows an illustrative GLW screenshot of news, blogs and tweets.

Referring to FIG. 40 there is shown an illustrative screenshot 4000 of news, blogs, and tweets for the Gaming League Website. The illustrative screenshot 4000 may be used to periodically invite GLW members to a regional promotional tournament awarding promotional prizes at a venue in the region. Furthermore, winners of regional tournaments may be invited to a Tournament of Champions, which will take place at a premium location. Further still, a Grand Prize winner may also be selected for a promotional cash or merchandise prize. These competitions or events may be shown live or on video to all players in their normal gaming venues using the Video Presentation System 104.

Figure 41:
FIG. 41 shows an illustrative GLW embodiment of MGS game libraries presented to players.

Referring to FIG. 41 there is shown an illustrative screenshot of the MGS 102 game libraries presented to players. The screenshot 4100 shows that there are three different game types, namely, tournament bingo games, coverall/blackout bingo and pull tab games.

The GLW 120 and MWS 102 systems are communicatively coupled to the VPS 104, which is communicatively coupled to the VPS video display as shown in FIG. 1. The VPS display provides the opportunity to highlight GLW players and the GLW events. The VPS display may be used to highlight regional standings, announce regional winners, show live or video clips of regional events, show live or video clips of the Tournament of Champions, show Interviews with PGL players, and other such GLW information. This close interaction between the VPS 104, MGS 102 and GLW 120 creates a social atmosphere, a spirit of competition, a sense of accomplishment, and improve the success of the wagering enterprise.

The illustrative gaming systems and methods presented above may include a plurality of server applications that configured to provide high-availability and redundancy, processes all inputs, generates outputs, and maintains a central database for accounting, game play, system configuration data, and other such data types. By way of example and not of limitation, critical system data regarding clients may be maintained a repository associated with the illustrative gaming system. Historical games results and leader board information may be maintained. Printable versions of this information may be available on the portal.

The illustrative client devices described in the illustrative embodiments are communicatively coupled to a gaming system database, which stores client device data. Additionally, the illustrative gaming system database is configured to be secure. Furthermore, the illustrative gaming system database manages the data that is received from client devices in geographically dispersed venues.

The illustrative centralized gaming system may be disposed in a central site as described herein. The illustrative centralized gaming system may process information received over the internet backbone from client devices such as mobile devices, management terminals and other such client devices.

The illustrative MGS sub-system manages the funding of game play and operation of wagering games and overall system management. All gaming messaging between servers and client devices is sent and received over a secure internet network that directs network traffic to the appropriate server elements. A Portal service receives messages from management terminals and provides functionality to authorized users to control the system and access real-time and historical data. All server applications are structured to be deployable in a virtual server environment, configured for high availability with fail-over capabilities on hardware components and database structures that keep a multiplicity of all data records.

By way of example and not of limitation, the games supported by the gaming system include electronic pull-tabs, linked bingo, high-speed linked bingo with entertainment, bingo tournaments, slot games, video poker, multi-player poker, blackjack, roulette, and other casino or entertainment games.

Many game types, including electronic pull-tabs and the entertainment aspect of linked bingo have bonus modes that award prizes based on a theme-specific animation. Often these features take more play time than a conventional game. While these features are entertaining, many players who have played the games for some period of time find the time spent in animation wasteful. Therefore, this system features a unique option at the beginning of any potentially long bonus animation. The player is presented with a screen announcing the bonus and then is presented with an option to proceed with the bonus animation or bypass the animation and go directly to the prize award at the end of the animation.

It is clear that the infrastructure of the MGS with the added capabilities of the VPS can support a wide variety of game types, in addition to the ones described herein. Those games include slot machine games, video lottery games, poker, blackjack, skill-based games, among others.

It should be noted that in jurisdictions that allow gaming outside of physically licensed areas some of the above-mentioned security considerations may be relaxed or replaced by more appropriate mechanisms.

The promotional bingo gaming systems and methods described herein may also be configured to operate on a personal mobile device such as a wireless device, e.g., a smartphone. The illustrative systems and methods support the use of a personal mobile device for a promotional bingo game and promotional bingo tournament. For personal mobile devices to be utilized in the promotional bingo gaming system presented herein, the user's age must be identified, verified, and authenticated. Additionally, the location of the user must also be identified, verified, and authenticated.

Note, the terms authentication, identification, and verification may be used interchangeably, unless the terms are used for a more particular definitional purpose. For purposes of this patent, the term "authentication" refers to the process of re-establishing the identity of a user and verifying that the identity is valid after performing an identification step and an initial verification step.

The term "identification" is the ability to identify uniquely a user of a system or an application that is operating in the system—a driver's license is an example of identification. Identification asks, "who are you?" In this context, the term "authentication" refers to the ability to prove that the user is genuinely who that person claims to be.

With respect to "verification," the question asked is "are you actually whom you say you are?" The verification process is necessary to establish a reliable connection between a person who claims to be someone and who requires identity verification. Usually, the verification process begins with the verification of government-issued identification documents. Identity verification is conducted only once. Once verified, the identification of a user must be authenticated each time the user tries to gain access to the gaming system. In the authentication step, users are asked to re-confirm that they are the same people who have already been identified and verified.

Sometimes the term "validation" will also be used in this patent. The term "validation" refers to applying certain rules to inputted data. If the data does not follow the rules, it is rejected, reducing the risk that incorrectly input data may crash a program. Using "validation" helps to ensure that any data input is possible and sensible.

The illustrative systems and methods presented herein show two different ways to identify, verify and authenticate the location of the user. In a first embodiment, GPS is used to authenticate the location of the user. In a second embodiment, a managed network is used to limit promotional play on personal mobile devices to locations that may be associated to other regulated games, e.g., a Class II slot machine.

The systems and methods described herein relate to a promotional bingo tournament associated with one or more venues and the location of each the venues. The systems and methods support limiting user participation based on location, i.e., venue. Additionally, the system and methods support combining the results from different participation groups into one or more presentations. Note, the presentations may be displayed on a stationary monitor, a plurality of personal mobile devices, or the combination thereof.

This promotional bingo gaming systems and methods include a presentation component such as a stationary monitor 110 that presents various aspects of tournament game play such as a tournament leaderboard. Various tournaments leaderboards are described herein that include, by way of example and not of limitation, a leader for finalists, a leaderboard for consolation prizes and a leaderboard for all players. Other leaderboards may also be presented that are dependent on a tournament based theme game such as a fishing game, in which there may be various destinations and each destination may include a particular leaderboard. For the illustrative fishing game, the leaderboard may be based on the type of fish caught, or the quantity of fish caught, or the total points associated with all the caught fish.

Figure 42A:
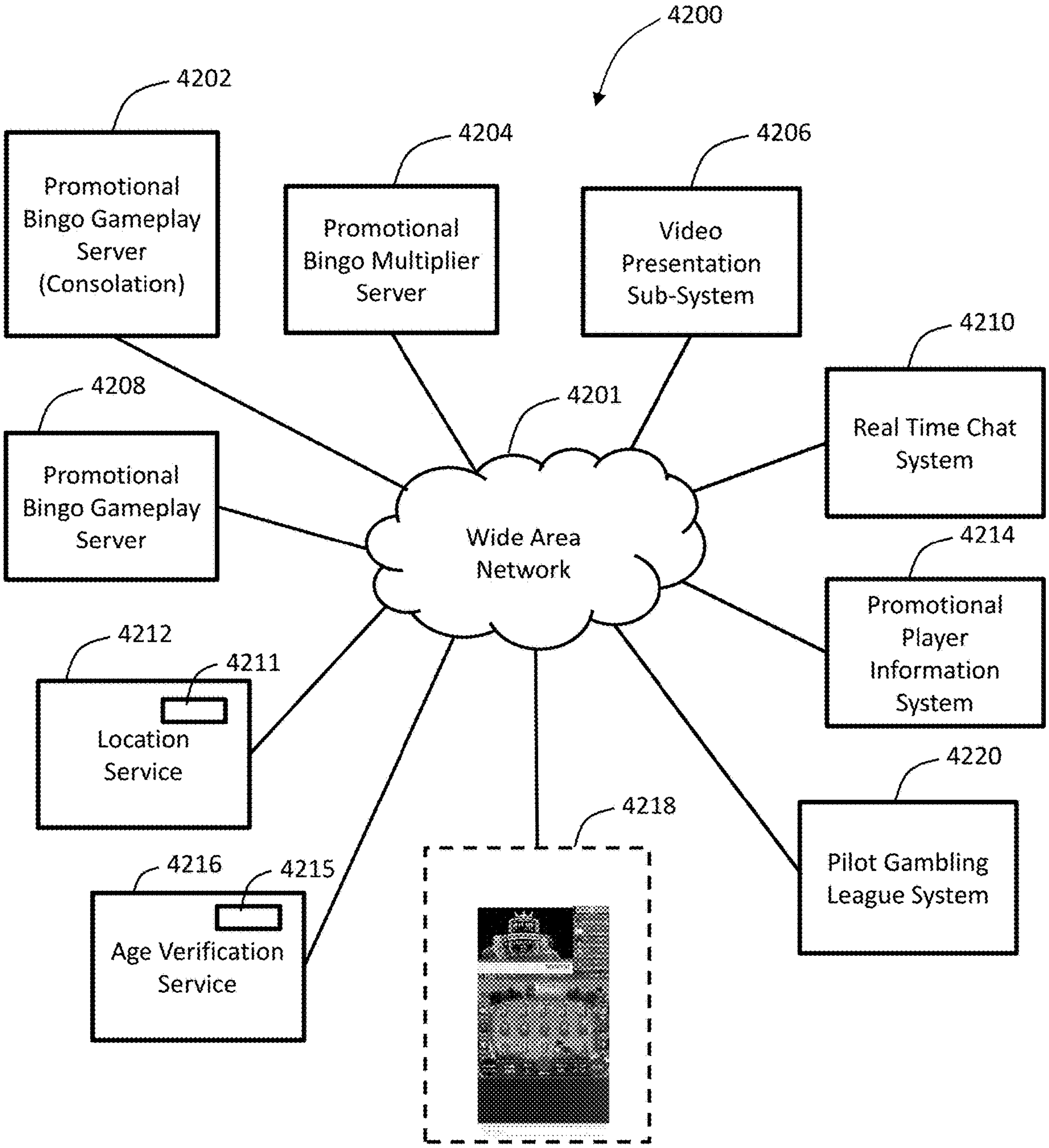
FIGS. 42A and 42B show various illustrative sub-systems for the promotional bingo tournament gaming system that supports a plurality of personal mobile devices.

Referring to FIG. 42A, there is shown various illustrative sub-systems for the promotional bingo tournament gaming system 4200 that supports a plurality of personal mobile devices. The illustrative sub-systems are communicatively coupled to one another via an illustrative wide area network 4201, which includes the Internet. Alternatively, the systems may more vertically integrated and be associated with a particular venue.

The gaming system 4200 includes an age verification and authentication component 4215 that is associated with an age verification service 4216. Additionally, the gaming system include a location authentication component 4211 associated with a location service 4212. A mobile promotional gaming sub-system may be embodied as one or more bingo game play servers such as promotional bingo gameplay server 4208 and consolation promotional bingo gameplay server 4202. Additionally, the system 4200 may include a promotional bingo multiplier server 4204.

An illustrative video presentation sub-system 4206 has been described above. In this embodiment, the video presentation sub-system 4206 is configured to combine the game play results and present the game play results to the players who are participating and to any spectators that are watching with a personal mobile device capable of presenting the illustrative user interface 4218. The user interface 4218 may include a real time chat managed and controlled by the real time chat system 4210. In the illustrative embodiment, the user interface 4218 may display a real time chat that is managed and controlled by the real time chat system 4210.

The promotional Player Informational System (PIS) 4214 includes information that is specific to promotional play for particular users. For example, each user may have his location restricted, and the location restrictions can be varied based on the rules of the game. Therefore, based on the player's information in the PIS, a determination is made at decision diamond whether there are any location restrictions associated with that particular player. The determination of whether player location is restricted may be determined by examining the Player Information System. Additionally, the PIS may also provide information about age restrictions, determine if the player has previously passed any age-related checks, and if a new age checks are required.

Figure 57:
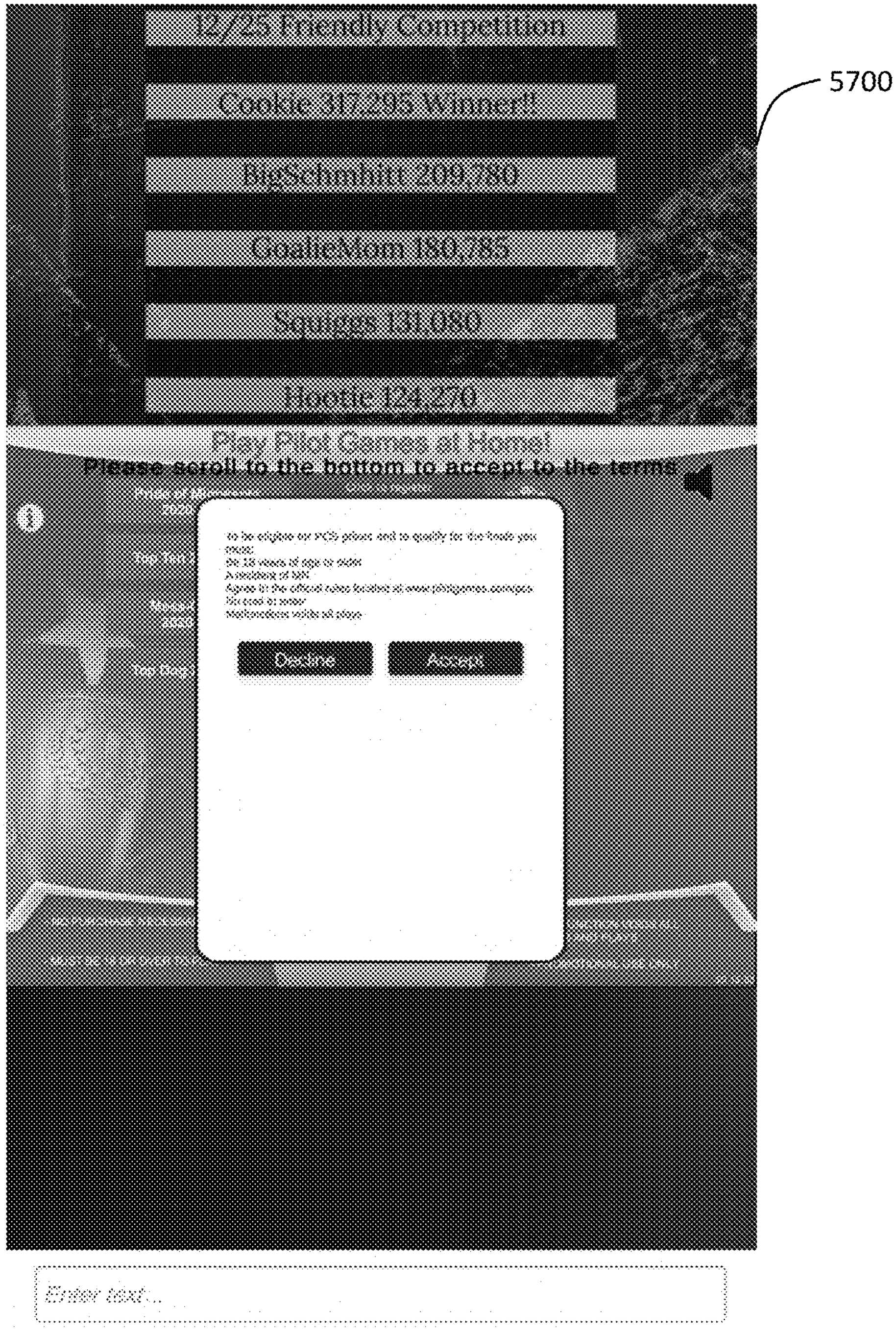
FIG. 57 shows an illustrative screenshot of a player agreeing to the terms of service and conditions for game play.

The Pilot Gambling League (PGL) system 4220 creates and hosts accounts for the promotional bingo tournament gaming system 4200. In the illustrative embodiment, the user creates an avatar name or chooses an avatar as shown in FIG. 57. When creating the avatar, the user provides an email address and secure password to the system. By way of example and not of limitation, each time the mobile application is started, the user is prompted to enter the email address and password and once verified the player will be identified by the avatar name.

In operation the gaming system 4200 associates at least one venue with a promotional bingo tournament. A plurality of personal mobile devices participates in the promotional bingo tournament. Each personal mobile device is associated with a player registration identifier.

As described in further detail below, the age authentication component associated with age verification service 4216 authenticates an age for each player having the player registration identifier.

The location authentication component associated with the location service 4212 authenticates a location for each personal mobile device corresponding to each player having the player registration identifier.

By way of example and not of limitation, the illustrative mobile promotional gaming sub-systems 4202, 4208 and 4204 are communicatively coupled to the plurality of personal mobile devices over a wireless network that may operate using Wi-Fi or 4G/5G communication protocols.

With respect to game play, the promotional bingo tournament includes a promotional bingo tournament session that is played at a scheduled time for a duration of time as described above. The promotional bingo tournament also includes a promotional bingo tournament result and a plurality of promotional bingo game sessions that are associated with promotional bingo gameplay server 4208, consolation promotional bingo gameplay server 4202, and a promotional bingo multiplier server 4204.

During game play, each personal mobile device is associated with at least one promotional bingo game session that includes a promotional bingo game session result. A promotional bingo tournament session prize is awarded by the mobile promotional gaming sub-system when the at least one promotional bingo game session result satisfies a promotional bingo tournament requirement.

The video presentation sub-system 4206 is communicatively coupled to the mobile promotional gaming sub-systems 4202, 4208, and 4204. The video presentation sub-system includes a leaderboard associated with the promotional bingo tournament game sessions and the promotional bingo tournament session prize. A stationary monitor client 130 (shown in FIG. 1) is disposed at the venue and the stationary monitor client is communicatively coupled to the video presentation sub-system. The stationary monitor client displays the leaderboard and the promotional bingo tournament session prize from the video presentation sub-system.

In one embodiment, the video presentation sub-system 4206 generates an integrated broadcast announcement about the promotional bingo tournament session as described previously. The integrated broadcast announcement combines at least one promotional bingo game session result and a commentary about the at least one promotional bingo game session result as described above. Each personal mobile device includes a user interface 4218 that displays at least one promotional bingo game session result and the integrated broadcast announcement. Also, the stationary monitor client 130 displays the integrated broadcast announcement from the video presentation sub-system 4206.

In another embodiment, the leader board is communicated to each personal mobile device via the user interface 4218.

In yet another embodiment, the system includes an illustrative promotion bingo multiplier server 4204 that may be associated with a bonus game session, in which the bonus game session includes a plurality of bonus game events. Also, a triggering event initiates a bonus game event, and the bonus game event includes a bonus game event animation. A bonus prize is awarded by the mobile promotional gaming sub-system to each personal mobile device when the bonus game event satisfies a bonus requirement. By way of example, the bonus prize is a point multiplier awarded to each personal mobile device that satisfies the bonus requirement.

Figure 42B:
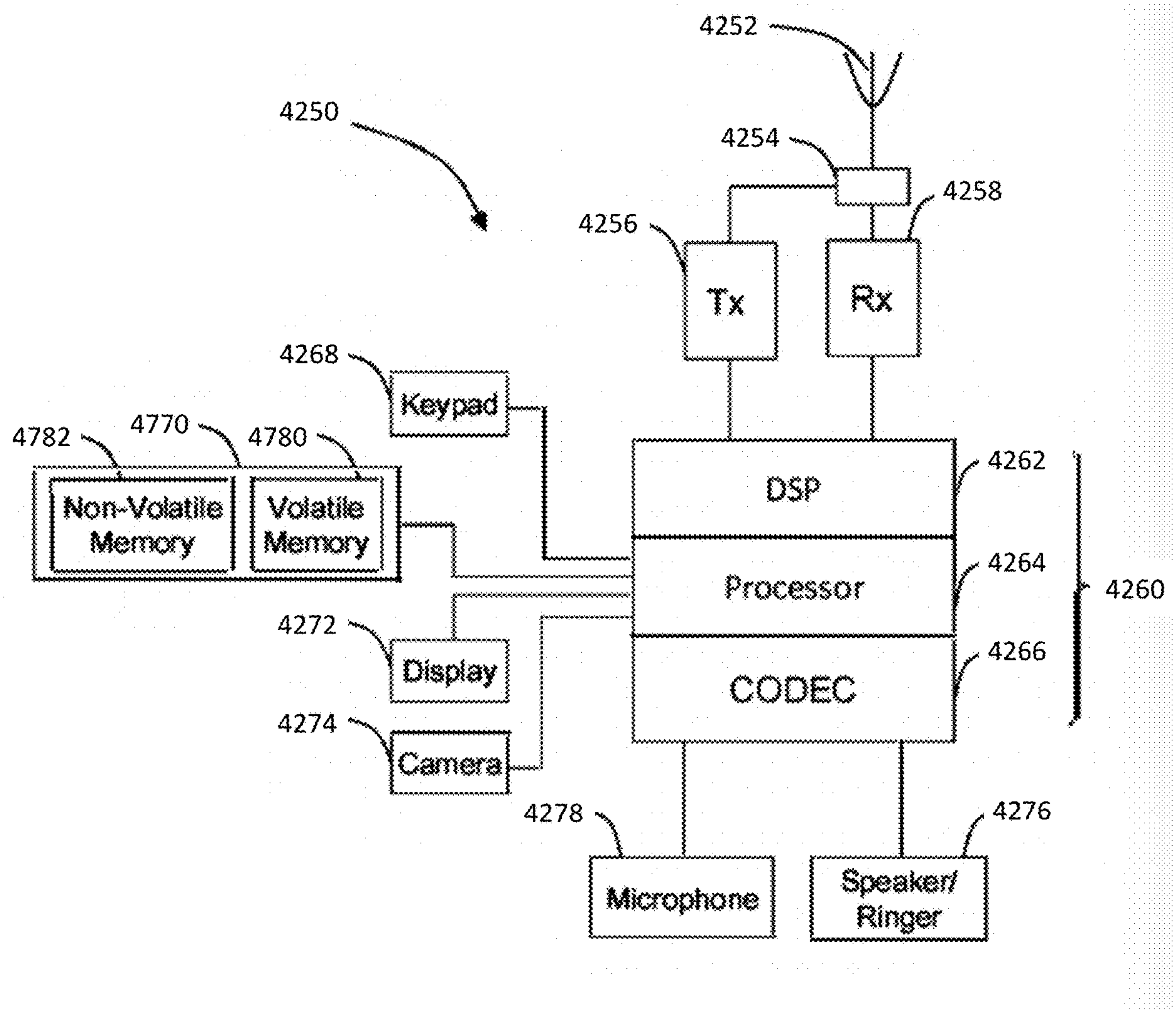

Referring to FIG. 42B there is shown the electrical components for an illustrative unregulated wireless personal mobile device 4250 that presents the user interface 4218. By way of example and not of limitation, the unregulated wireless personal mobile device 4250 is a multimode wireless device that comprises a first antenna element 4252 that is operatively coupled to a duplexer 4254, which is operatively coupled to a multimode transmitter module 4256, and a multimode receiver module 4258.

An illustrative control module 4260 comprises a digital signal processor (DSP) 4262, a processor 4264, and a CODEC 4266 that are communicatively coupled to the transmitter 4256 and receiver 4258. It shall be appreciated by those of ordinary skill in the art that the transmitter module and receiver module are typically paired and may be embodied as a transceiver. The illustrative transmitter 4256, receiver 4258, or transceiver is communicatively coupled to antenna element 4252.

The DSP 4262 may be configured to perform a variety of operations such as controlling the antenna 4252, the multimode transmitter module 4256, and the multimode receiver module 4258. The processor 4264 is operatively coupled to a keypad 4268, a memory 4270, a display 4272, and camera 4274. Additionally, the processor 4264 is also operatively coupled to the CODEC module 4266 that performs the encoding and decoding operations and is communicative coupled to a speaker or ringer 4276, and a microphone 4278. The CODEC module 4266 is also communicatively coupled to the display 4272 and provides the encoding and decoding operations for video.

The memory 4270 includes two different types of memory, namely, volatile memory 4280 and non-volatile memory 4282. The volatile memory 4280 is computer memory that requires power to maintain the stored information such as random access memory (RAM). By way of example and not of limitation, images presented in preview mode would use the storage resources corresponding to the volatile memory 4280. The non-volatile memory 4282 can retain stored information even when the unregulated wireless personal mobile device 4250 is not powered up. Some illustrative examples of non-volatile memory 4282 include flash memory, ROM memory, and hard drive memory. In the illustrative embodiment, the captured image is processed using a volatile memory 4280 and stored in the non-volatile memory 4282.

In various embodiments, unregulated wireless personal mobile device 4250 may be a mobile handset, mobile phone, wireless phone, portable cell phone, cellular phone, portable phone, a personal digital assistant (PDA), a tablet, a portable media device, or any type of mobile terminal which is regularly carried by an end user and has all the elements necessary for operation in a wireless communication system, additionally the unregulated wireless personal mobile device 4250 may be a stationary home computer, a stationary computing device, or an electronically accessible vehicle that is Wi-Fi enabled. The wireless communications include, by way of example and not of limitation, CDMA, WCDMA, GSM or UMTS or any other wireless communication system such as wireless local area network (WLAN), Wi-Fi or WiMAX. The unregulated wireless personal mobile device 4250 comprises a device content interface. The device content interface is a graphical user interface that displays content on a display of the unregulated wireless personal mobile device 4250. The device content interface may also be configured to receive end user input, such as feedback pertaining to the displayed content and user-created content. The device content interface may be an application running on a processor of the unregulated wireless personal mobile device 4250. In other embodiments, the device content interface is accessed via network, for example, using an internet browser application or a cloud service specific application running on a processor of the unregulated wireless personal mobile device 4250.

Figure 43:
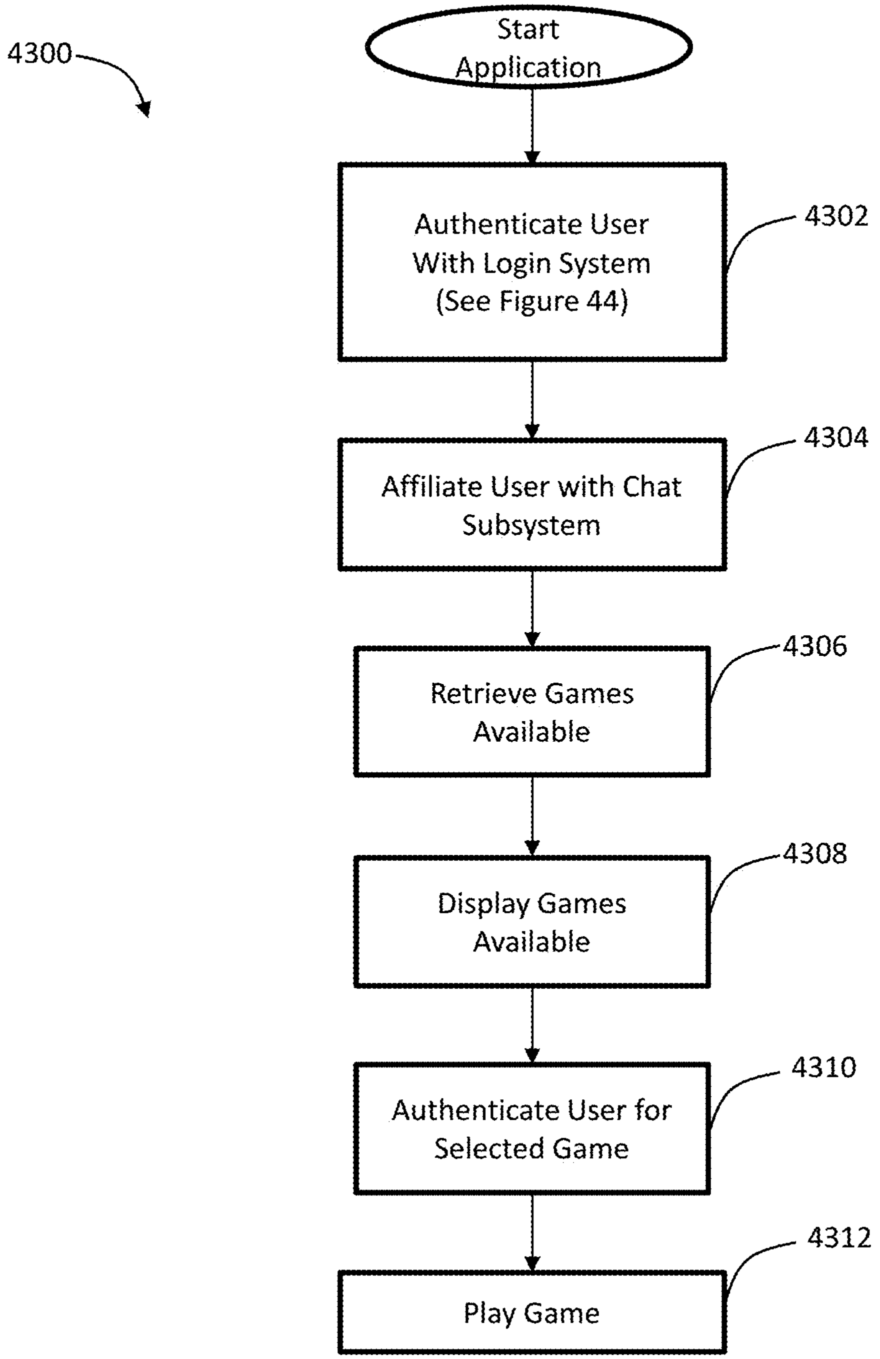
FIG. 43 shows an illustrative login process for a player.

Referring to FIG. 43, there is shown an illustrative login process for a player. The method is initiated at block 4302 where the player is identified, verified, and authenticated. Additional details about the processes related to block 4302 are described in FIG. 44. In the illustrative embodiment, the player is authenticated with the Pilot Gambling League (PGL) system.

The method then proceeds to block 4304 where the chat subsystem 4210 (see FIG. 43) is associated with the player during a gaming session. At block 4306, a variety of different games are retrieved for the player. The game retrieval process may be based on jurisdictional requirements. For example, a particular type of game such as a Class II (Bingo) type game may be required in a particular jurisdiction. Also, the game selection or retrieval process may be based on user preferences such as previously played games, games where the user was awarded the largest prizes, or games that the user played the longest. Other such criteria may be used to retrieve the appropriate games.

The method then proceed to block 4308 where the available games are presented to the player. At block 4310, the user is again authenticated. However, at block 4310, the authentication is associated with a user selected game. At block 4302, the player is identified, verified, and authenticated to access all the systems and methods presented. Thus, block 4302 grants access to the PGL system and block 4310 grants access to a particular game operating within the PGL system. At block 4312, the player proceeds to play the game.

Figure 44:
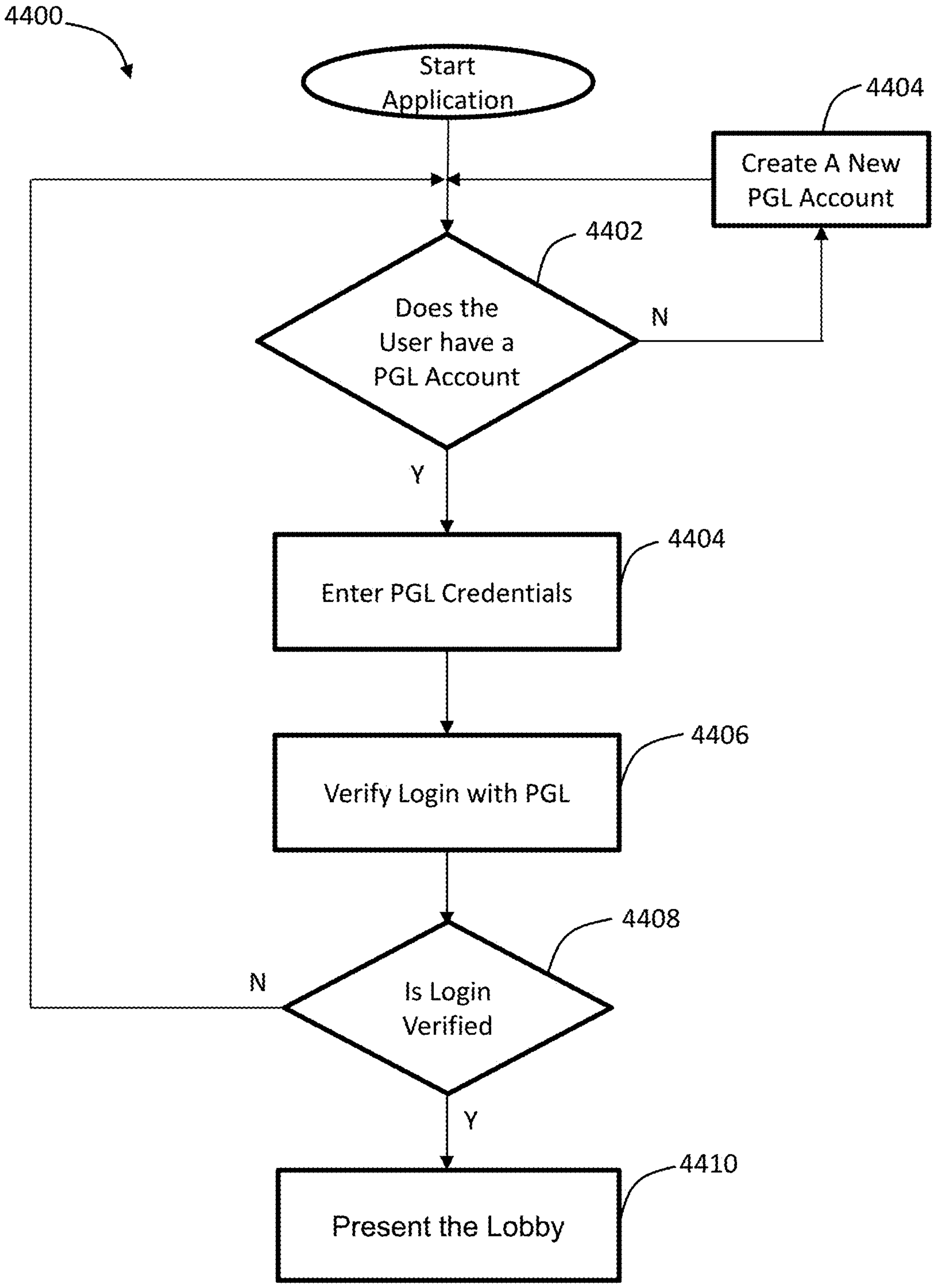
FIG. 44 shows a more detailed login process.

Referring to FIG. 44 there is shown an illustrative login process 4400. The login process 4400 begins at decision diamond 4402 where a determination is made whether the player, also referred to as a "user," has a PGL account. An illustrative login screen in presented in FIG. 62.

Figure 63:
FIG. 63 shows a screenshot of the weekly sports memorabilia winners based on their total points earned in a single Vikings Victory tournament gaming session.

If the player does not have a PGL account, then an account must be established as shown in block 4404. Illustrative new account screen as shown in FIG. 63 and FIG. 64.

If the player does have a PGL account, the method proceeds to block 4404 where the PGL credentials are entered. At block 4406, the login credentials are verified to access the PGL system. At decision diamond 4408 the determination is made to accept the verified login credentials for a specific type of game. If the login is not verified, the method returns to decision diamond 4402. If the login is verified, the method proceeds to block 4410 where the player is placed in the game lobby for the specific type of game.

Figure 45:
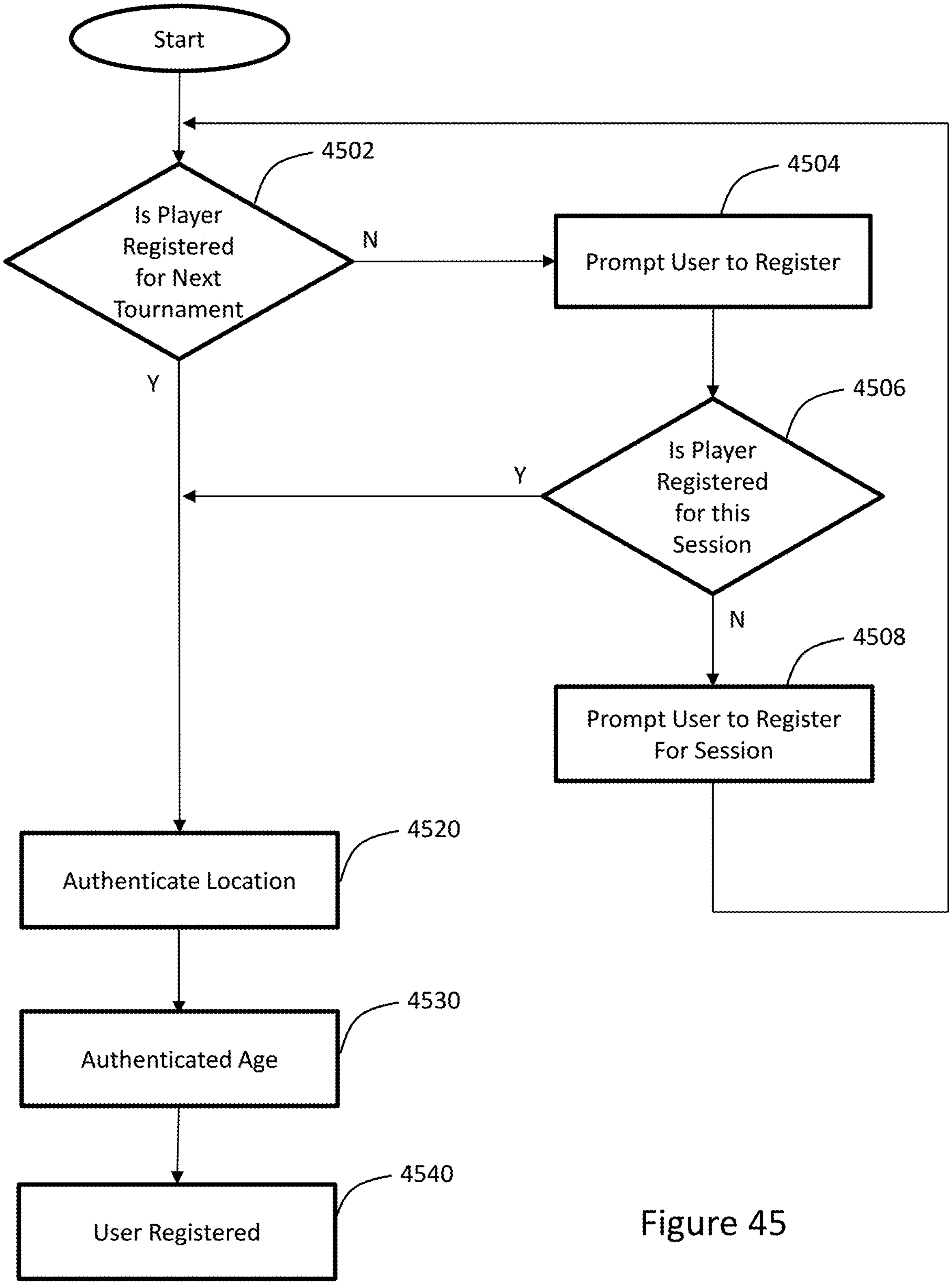
FIG. 45 shows the process for registering a user for a promotional tournament.

Referring now to FIG. 45, the process for registering a user for a promotional tournament is shown. The illustrative tournament registration process is initiated at decision diamond 4502 where a general determination is made if the player is registered. If the player is not registered, the method proceeds to block 4504 wherein the player is prompted to register. At decision diamond 4506, a determination is made whether the player is registered for a particular tournament game session. If the player is not registered for a particular tournament game session the method proceeds to block 4508 where the player is prompted to register for the particular tournament game session, and the player is returned to decision diamond 4502.

If the determination is made that that player has generally registered for the promotional tournament or the player has more specifically registered for a particular tournament game session, then the method proceeds to block 4520 where the location of the player is authenticated. At block 4530, the player's age is authenticated. Finally, at block 4540, the player is registered if they have successfully authenticated their location and authenticated their age.

Figure 46:
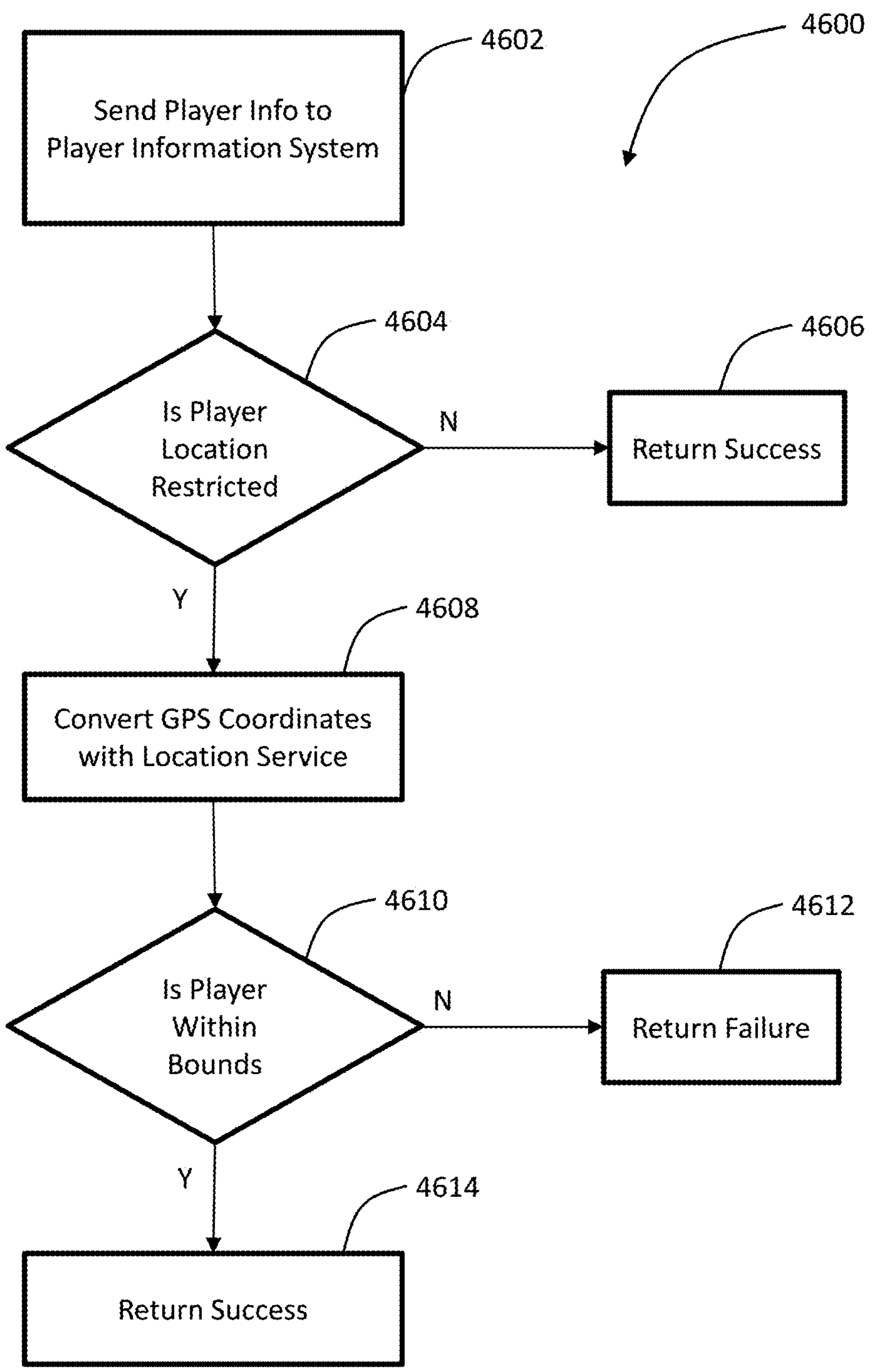
FIG. 46 shows a first location authentication process that provides an illustrative method for performing the location check.

Referring to FIG. 46 there is shown a first location authentication process that provides an illustrative method for performing the location check. In the method 4600, the player's information is sent to the Player Information System (PIS) as represented by block 4602. This is different than the PGL system used during login. In the illustrative embodiment, the PGL includes a user database for users and the PGL system is accessible a variety of different products and services as shown in FIG. 42. The Player Information System includes information that is specific to promotional play for particular users. For example, each user may have his location restricted, and the location restrictions can be varied based on the rules of the game. Therefore, based on the player's information the PIS, a determination is made at decision diamond 4604 whether there are any location restrictions associated with that particular player. If there are no location restrictions, the method proceeds to block 4606 where game play can proceed because game play is not restricted. However, if game play is restricted, then the method proceeds to block 4608. The determination of whether player location is restricted may be determined by examining the Player Information System, which may include a two character state code, e.g., MN for Minnesota. The MN code would indicate to the mobile application operating on the personal mobile device that the player must be within the boundary of the state of Minnesota.

If game play is restricted based on location at decision diamond 4604, the method proceeds to block 4608 where the GPS coordinates of the personal mobile device are sent to a third party location service such as GEOCodio™. The third party location service may then proceed to convert the GPS coordinates to a street address and also return a confidence value at block 4608. At decision diamond 4610 a determination is made whether the state code matches the response from the PIS. If yes, the player has successfully passed the location check. If no, the player has failed the location check and cannot proceed with game play.

Figure 47:
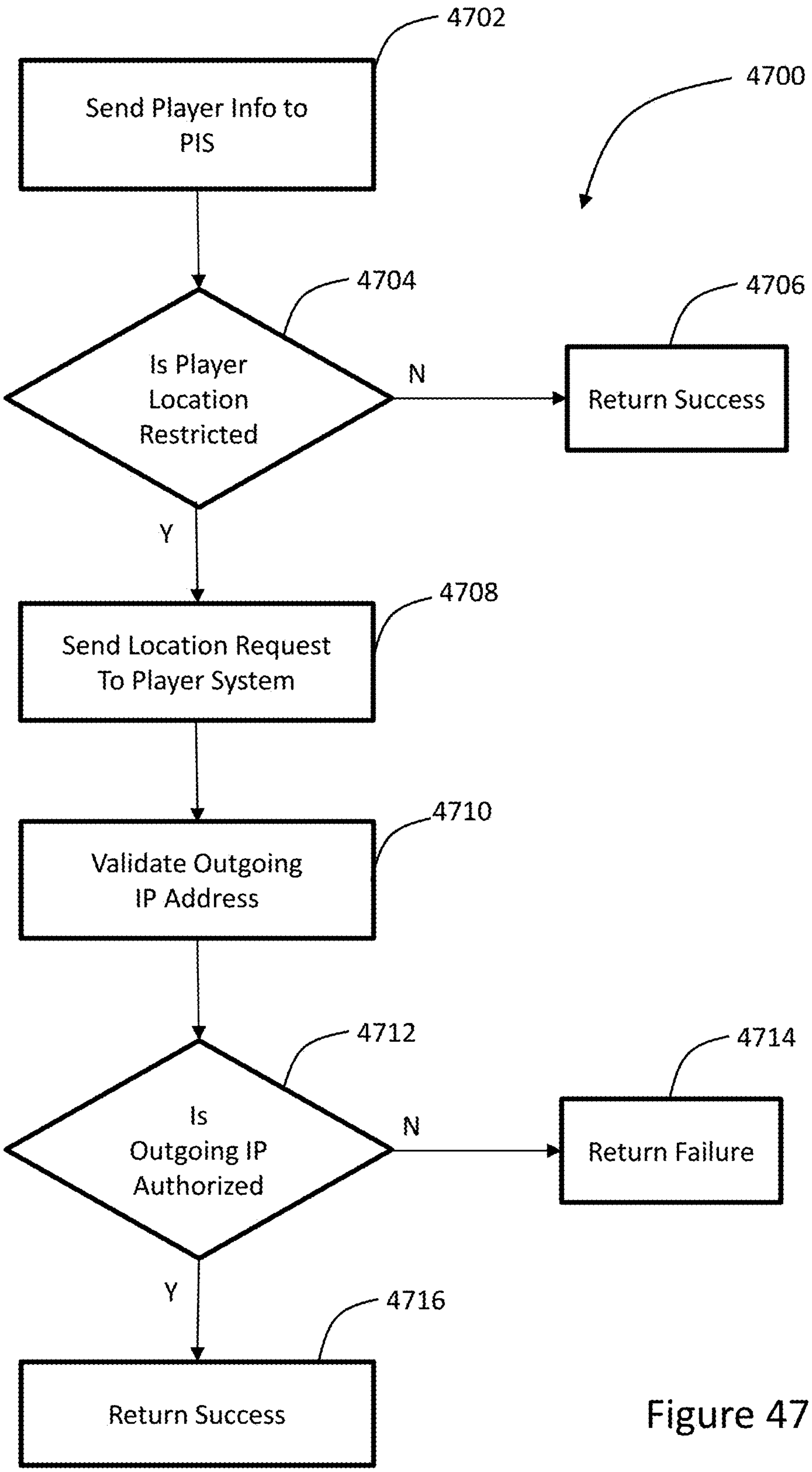
FIG. 47 shows a second location authentication process that provides an alternate method for verifying a player's location.

Referring to FIG. 47 there is shown a second location authentication process that provides an alternate method for verifying a player's location. The method 4700 operates, initially, in a manner similar to the process in FIG. 46. Notably, at block 4702 the player's information is sent to the Player Information System (PIS). Based on the player's information the PIS, a determination is made at decision diamond 4704 whether there are any location restrictions associated with that particular player. If there are no location restrictions, the method proceeds to block 4706. If game play is restricted, then the method proceeds to block 4708 as described above.

At block 4708, the second illustrative location authentication process is initiated, which operates through a known network. More specifically, the promotional gaming provider may provide regulated gaming at an establishment where the networks at each regulated and licensed location have a known public IP address. If the player's mobile device is attached to the licensed location's local network, its outgoing IP address will be able to be verified with a list of known licensed network IP addresses as shown in block 4710.

At decision diamond 4712, a determination is made if the player's personal mobile device is on one of these networks, and the location is verified. The PIS also makes the determination of the IP address at the location and if this is within the allowable IP addresses. The system has connectivity and knowledge of these private networks and communicates the outgoing IP addresses to the PIS such that it is possible for the PIS to make the determination that the originating personal mobile device is on one of the regulated networks. If the outgoing IP address is not authorized, then the player cannot proceed with game play. However, if the outgoing IP address is authorized, the player may then proceed with the next step, namely, the age verification process described in FIG. 48.

In operation, the regulated networks may be managed by a third party network management solution provided by Cisco™ Meraki™ devices and/or services. The regulated wireless access points are configured for each venue location, and then they can be remotely managed through the Meraki™ web portal. The Meraki™ web portal provides the ability to determine whether a regulated mobile device, e.g., a Tablet, is offline or online and how much internet traffic each regulated mobile device is consuming.

Either of the illustrative location authentication process (described in FIG. 46 and FIG. 47) may also query the Meraki™ system to obtain real-time data about the regulated network activity. This real-time data set for the regulated gaming network may include, by way of example, details such as the number of regulated devices on each network, data transfer statistics, connectivity history, internal private IP addresses and the public IP address associated with the location.

Additionally, when any wireless device connects to any component of the promotional bingo tournament gaming system 4200, the gaming system 4200 can verify the public IP address for each wireless device in a regulated venue locations even if the wireless device is either regulated or unregulated. Since the regulated networks are managed, a location check can be performed for each wireless devices communicatively coupled to the promotional bingo tournament gaming system 4200. Thus, the location of wireless devices that are communicatively coupled to a venues public Wi-Fi can be verified with the promotional bingo tournament gaming system 420. More specifically, the regulated gaming devices may be connected to a regulated and hidden SSID, while the unregulated personal devices may be connected to the venue's free Wi-Fi on a different SSID than the regulated devices, but because they are originating from the same public IP address their location is confirmed to be the same.

These location services described above may be used to support a promotional bingo tournament for unregulated mobile personal devices. For example, these location services may be used in a promotion that awards season tickets to the Minnesota Vikings football games. To win the promotional season tickets, a player would have to participate and win one of the promotional bingo tournaments on the player's personal mobile device.

More generally, the promotional bingo tournament requirement includes having the personal mobile device be located at one of the regulated venues. At least one of the venues hosts the promotional bingo tournament at a particular time and for a duration of time. The promotional bingo tournament session prize is awarded by the mobile promotional gaming sub-system to one of the players that has a personal mobile device located in the regulated venue.

In the illustrative embodiment, eligibility is determined by having the player and the player's personal mobile device physically present at one of the venue locations that offers regulated games. Thus, the promotional game may attract players to the gaming venue so that players will play the real-money regulated games at the venue. For example, Minnesota regulations limit the number of regulated device for a venue to 6 or 12 regulated devices. Therefore, encouraging participation outside of these limited regulated device increases the likelihood that players will order food and beverages during promotional game play at the gaming venue.

Figure 48:
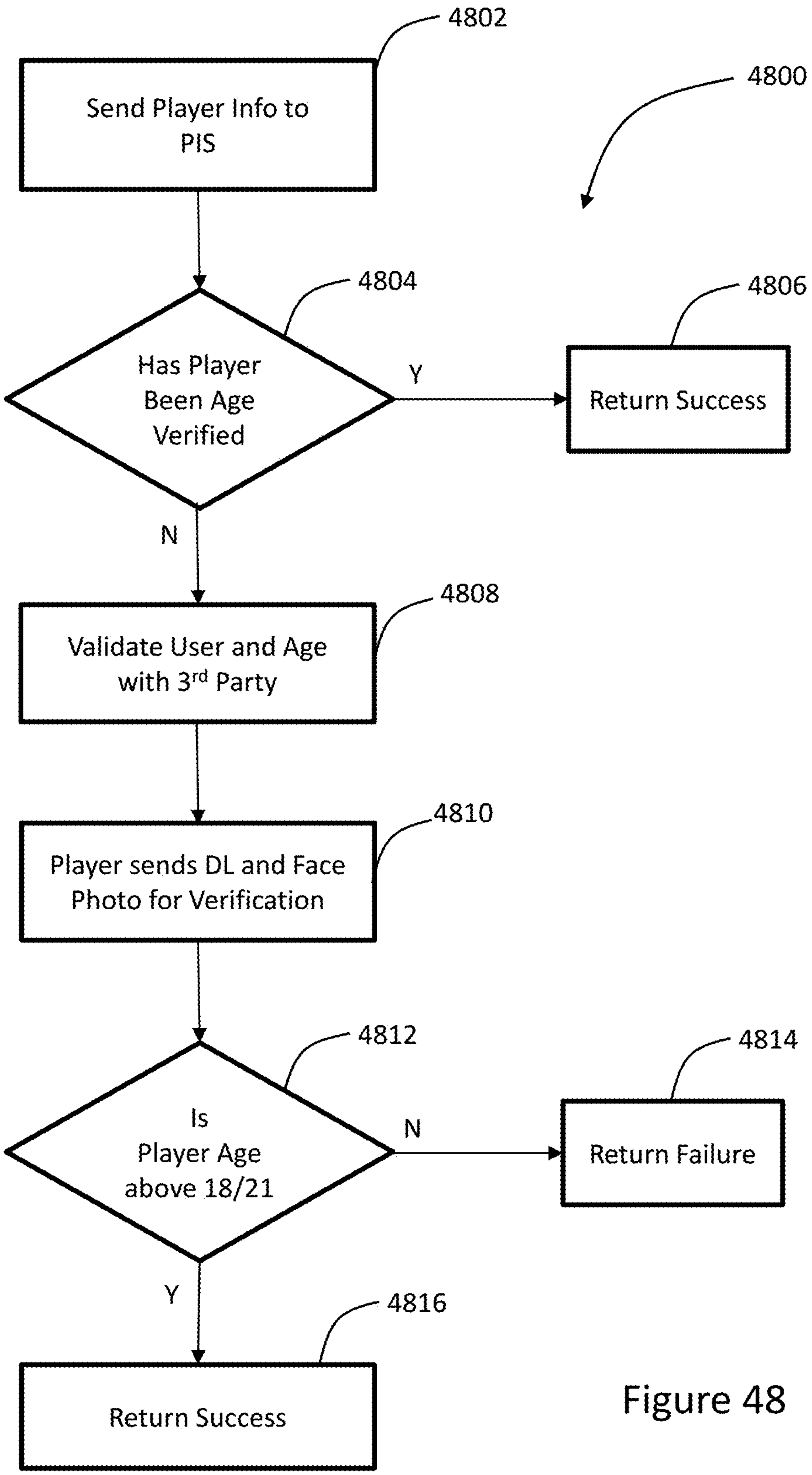
FIG. 48 shows an illustrative age verification process.

Referring now to FIG. 48 there is shown an illustrative age verification process. The rules of the game may dictate that a player must be of a certain age to participate in the promotional tournaments.

The method 4800 operates, initially, in a manner similar to the processes in FIG. 46 and FIG. 47. At block 4802, the player's information is sent to the Player Information System (PIS). The communications with Player Information System shown at block 4802 returns back to the personal mobile device any information about age restrictions. Additionally, the PIS also returns if the player has previously passed any age-related checks and if a new check is required. If the player has previously passed the age related checks and no new age related checks are required, then the method proceeds to block 4806 where the player has successfully verified their age.

If a new age check is required, the method proceeds to block 4808 where the player will be prompted on the personal mobile device to take a picture of the driver's license and to use the camera on the mobile device to take a real time image of the player's face. These pieces of information are sent to a third party age verification shown at block 4810. An illustrative third party age verification service includes IDOlogy™. The age verification service returns back any information about the player, including age.

At decision diamond 4812, the player's age is compared to any age limits indicated by the PIS and the determination to allow or deny entry to the games is based on that comparison. If the player is not above the required age, the player cannot proceed with game play. If the player meets the age criteria, then the player has satisfied the age requirement.

Once the player has been authenticated based on age and location, the promotional bingo game tournament begins. The illustrative screenshots and flowcharts that follow describe game player for the illustrative promotional bingo tournament gaming system 4200 (shown in FIG. 42) that supports a plurality of personal mobile devices.

Figure 49:
FIG. 49 shows an illustrative screenshot of a live hosted broadcast, which is presented at the top of the screen during game play.

Referring to FIG. 49, there is shown an illustrative screenshot 4900 of a live hosted broadcast, which is presented at the top of the screen during game play. Game play is presented in the middle of the screenshot 4900. The bottom of the screen includes a chat area.

Figure 50:
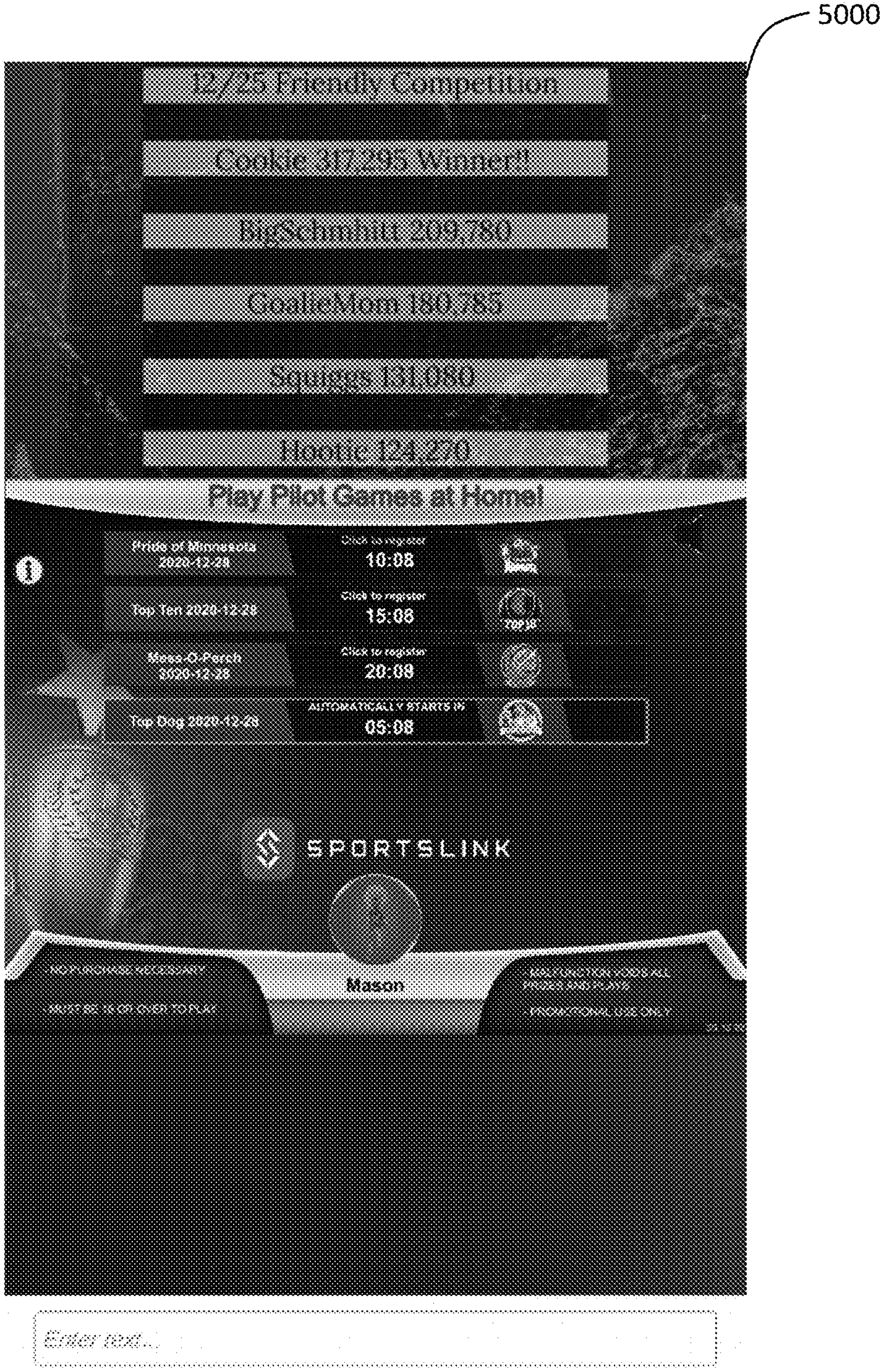
FIG. 50 shows an illustrative screenshot 5000 having an illustrative leaderboard at the top portion of the screenshot and the game selection is presented in the middle of the screenshot.

Referring to FIG. 50, there is shown an illustrative screenshot 5000 having an illustrative leaderboard at the top portion of the screenshot and the game selection is presented in the middle of the screenshot. The chat area is shown at the bottom of the screen. The game selection shows the next set of scheduled games with green indicating that the player is registered and ready to play when the countdown timer reaches zero. Additionally, a Sportslink™ icon is shown at the bottom of screenshot 5000. The Sportslink™ icon refers to a promotional tip board that is available to play at all times. A more detailed explanation of the promotional tip board is provided in FIG. 54 below.

Figure 51:
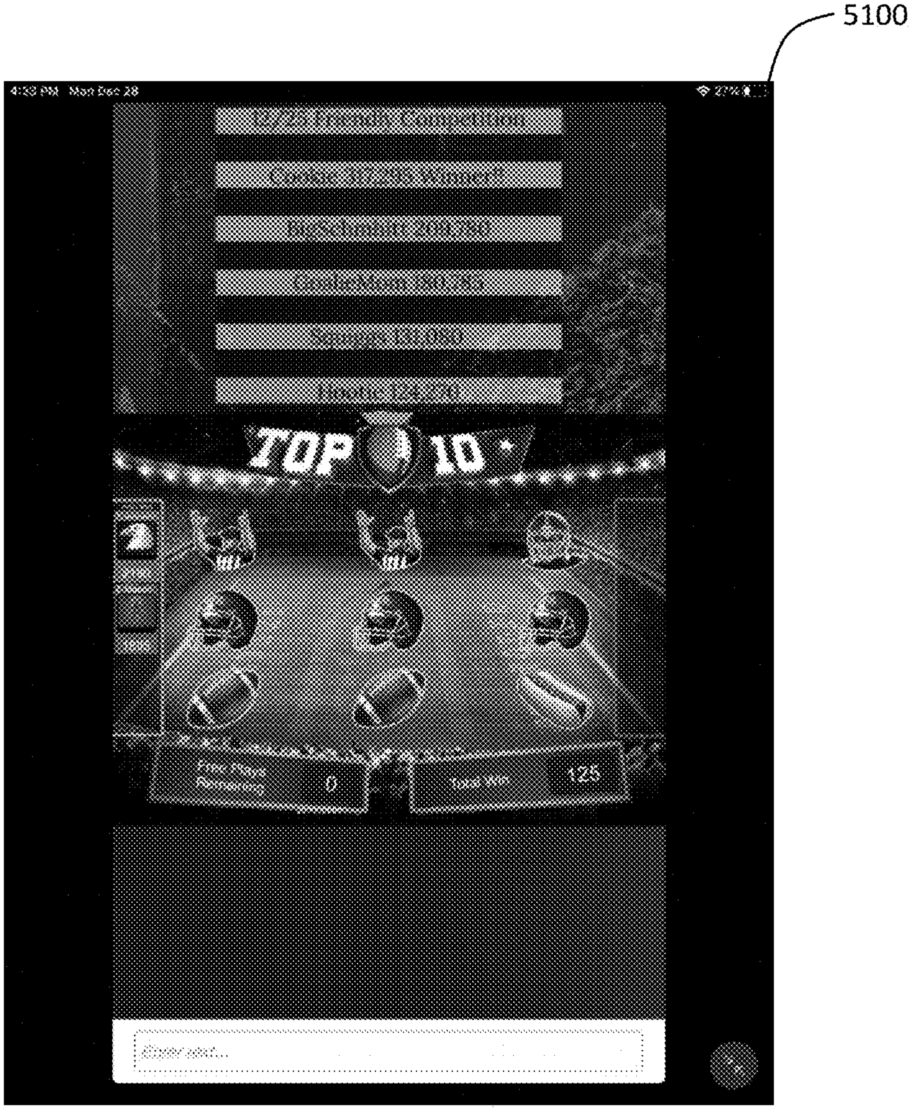
FIG. 51 shows a screenshot having a leaderboard on the top of the screenshot, live gameplay in the middle and chat area at the bottom.

Referring to FIG. 51, there is shown a screenshot 5100 having a leaderboard on the top of the screenshot, live gameplay in the middle and chat area at the bottom. When a live hosted broadcast is not available (as in FIG. 49), the top portion of the screen may show standings as shown in FIG. 50 and FIG. 51.

Figure 52:
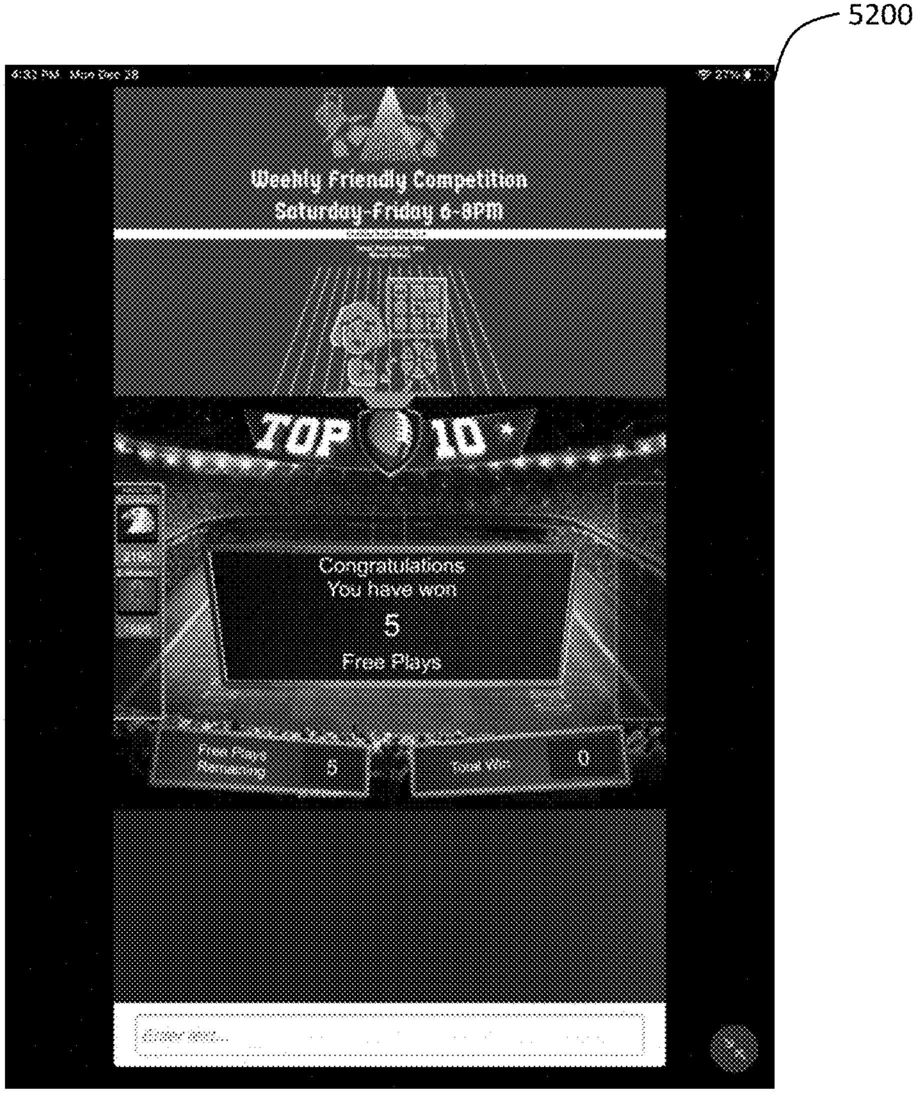
FIG. 52 shows an illustrative screenshot, in which the top portion indicates the schedule of 6-8 PM every day and a winner announced after gameplay on Friday.

Referring to FIG. 52, there is shown an illustrative screenshot 5200, in which the top portion indicates the schedule of 6-8 PM every day, in which a winner announced after gameplay on Friday. Also, screenshot 5200 shows that five free game plays have been awarded. Schedules are presented in the top portion of the screenshot in FIG. 54, FIG. 65, and FIG. 67, which are described in further detail below.

Figure 53:
FIG. 53 shows an illustrative screenshot of live gameplay with final standings presented in a leaderboard at the top section of the screenshot.

Referring to FIG. 53, there is shown an illustrative screenshot 5300 of live gameplay with final standings presented in a leaderboard at the top section of the screenshot 5300. The consolation prize winner indicates a player who did not qualify through the tournament session or open qualifiers but was the top point winner during the finals.

Figure 54:
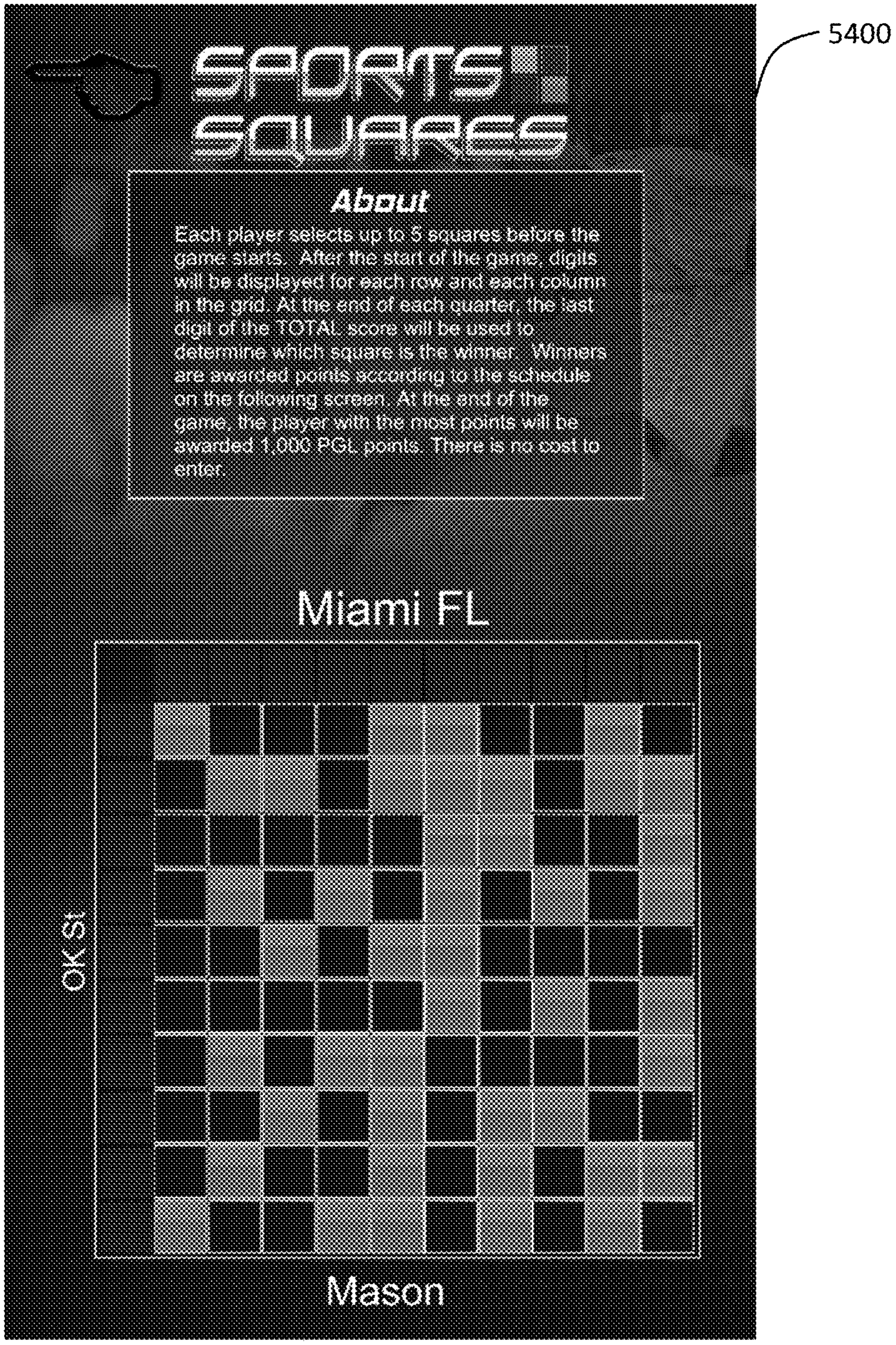
FIG. 54 shows an illustrative screenshot that relates to the selection of the SportsLink icon, which reveals an e-tip board where players can make selections of squares to earn promotional points.

Referring to FIG. 54, there is shown an illustrative screenshot 5400 that relates to the selection of the SportsLink icon (shown in FIG. 50), which reveals an e-tip board where players can make selections of squares to earn promotional points. The rules of for e-tip board play are presented near the top of screenshot 5400. The e-tip board is one of the promotional games that are available between tournament sessions.

Figure 55:
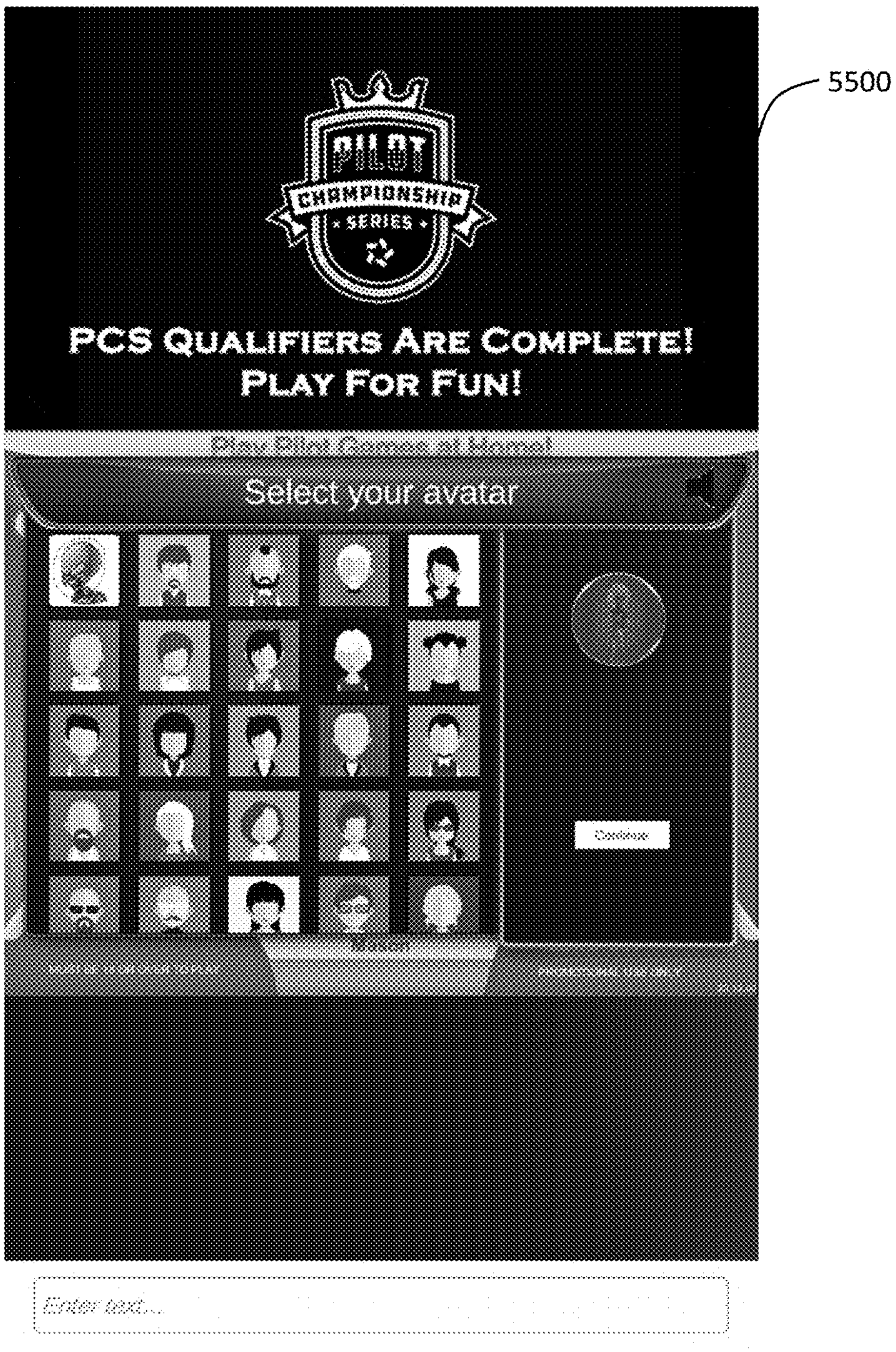
FIG. 55 shows an illustrative screenshot where a player selects an avatar.

Referring to FIG. 55 there is shown an illustrative screenshot 5500, in which a player selects an avatar. If the player does not select an avatar, then an avatar is randomly selected.

Figure 56:
FIG. 56 shows a screenshot of players being prompted when they first register for a new tournament session.

Referring to FIG. 56 there is shown a screenshot 5600 of players being prompted when they first register for a new tournament session. Tournament sessions may contain specific rules of play. For example, a tournament session might be time based (e.g., all tournaments are between 4-6 PM on Dec. 1, 2020 in Minnesota) or they may be tournament theme based (e.g., all Minnesota tournaments are played with the game entitled Vikings Victory).

Referring to FIG. 57 there is shown an illustrative screenshot 5700 showing a player agreeing to the terms of service and conditions for game play. The player is notified of the tournament session rules (as described in FIG. 56) during the registration process. In the illustrative embodiment, the tournament session rules indicate that to be eligible for game play, the player must be over 18 and be a resident of Minnesota. The process for authenticating age and location have been described in FIG. 46, FIG. 47, and FIG. 48.

Figure 58A:
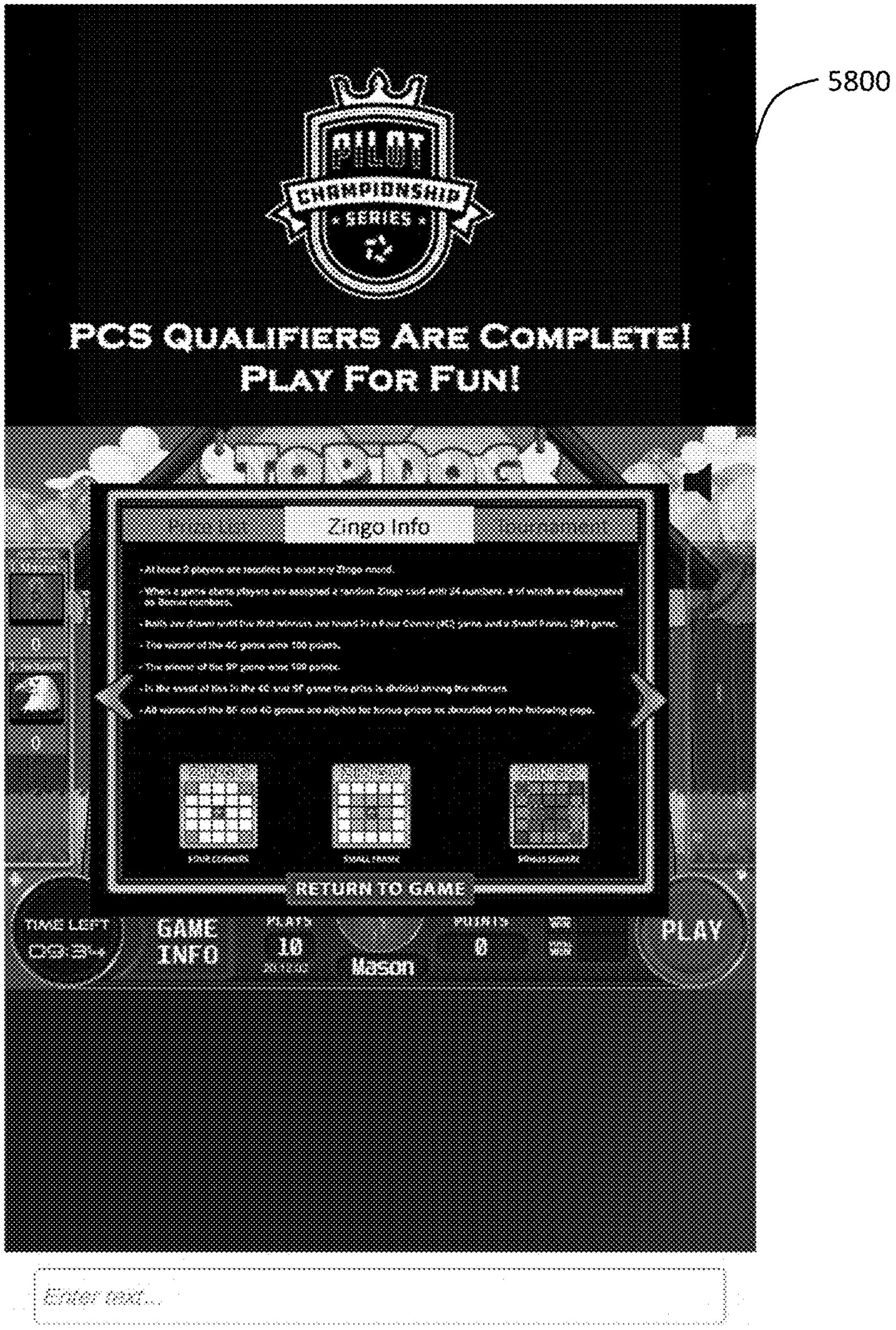
FIGS. 58A and 58B show a screenshot of the rules of the game and a continuing screenshot of the rules of the game, respectively.
Figure 58B:
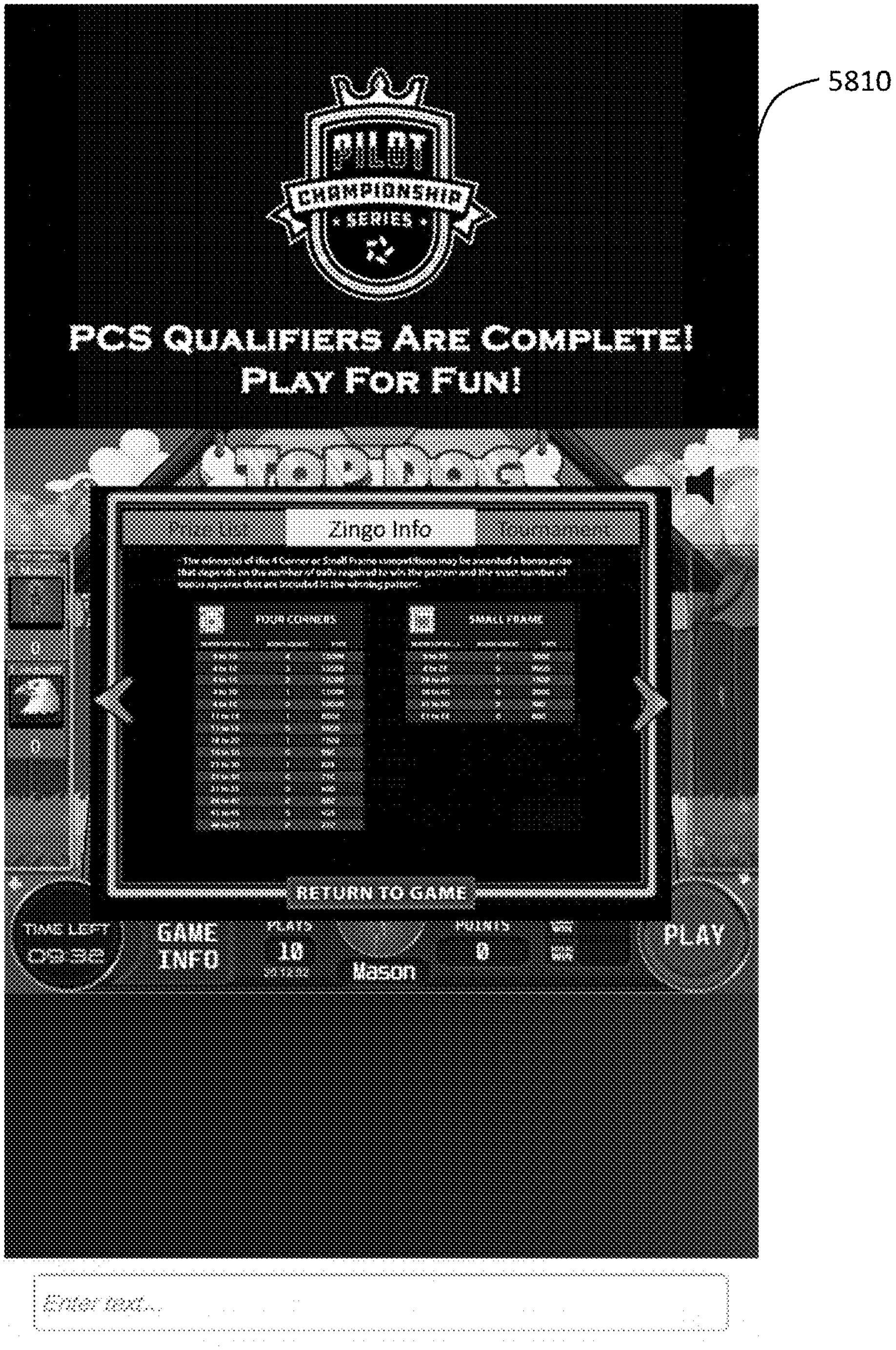

Referring to FIGS. 58A and 58B there is shown screenshot 5800 and screenshot 5810, respectively, of the rules of the game and continuation of the rules of the game.

Figure 59:
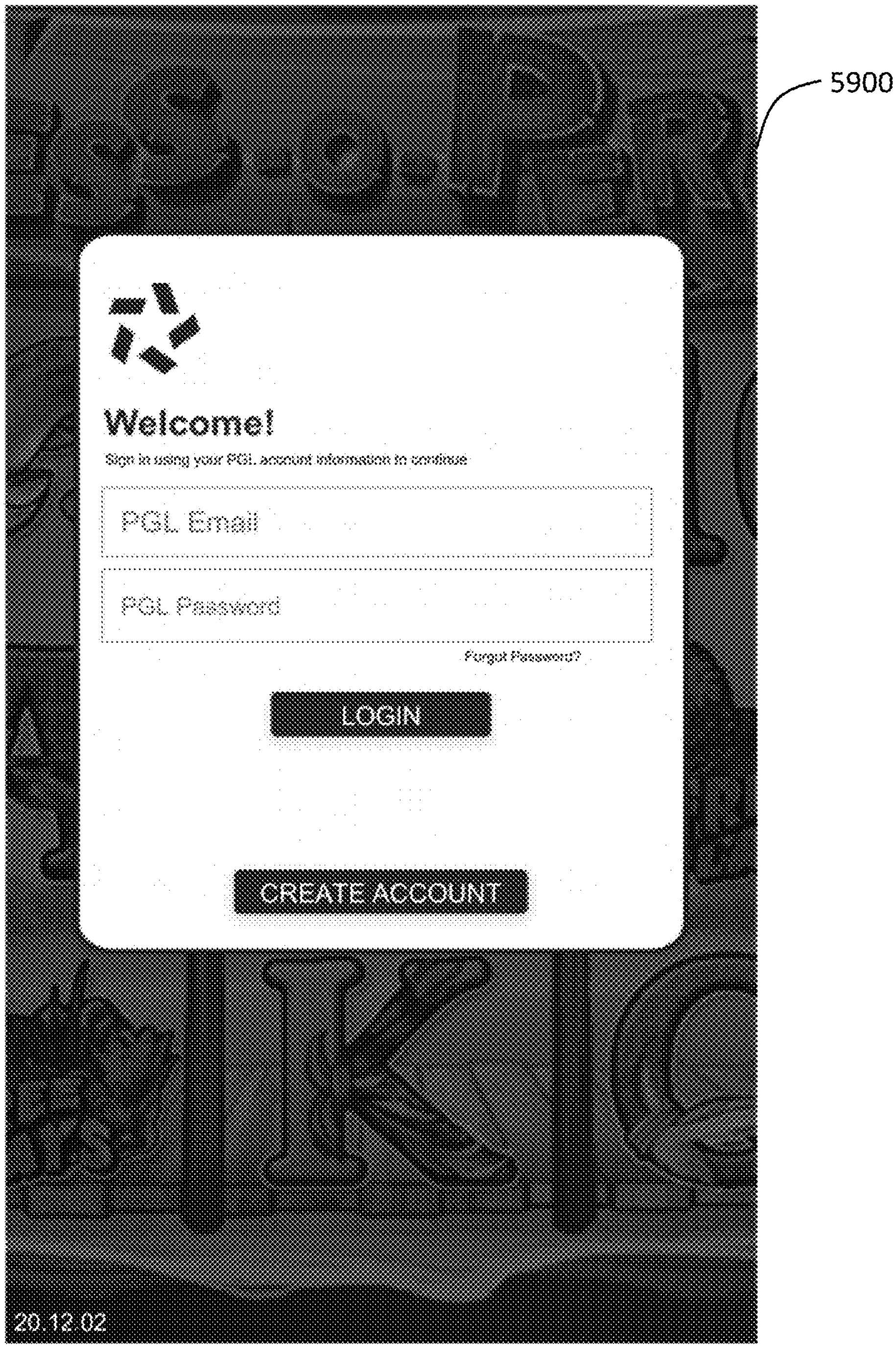
FIG. 59 shows a screenshot where a player will log in with an existing account or create a new account.
Figure 60A:
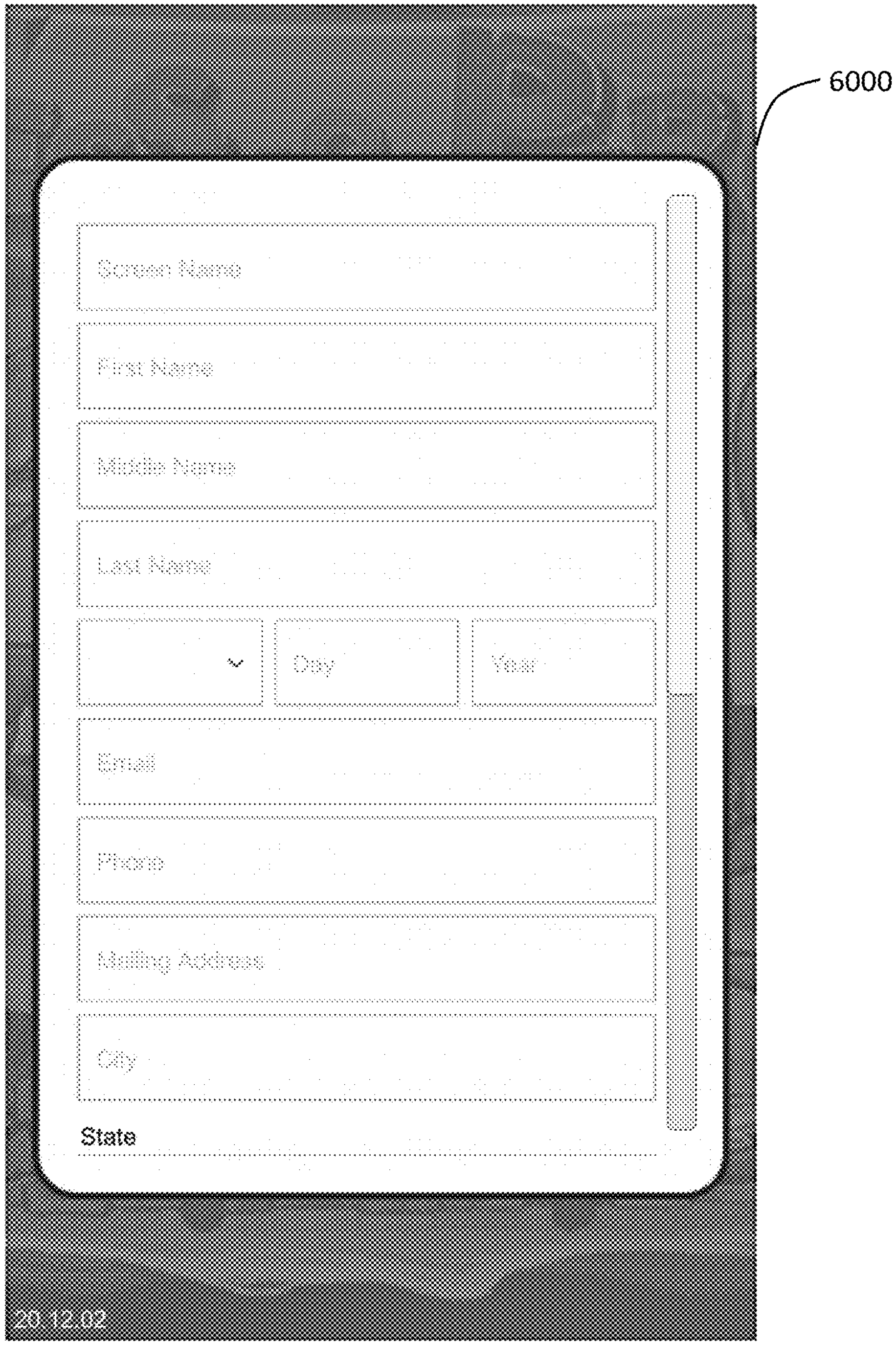
FIG. 60A and FIG. 60B show screenshots associated with player account creation.
Figure 60B:
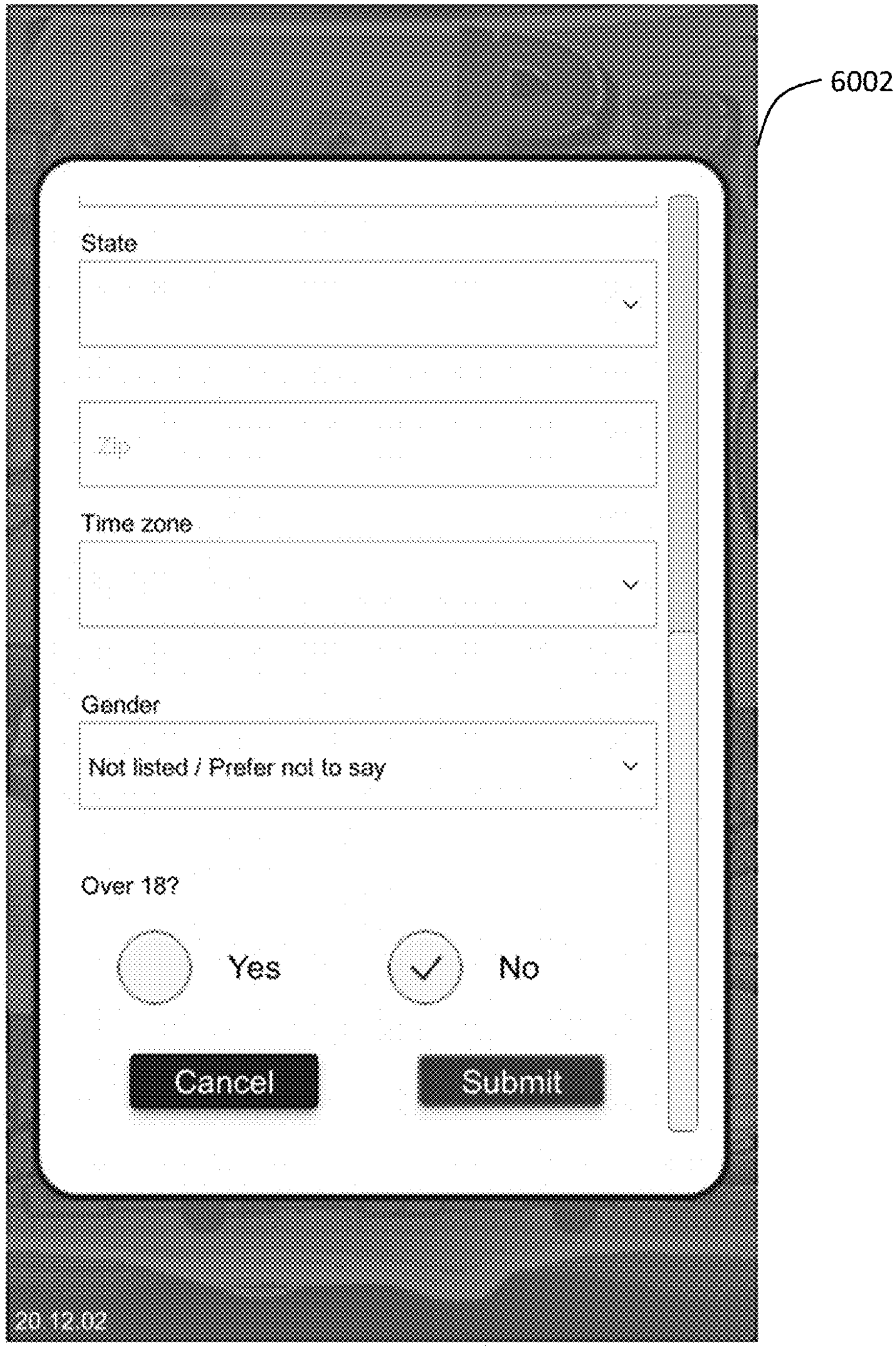

Referring to FIG. 59 there is shown a screenshot 5900 where a player will log in with existing account or create a new account. Referring to FIG. 60A and FIG. 60B there is shown a screenshot 6000 and 6002, respectively, for player account creation. Note, the second screenshot 6002 presents a continuation of the player account creation process.

Figure 61:
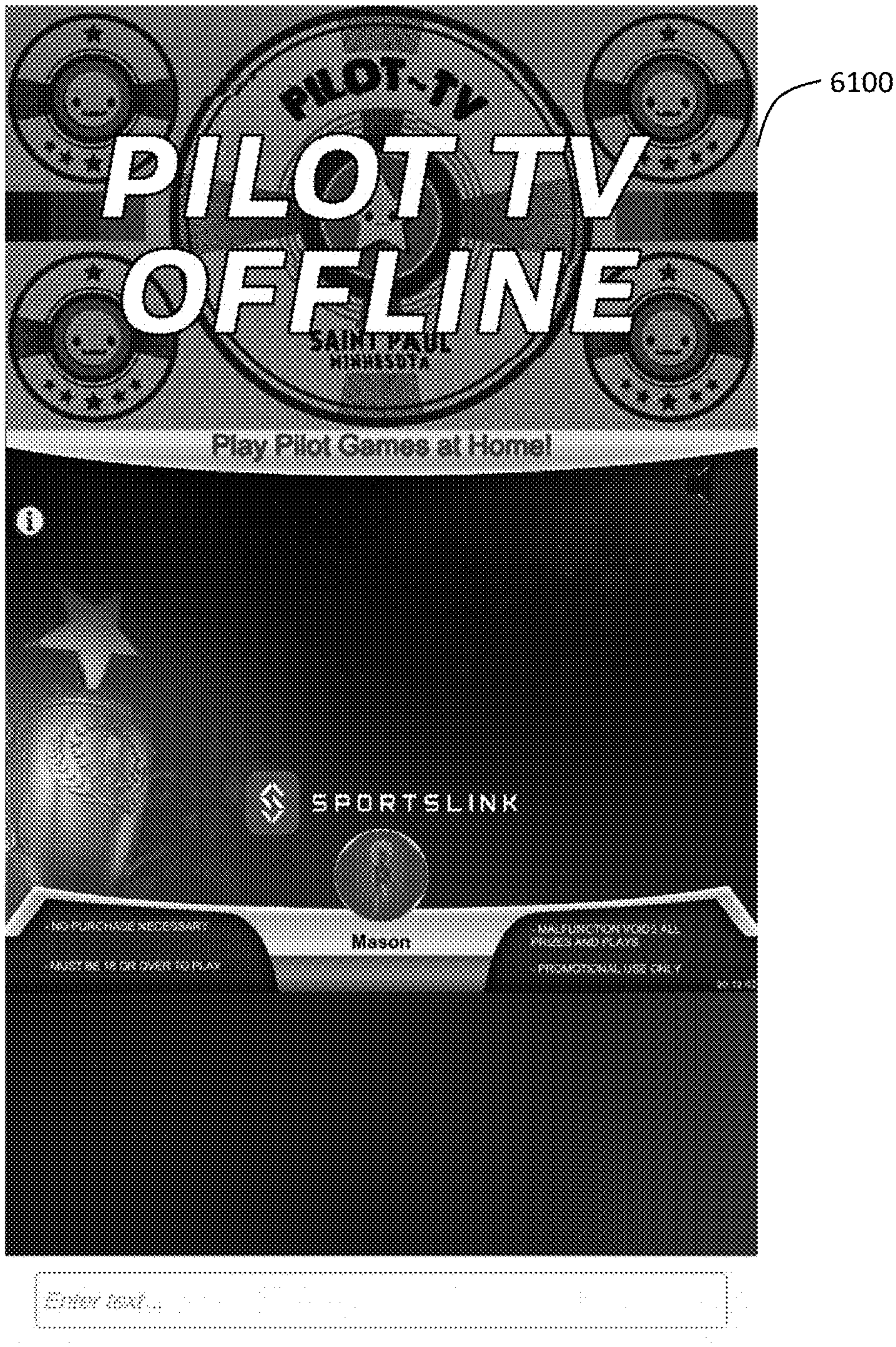
FIG. 61 shows an offline screenshot with an offline message.
Figure 62:
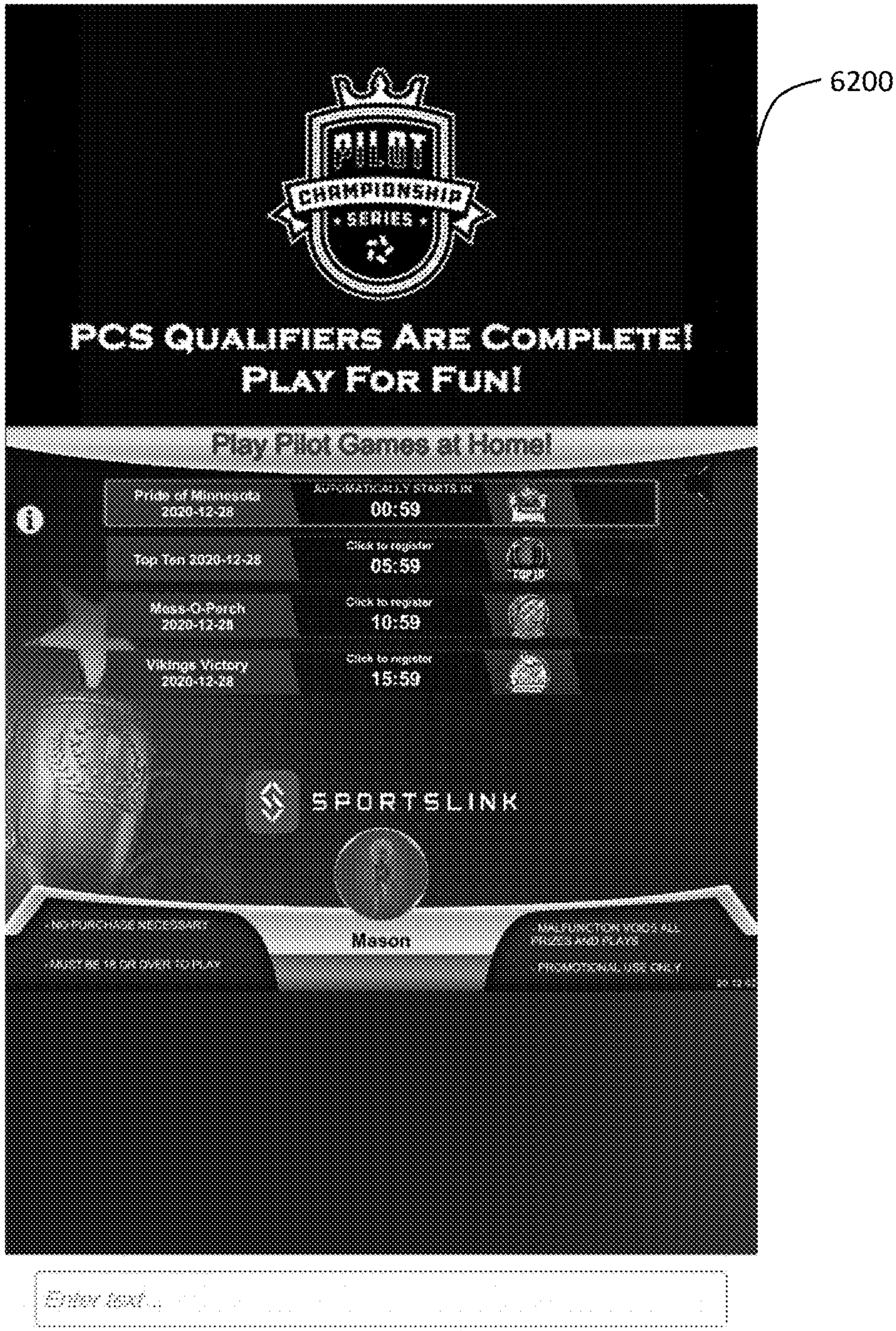
FIG. 62 shows a screenshot with a list of upcoming tournament games and their associated times.

Referring to FIG. 61 there is shown an offline screenshot 6100 with an offline message. Referring to FIG. 62 there is shown a screenshot 6200 showing a list of upcoming tournament games and their associated times.

Referring to FIG. 63 there is shown a screenshot 6300 of the weekly sports memorabilia winners based on their total points earned in a single Vikings Victory tournament gaming session.

Referring to FIG. 64 there is shown a screenshot 6400 of the session qualifier times. Game play during these session qualifier times can earn players a qualifying spot in the finals.

Referring to FIG. 65 there is shown a screenshot 6500 indicating to the players that in addition to players who have qualified for the finals, all players can participate in the finals and compete for a consolation prize.

For the finals of the illustrative promotional tournaments, players may qualify through one of two methods. The first method to qualify for the finals is by achieving the highest total amount of points in any time based session. The second method to qualify for the finals is by achieving the top score for an individual title.

For example, if the qualifying period was from Nov. 30, 2020-Dec. 10, 2020, players may play in tournaments throughout those days at scheduled times. Throughout the duration there may be five (5) game titles that are available one at a time on a rotating basis. By way of example and not of limitation, the available games include Top 10, Vikings Victory, Pride of Minnesota, Mess O Perch and Winner Wonderland. Each tournament session has a duration of 10 minutes followed by a 5 minute enrollment period for the next game theme.

To qualify for the finals, the player that achieves the highest score on a single available game, e.g., Mess O Perch, would be qualified for the finals. Each player that achieves the highest score in the remaining four (4) game titles would also qualify for the finals. Thus, the finals include each of the players who achieved the highest score for each of the individual titles.

Additionally, all the players who finished in the top position for each of the qualifying time based sessions also quality for the finals. For example, the session qualifying round may consist of 6 tournaments played from 6 PM-7 PM where players earn points in all tournaments. The total points earned in those 6 tournaments would be the player's qualifying score for that bingo tournament session and the highest score would qualify for the finals.

Thus, players may receive entry to the finals if they achieve the top score for a particular game, or for game play with a specific game throughout a plurality of different tournament game session.

In the illustrative embodiment, players that qualify for the finals are eligible for cash prizes that are awarded based on ranked position on a final time based game play session at a scheduled time. Throughout the qualifying process, players may also be eligible for weekly themed prizes. For example, throughout the week, there may be 50 tournaments that play the game Vikings Victory—which is themed with licensed graphics from the Minnesota Vikings NFL Team. At the end of each week, the top 5 players who have earned the highest number of points in a single Vikings Victory tournament would receive sports memorabilia such as autographs, shirts, jerseys, hats, and other such sports memorabilia.

Referring to FIG. 66, there is shown a final qualification status method. During the finals, players will log in as normal and proceed with game play. At block 6602, the player game play information is sent to the PIS. At decision diamond 6604, the PIS determines whether the player is a finalist or not and directs the player to the correct system such that the non-qualified players are not participating in the finals round for real money prizes. If the player is not a finalist, they can participate in a consolation prize as shown in block 6606. If the player is a finalist, then they participate in a finalist tournament game session.

Referring to FIG. 67 there is shown a screenshot 6700 showing players can earn a finals qualifying position by being the top player in a tournament for each of the titles offered.

During the finals, the broadcast component of the real time results will be shown on the screen of each player's mobile device. A special feature of the finals is that the finalists are competing for cash prizes, but other players may play alongside of them and compete in the tournament even though they may not win any of the large cash prizes. A small monetary consolation prize may be awarded to the player who did not qualify for the finals but earned the top score for the final game play session amongst the other player who did not qualify for the finals. The video presentation subsystem 4206 (shown in FIG. 42) combines all of these results and present them to the players who are participating and to any spectators that are watching.

Referring to FIG. 68, there is shown an illustrative broadcaster display method 6800 for a finalist tournament game session. The method is initiated a block 6802 with information related to the finalists that is gathered from the PIS. At block 6804, the finalist leaderboard is requested by the video presentation system 4206. At block 6806, the consolation leaderboard is also request. During the tournament, the video presentation subsystem 4202 receive results for all players (whether they are finalists or playing for the consolation prize) and display them at block 6808. The live hosts may determine how to present the leaderboards. The hosts can decide between just showing the results of the finalists shown in blocks 6810 and 6816, just showing the consolation players at blocks 6812 and 6818 or showing a combination at blocks 6814 and 6820. This combination is unique because the players can feel like they are participating in a very special invited event even though they are not eligible for the large prizes. At decision diamond 6822, a determination whether the tournament is over or is continuing.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. A gaming system for a promotional bingo tournament, the gaming system comprising:

at least one venue associated with the promotional bingo tournament;

a plurality of unique player registration profiles, wherein each unique player registration profile includes a plurality of player selected avatar characteristics;

a plurality of personal mobile devices that participate in the promotional bingo tournament, in which each personal mobile device is associated with one player registration profile;

a mobile promotional gaming sub-system communicatively coupled to each of the plurality of personal mobile devices over a wireless network;

the promotional bingo tournament including a promotional bingo tournament session that is played at a scheduled time for a duration of time, a promotional bingo tournament result, a plurality of promotional bingo game sessions, and a head-to-head animation, wherein each personal mobile device is associated with at least one promotional bingo game session that includes a promotional bingo game session result, wherein the head-to-head animation includes a first player avatar animation randomly selected by at least one of the promotional gaming sub-system and a first authorized mobile device and a second player avatar animation randomly selected by at least one of the promotional gaming sub-system and a second authorized mobile device;

the promotional gaming sub-system selects a promotional bingo game session result associated with a first player registration profile and a promotional bingo game session result associated with a second player registration profile;

the promotional gaming sub-system generates the head-to-head animation from the promotional bingo game session result associated with the first player registration profile, a plurality of first player selected avatar characteristics, the promotional bingo game session result associated with the second player registration profile, and a plurality of second player selected avatar characteristics;

a promotional bingo tournament session prize awarded by the mobile promotional gaming sub-system when the at least one promotional bingo game session result satisfies a promotional bingo tournament requirement;

a video presentation sub-system communicatively coupled to the mobile promotional gaming sub-system; and each authorized mobile device includes a user interface that displays at least one promotional bingo game session result and the head-to-head animation.

2. The system of claim 1 wherein the video presentation sub-system generates an integrated broadcast announcement about the promotional bingo tournament session, wherein the integrated broadcast announcement combines at least one promotional bingo game session result and a commentary about the at least one promotional bingo game session result; and each personal mobile device includes a user interface that displays at least one promotional bingo game session result and the integrated broadcast announcement.

3. The system of claim 1 further comprising at least one bonus game session, in which the bonus game session includes a plurality of bonus game events;

a triggering event that initiates a bonus game event, wherein the bonus game event includes a bonus game event animation;

a bonus prize awarded by the mobile promotional gaming sub-system to each personal mobile device when the bonus game event satisfies a bonus requirement.

4. The system of claim 3 wherein the bonus prize is a point multiplier awarded to each personal mobile device.

5. The system of claim 1 wherein the promotional bingo tournament requirement includes having the personal mobile device located at one of the plurality of venues that each host the promotional bingo tournament at a particular time and for a duration of time; and the promotional bingo tournament session prize is awarded by the mobile promotional gaming sub-system to at least one of a plurality of players that each have a personal mobile device, in which each personal mobile device satisfies the promotional bingo tournament requirement.

6. A gaming system for a promotional bingo tournament, the gaming system comprising:

at least one venue associated with the promotional bingo tournament;

a plurality of unique player registration profiles, wherein each unique player registration profile includes a plurality of player selected avatar characteristics;

a plurality of personal mobile devices that participate in the promotional bingo tournament, in which each personal mobile device is associated with one player registration profile;

a mobile promotional gaming sub-system communicatively coupled to each of the plurality of personal mobile devices over a wireless network;

the promotional bingo tournament including a promotional bingo tournament session that is played at a scheduled time for a duration of time, a promotional bingo tournament result, a plurality of promotional bingo game sessions, and a head-to-head animation, wherein each personal mobile device is associated with at least one promotional bingo game session that includes a promotional bingo game session result, wherein the head-to-head animation includes a first player avatar animation randomly selected by at least one of the promotional gaming sub-system and a first authorized mobile device and a second player avatar animation randomly selected by at least one of the promotional gaming sub-system and a second authorized mobile device;

the promotional gaming sub-system selects a promotional bingo game session result associated with a first player registration profile and a promotional bingo game session result associated with a second player registration profile;

the promotional gaming sub-system generates the head-to-head animation from the promotional bingo game session result associated with the first player registration profile, a plurality of first player selected avatar characteristics, the promotional bingo game session result associated with the second player registration profile, and a plurality of second player selected avatar characteristics;

a promotional bingo tournament session prize awarded by the mobile promotional gaming sub-system when the at least one promotional bingo game session result satisfies a promotional bingo tournament requirement;

a video presentation sub-system communicatively coupled to the mobile promotional gaming sub-system;

each authorized mobile device includes a user interface that displays at least one promotional bingo game session result and the head-to-head animation;

the promotional bingo tournament requirement includes having one personal mobile device located at one of the plurality of venues that each host the promotional bingo tournament at a particular time and for a duration of time; and the promotional bingo tournament session prize is awarded by the mobile promotional gaming sub-system to at least one of a plurality of players that each have a personal mobile device, in which each personal mobile device satisfies the promotional bingo tournament requirement.

7. The system of claim 6 wherein the video presentation sub-system generates an integrated broadcast announcement about the promotional bingo tournament session, wherein the integrated broadcast announcement combines at least one promotional bingo game session result and a commentary about the at least one promotional bingo game session result; and each personal mobile device includes a user interface that displays at least one promotional bingo game session result and the integrated broadcast announcement.

8. The system of claim 6 further comprising at least one bonus game session, in which the bonus game session includes a plurality of bonus game events;

a triggering event that initiates a bonus game event, wherein the bonus game event includes a bonus game event animation;

a bonus prize awarded by the mobile promotional gaming sub-system to each personal mobile device when the bonus game event satisfies a bonus requirement.

9. The system of claim 8 wherein the bonus prize is a point multiplier awarded to each authorized mobile device.

10. A promotional bingo tournament method comprising:

associating at least one venue with the promotional bingo tournament;

enabling a plurality of personal mobile devices to participate in the promotional bingo tournament, in which each personal mobile device is associated with a player registration profile that includes a plurality of player selected avatar characteristics;

communicatively coupling a mobile promotional gaming sub-system to each of the plurality of personal mobile devices over a wireless network;

playing the promotional bingo tournament, which includes a promotional bingo tournament session, a scheduled time, a duration of time, and a head-to-head animation, wherein the head-to-head animation includes a first player avatar animation randomly selected by at least one of the promotional gaming sub-system and a first authorized mobile device and a second player avatar animation randomly selected by at least one of the promotional gaming sub-system and a second authorized mobile device;

generating a promotional bingo tournament result from a plurality of promotional bingo game sessions, wherein each personal mobile device is associated with at least one promotional bingo game session that includes a promotional bingo game session result;

selecting, by the promotional gaming sub-system, a promotional bingo game session result associated with a first player registration profile;

selecting, by the promotional gaming sub-system, a promotional bingo game session result associated with a second player registration profile;

generating, by the promotional gaming sub-system, the head-to-head animation from the promotional bingo game session result associated with the first player registration profile, a plurality of first player selected avatar characteristics, the promotional bingo game session result associated with the second player registration profile, and a plurality of second player selected avatar characteristics;

awarding a promotional bingo tournament session prize, with the mobile promotional gaming sub-system, when the at least one promotional bingo game session result satisfies a promotional bingo tournament requirement;

communicatively coupling a video presentation sub-system to the mobile promotional gaming sub-system; and displaying, by each personal mobile device, at least one promotional bingo game session result and the head-to-head animation.

11. The method of claim 10 wherein the video presentation sub-system generates an integrated broadcast announcement about the promotional bingo tournament session, wherein the integrated broadcast announcement combines at least one promotional bingo game session result and a commentary about the at least one promotional bingo game session result; and each personal mobile device includes a user interface that displays at least one promotional bingo game session result and the integrated broadcast announcement.

12. The method of claim 10 further comprising providing at least one bonus game session, in which the bonus game session includes a plurality of bonus game events;

enabling a triggering event to initiate a bonus game event, wherein the bonus game event includes a bonus game event animation;

awarding a bonus prize, by the mobile promotional gaming sub-system, to each personal mobile device when the bonus game event satisfies a bonus requirement.

13. The method of claim 12 wherein the bonus prize is a point multiplier awarded to each personal mobile device.

14. The method of claim 10 wherein the promotional bingo tournament requirement includes having the personal mobile device located at one of the plurality of venues that each host the promotional bingo tournament at a particular time and for a duration of time; and the promotional bingo tournament session prize is awarded by the mobile promotional gaming sub-system to at least one of a plurality of players that each have a personal mobile device, in which each personal mobile device satisfies the promotional bingo tournament requirement.

15. The system of claim 1 further comprising:

an age authentication component that authenticates an age for each player having a player registration profile; and a location authentication component that authenticates a location for each personal mobile device corresponding to each player having the player registration profile.

16. The system of claim 1 wherein the video presentation sub-system includes a leaderboard associated with the promotional bingo tournament game sessions and the promotional bingo tournament session prize.

17. The system of claim 16 further comprising:

a stationary monitor client disposed at the at least one venue, wherein the stationary monitor client is communicatively coupled to the video presentation sub-system; and the stationary monitor client displays the leaderboard and the promotional bingo tournament session prize from the video presentation sub-system.

18. The system of claim 17 wherein the stationary monitor client displays the integrated broadcast announcement from the video presentation sub-system.

19. The system of claim 16 wherein the leader board is communicated to each personal mobile device.

20. The system of claim 6 further comprising:

an age authentication component that authenticates an age for each player having a player registration profile; and a location authentication component that authenticates a location for each personal mobile device corresponding to each player having a player registration profile.

21. The system of claim 6 wherein the video presentation sub-system includes a leaderboard associated with the promotional bingo tournament game sessions and the promotional bingo tournament session prize.

22. The system of claim 21 further comprising:

a stationary monitor client disposed at the at least one venue, wherein the stationary monitor client is communicatively coupled to the video presentation sub-system; and the stationary monitor client displays the leaderboard and the promotional bingo tournament session prize from the video presentation sub-system.

23. The system of claim 22 wherein the stationary monitor client displays the integrated broadcast announcement from the video presentation sub-system.

24. The system of claim 21 wherein the leader board is communicated to each personal mobile device.

25. The method of claim 10 further comprising:

authenticating an age for each player, with an age authentication component, wherein an approved player age is associated with the corresponding player registration profile; and authenticating a location for each personal mobile device corresponding to each player registration profile with a location authentication component.

26. The method of claim 10 wherein the video presentation sub-system includes a leaderboard associated with the promotional bingo tournament game sessions and the promotional bingo tournament session prize.

27. The method of claim 26 further comprising:

communicatively coupling a stationary monitor client to the video presentation sub-system, wherein the stationary monitor client is disposed at the at least one venue; and displaying, at the stationary monitor client, the leaderboard, and the promotional bingo tournament session prize from the video presentation sub-system.

28. The method of claim 27 the stationary monitor client displays the integrated broadcast announcement from the video presentation sub-system.

29. The method of claim 26 wherein the leader board is communicated to each personal mobile device.

* * * * *